(12) United States Patent
Kondou et al.

(10) Patent No.: US 11,106,761 B2
(45) Date of Patent: Aug. 31, 2021

(54) OPTIMIZATION PROBLEM ARITHMETIC METHOD AND OPTIMIZATION PROBLEM ARITHMETIC APPARATUS

(71) Applicant: FUJITSU LIMITED, Kawasaki (JP)

(72) Inventors: Hiroshi Kondou, Yokohama (JP); Hiroyuki Izui, Kawasaki (JP); Tatsuhiro Makino, Taito (JP); Noriaki Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 16/567,229

(22) Filed: Sep. 11, 2019

(65) Prior Publication Data

US 2020/0089475 A1 Mar. 19, 2020

(30) Foreign Application Priority Data

Sep. 19, 2018 (JP) .............................. JP2018-175397

(51) Int. Cl.
*G06F 17/11* (2006.01)
*G06F 7/544* (2006.01)
*G06F 9/50* (2006.01)
*G06F 7/58* (2006.01)
*G06F 7/57* (2006.01)

(52) U.S. Cl.
CPC .............. *G06F 17/11* (2013.01); *G06F 7/544* (2013.01); *G06F 7/57* (2013.01); *G06F 7/588* (2013.01); *G06F 9/5061* (2013.01)

(58) Field of Classification Search
CPC .............. G06F 17/11–13; G06F 7/544; G06F 9/50–5005; G06F 9/5027; G06F 9/5044–505; G06F 9/5061; G06F 9/5077
See application file for complete search history.

(56) References Cited

U.S. PATENT DOCUMENTS

| | | | |
|---|---|---|---|
| 2016/0063391 A1* | 3/2016 | Hayashi | G06F 7/588 706/11 |
| 2020/0089728 A1* | 3/2020 | Kondou | G06F 17/11 |
| 2020/0089729 A1* | 3/2020 | Kondou | G06F 7/544 |
| 2020/0090051 A1* | 3/2020 | Shimada | G06N 5/003 |

FOREIGN PATENT DOCUMENTS

| | | | | |
|---|---|---|---|---|
| WO | 2017/037903 A1 | 3/2017 | | |
| WO | WO-2017037903 A1 * | 3/2017 | ............. | G06F 15/80 |

* cited by examiner

*Primary Examiner* — Matthew D Sandifer
(74) *Attorney, Agent, or Firm* — Fujitsu Patent Center

(57) ABSTRACT

A computer-implemented optimization problem arithmetic method includes receiving a combinatorial optimization problem, determining, based on scale or a requested accuracy of the combinatorial optimization problem, a partition mode and an execution mode, the partition mode defining a logically divided state of an arithmetic circuit, the execution mode defining a range of hardware resources to be utilized in arithmetic operation for each of partitions generated by logically dividing the arithmetic circuit, and causing the arithmetic circuit to execute arithmetic operation of the combinatorial optimization problem in accordance with the determined partition mode and the determined execution mode.

15 Claims, 37 Drawing Sheets

FIG. 6
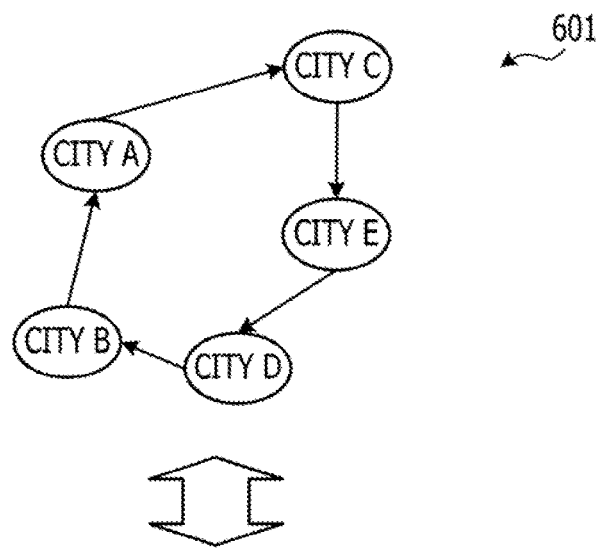
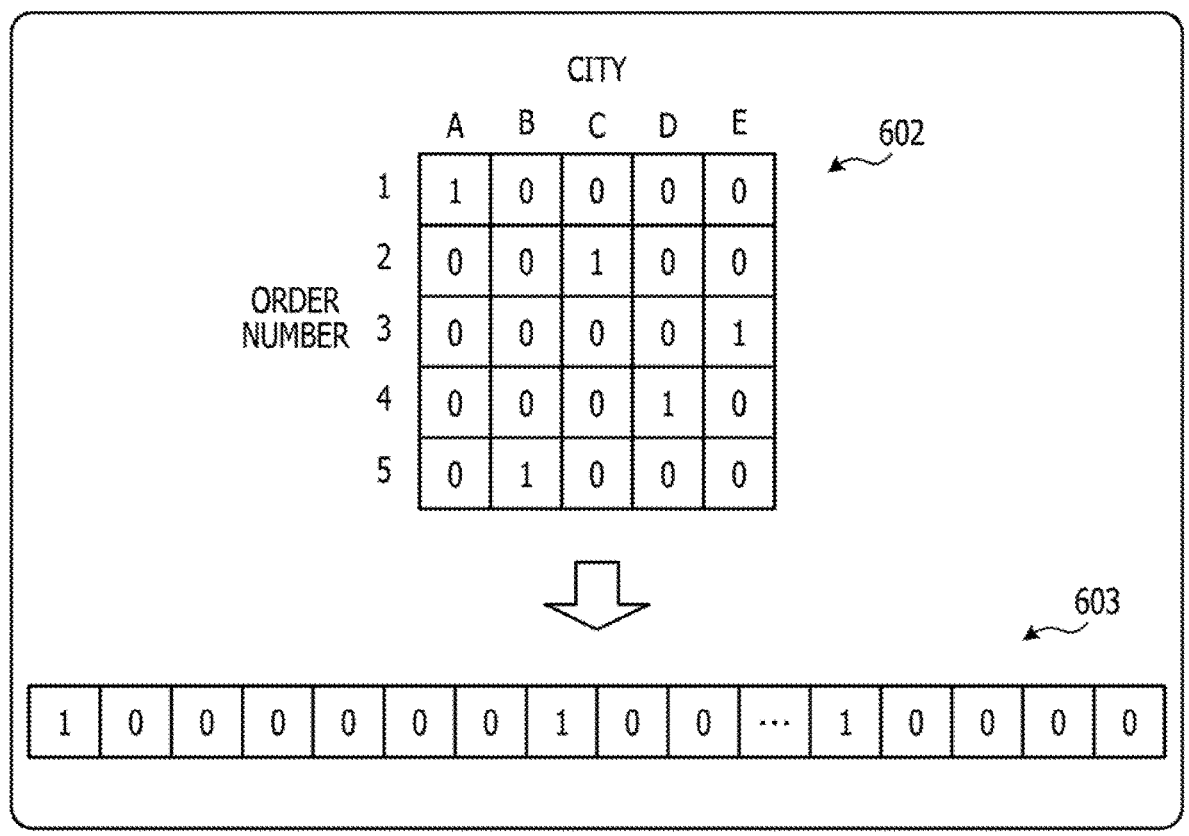

FIG. 7
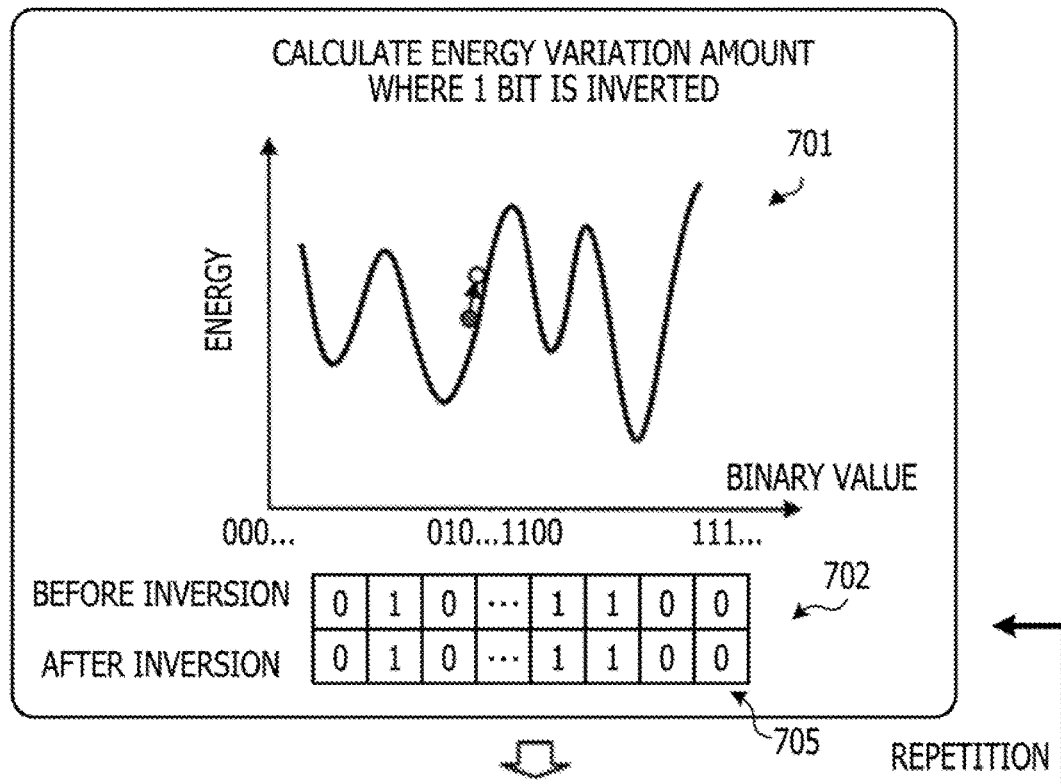
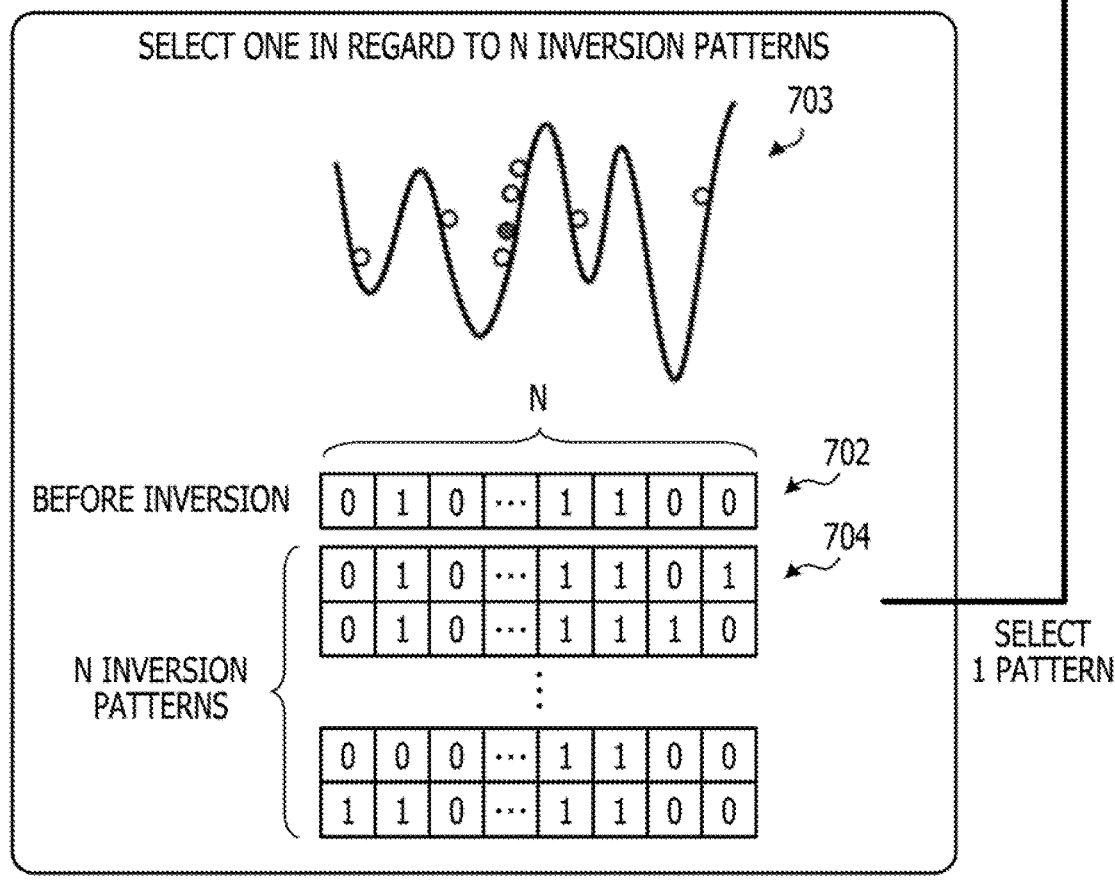

SCALE: 1k BITS
ACCURACY: 128 BITS
LFE NUMBER: 1k

SCALE: 2k BITS
ACCURACY: 64 BITS
LFE NUMBER: 2k

FIG. 13

LFE0

| | | | ~3d1 |
|---|---|---|---|
| $W_{0,4095}$ | | $W_{0,4094}$ | |
| $W_{0,4093}$ | | $W_{0,4092}$ | |
| ... | | ... | |
| $W_{0,3}$ | | $W_{0,2}$ | |
| $W_{0,1}$ | | $W_{0,0}$ | |

63    47    31    15

LFE1

| | | | ~3d2 |
|---|---|---|---|
| $W_{1,4095}$ | | $W_{1,4094}$ | |
| $W_{1,4093}$ | | $W_{1,4092}$ | |
| ... | | ... | |
| $W_{1,3}$ | | $W_{1,2}$ | |
| $W_{1,1}$ | | $W_{1,0}$ | |

63    47    31    15

⋮

LFE4095

| | | | ~3du |
|---|---|---|---|
| $W_{4095,4095}$ | | $W_{4095,4094}$ | |
| $W_{4095,4093}$ | | $W_{4095,4092}$ | |
| ... | | ... | |
| $W_{4095,3}$ | | $W_{4095,2}$ | |
| $W_{4095,1}$ | | $W_{4095,0}$ | |

63    47    31    15

SCALE: 4k BITS
ACCURACY: 32 BITS
LFE NUMBER: 4k

FIG. 14

LFE0

| $W_{0,8191}$ | $W_{0,8190}$ | $W_{0,8189}$ | $W_{0,8188}$ |
|---|---|---|---|
| $W_{0,8187}$ | $W_{0,8186}$ | $W_{0,8185}$ | $W_{0,8184}$ |
| ... | ... | ... | ... |
| $W_{0,7}$ | $W_{0,6}$ | $W_{0,5}$ | $W_{0,4}$ |
| $W_{0,3}$ | $W_{0,2}$ | $W_{0,1}$ | $W_{0,0}$ |

~4d1

63     47     31     15

LFE1

| $W_{1,8191}$ | $W_{1,8190}$ | $W_{1,8189}$ | $W_{1,8188}$ |
|---|---|---|---|
| $W_{1,8187}$ | $W_{1,8186}$ | $W_{1,8185}$ | $W_{1,8184}$ |
| ... | ... | ... | ... |
| $W_{1,7}$ | $W_{1,6}$ | $W_{1,5}$ | $W_{1,4}$ |
| $W_{1,3}$ | $W_{1,2}$ | $W_{1,1}$ | $W_{1,0}$ |

~4d2

63     47     31     15

⋮

LFE8191

| $W_{8191,8191}$ | $W_{8191,8190}$ | $W_{8191,8189}$ | $W_{8191,8188}$ |
|---|---|---|---|
| $W_{8191,8187}$ | $W_{8191,8186}$ | $W_{8191,8185}$ | $W_{8191,8184}$ |
| ... | ... | ... | ... |
| $W_{8191,7}$ | $W_{8191,6}$ | $W_{8191,5}$ | $W_{8191,4}$ |
| $W_{8191,3}$ | $W_{8191,2}$ | $W_{8191,1}$ | $W_{8191,0}$ |

~4dn 63     47     31     15

SCALE: 8k BITS
ACCURACY: 16 BITS
LFE NUMBER: 8k

SCALE: 4k BITS
ACCURACY: 64 BITS
LFE NUMBER: 8k

FIG. 17

| | PARTITION MODE | SCALE | USED LFB NUMBER | ACCURACY |
|---|---|---|---|---|
| 1700-1 | 8P (EIGHT DIVISION) | 1024 bit (1K) | 1 | 128 bit |
| 1700-2 | 4P (FOUR DIVISION) | 2048 bit (2K) | 2 | 64 bit |
| 1700-3 | 2P (TWO DIVISION) | 4096 bit (4K) | 4 | 32 bit |
| 1700-4 | FULL | 4096 bit (4K) | 8 | 64 bit |
| 1700-5 | FULL | 8192 bit (8K) | 8 | 16 bit |

MODE SETTING TABLE 1700

FIG. 20A
| TYPE | PATITION MODE | PROBLEM SCALE × QUANTITY | ARITHMETIC OPERATION TIME |
|---|---|---|---|
| NOT CHANGEABLE (FIXED) | - | 1K×8 | T1×8 |
| CHANGEABLE (VARIABLE) | 8P | 1K×8 | T1 |
2001
■ CHANGEABLE (VARIABLE)
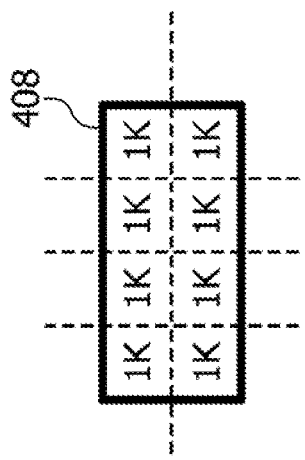
408
■ NOT CHANGEABLE (FIXED)
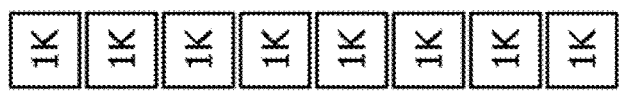

FIG. 20B
| TYPE | PARTITION MODE | PROBLEM SCALE × QUANTITY | ARITHMETIC OPERATION TIME |
|---|---|---|---|
| NOT CHANGEABLE (FIXED) | - | 2K×4 | T2×4 |
| CHANGEABLE (VARIABLE) | 4P | 2K×4 | T2 |
2002
■ NOT CHANGEABLE (FIXED)
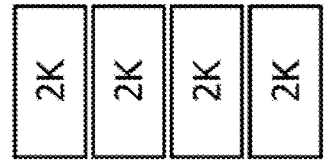
■ CHANGEABLE (VARIABLE)
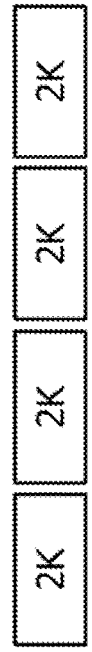
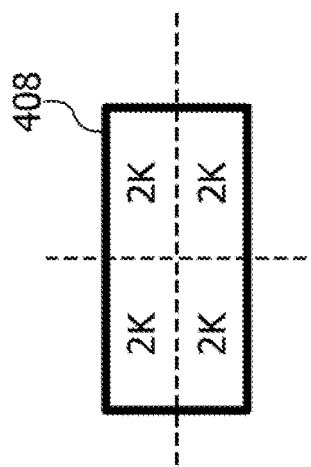
408

| TYPE | PATITION MODE | PROBLEM SCALE × QUANTITY | ARITHMETIC OPERATION TIME |
|---|---|---|---|
| NOT CHANGEABLE (FIXED) | - | 2K×3, 1K×2 | T2×3+T1×2 |
| CHANGEABLE (VARIABLE) | 4P | 2K×3, 1K×2 | Max (T2, T1) |

■ NOT CHANGEABLE (FIXED)  ■ CHANGEABLE (VARIABLE)

FIG. 20D
| TYPE | PATITION MODE | PROBLEM SCALE × QUANTITY | ARITHMETIC OPERATION TIME |
|---|---|---|---|
| NOT CHANGEABLE (FIXED) | - | 4K×2 | T4×2 |
| CHANGEABLE (VARIABLE) | 2P | 4K×2 | T4 |
~2004
■ NOT CHANGEABLE (FIXED)
■ CHANGEABLE (VARIABLE)
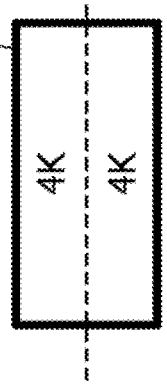
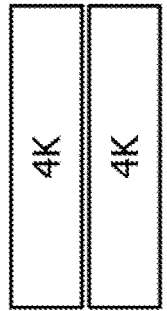
408

FIG. 20E
| TYPE | PATITION MODE | PROBLEM SCALE × QUANTITY | ARITHMETIC OPERATION TIME |
|---|---|---|---|
| NOT CHANGEABLE (FIXED) | — | 4K×1, 2K×2 | T4+T2×2 |
| CHANGEABLE (VARIABLE) | 2P | 4K×1, 2K×2 | Max (T4, T2) |
■ NOT CHANGEABLE (FIXED)
■ CHANGEABLE (VARIABLE)
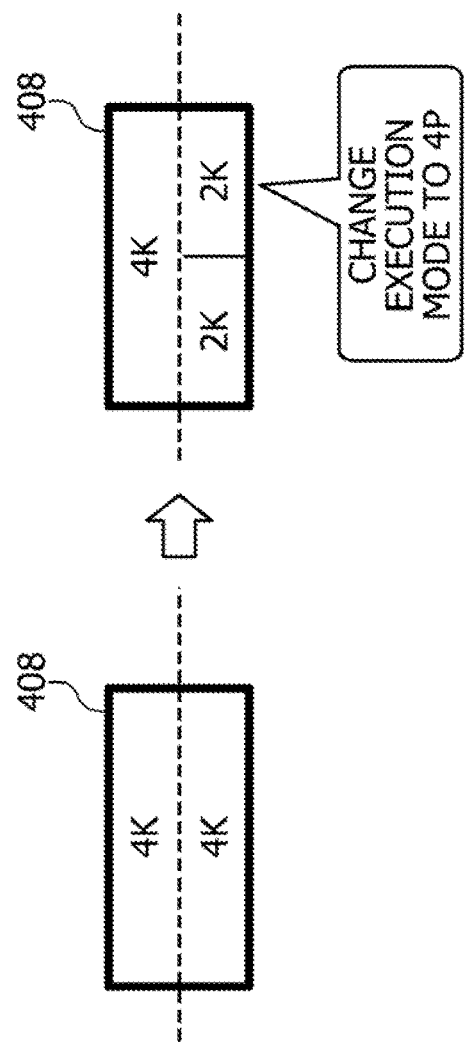

| TYPE | PATITION MODE | PROBLEM SCALE × QUANTITY | ARITHMETIC OPERATION TIME |
|---|---|---|---|
| NOT CHANGEABLE (FIXED) | - | 4K×1, 1K×4 | T4+T1×4 |
| CHANGEABLE (VARIABLE) | 2P | 4K×1, 1K×4 | Max (T4, T1) |

■ CHANGEABLE (VARIABLE)

■ NOT CHANGEABLE (FIXED)

FIG. 20G
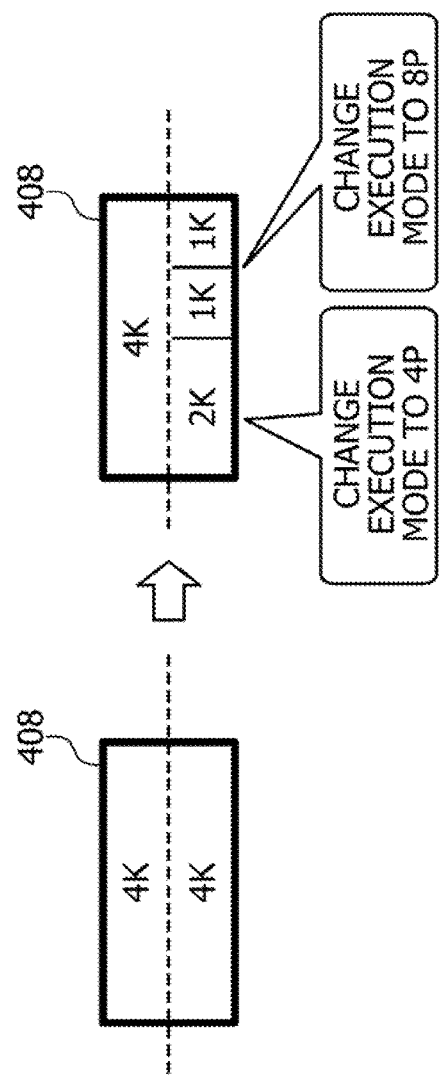
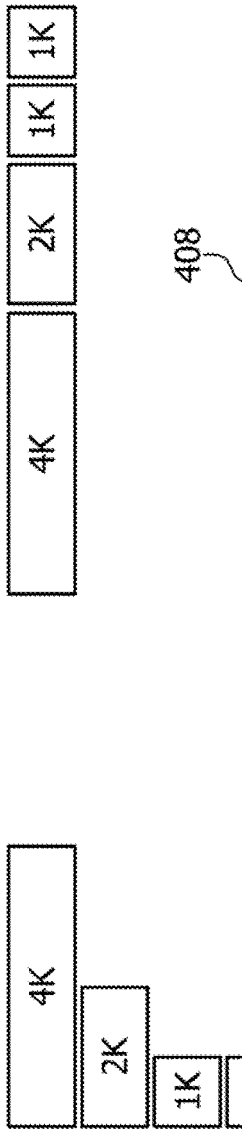

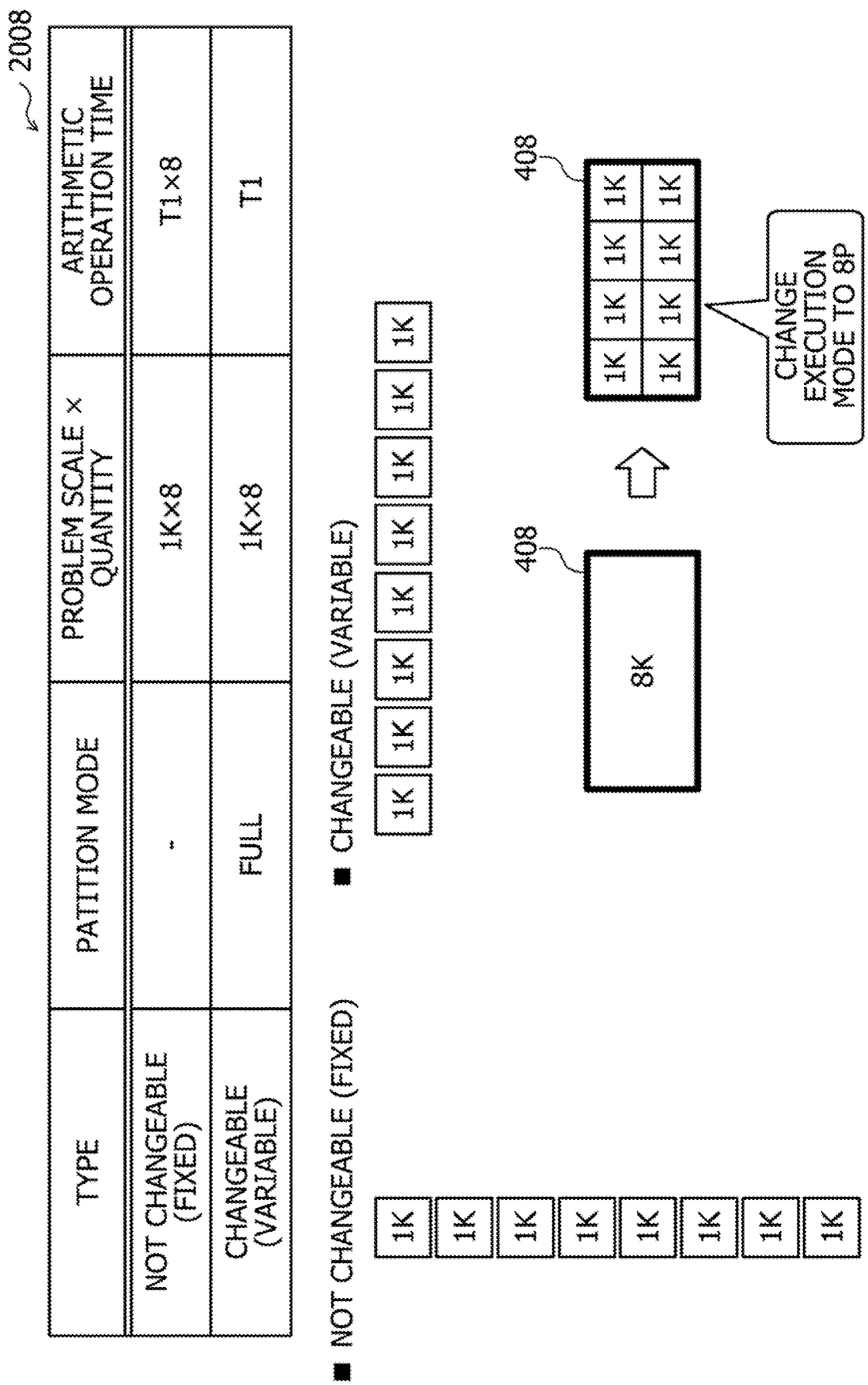

FIG. 20J
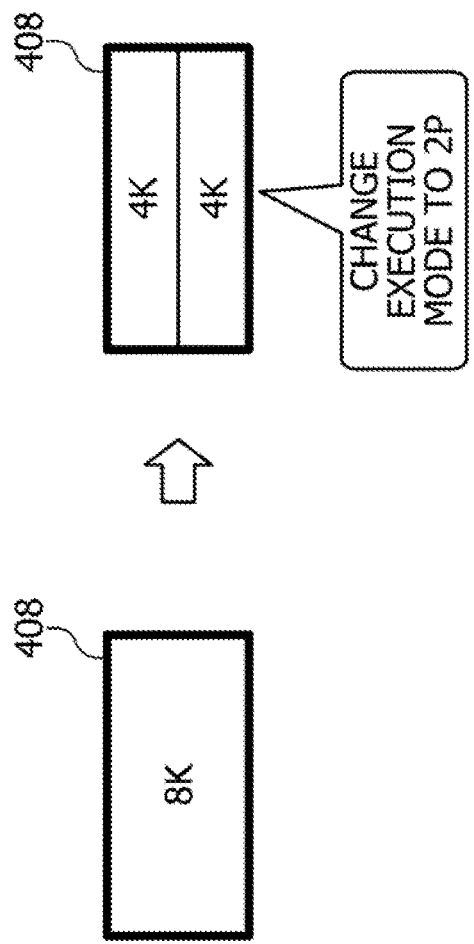
| TYPE | PATITION MODE | PROBLEM SCALE × QUANTITY | ARITHMETIC OPERATION TIME |
|---|---|---|---|
| NOT CHANGEABLE (FIXED) | - | 4K×2 | T4×2 |
| CHANGEABLE (VARIABLE) | FULL | 4K×2 | T4 |
■ CHANGEABLE (VARIABLE)
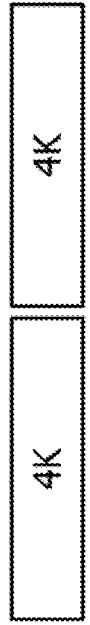
■ NOT CHANGEABLE (FIXED)
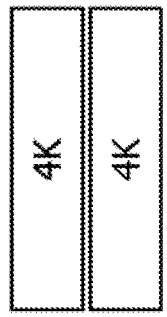

| TYPE | PATITION MODE | PROBLEM SCALE × QUANTITY | ARITHMETIC OPERATION TIME |
|---|---|---|---|
| NOT CHANGEABLE (FIXED) | - | 2K×2, 1K×4 | T2×2+T1×4 |
| CHANGEABLE (VARIABLE) | FULL | 2K×2, 1K×4 | Max (T2, T1) |

■ NOT CHANGEABLE (FIXED)   ■ CHANGEABLE (VARIABLE)

FIG. 20L
| TYPE | PARTITION MODE | PROBLEM SCALE × QUANTITY | ARITHMETIC OPERATION TIME |
|---|---|---|---|
| NOT CHANGEABLE (FIXED) | — | 4K×1, 2K×1, 1K×2 | T4+T2+T1×2 |
| CHANGEABLE (VARIABLE) | FULL | 4K×1, 2K×1, 1K×2 | Max (T4, T2, T1) |
2012
■ NOT CHANGEABLE (FIXED)
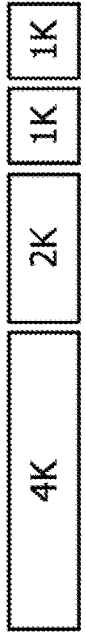
■ CHANGEABLE (VARIABLE)
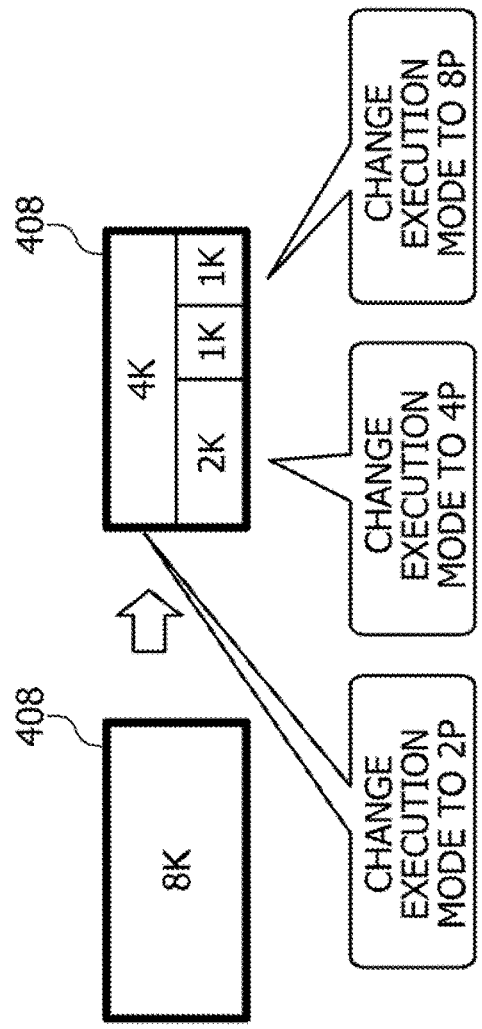

US 11,106,761 B2

OPTIMIZATION PROBLEM ARITHMETIC METHOD AND OPTIMIZATION PROBLEM ARITHMETIC APPARATUS

CROSS-REFERENCE TO RELATED APPLICATION

This application is based upon and claims the benefit of priority of the prior Japanese Patent Application No. 2018-175397, filed on Sep. 19, 2018, the entire contents of which are incorporated herein by reference.

FIELD

The embodiment discussed herein relates to an optimization problem arithmetic technology.

BACKGROUND

As measures for solving a multivariate optimization problem at which Neumann computers are not good, an optimization apparatus that uses an Ising type energy function (sometimes called Ising machine or Boltzmann machine) is available. The optimization apparatus calculates a problem of a calculation target by replacing it with an Ising model that is a model representative of a spin behavior of a magnetic material.

The optimization apparatus may perform also modeling using, for example, a neural network. In this case, each of a plurality of bits (spin bits) corresponding to a plurality of spins included in an Ising model functions as a neuron that outputs 0 or 1 in response to a weighting factor (also called coupling factor) indicative of a magnitude of an interaction between a different bit and the own bit. The optimization apparatus determines, as a solution, a combination of values of bits with which a minimum value in regard to a value (called energy) of such an energy function (also called cost function or objective function) as described above is obtained by a probabilistic search method such as simulated annealing.

For example, a proposal of a semiconductor system that searches a ground state of an Ising model using a semiconductor chip on which a plurality of unit elements each corresponding to a spin are incorporated is available. In the proposed semiconductor system, in order to implement a semiconductor chip capable of coping with a large scale problem, a plurality of semiconductor chips in which a certain number of unit elements are incorporated are used to construct a semiconductor system.

Examples of the related art include International Publication Pamphlet No. WO 2017/037903.

SUMMARY

According to an aspect of the embodiment, a computer-implemented optimization problem arithmetic method includes receiving a combinatorial optimization problem, determining, based on scale or a requested accuracy of the combinatorial optimization problem, a partition mode and an execution mode, the partition mode defining a logically divided state of an arithmetic circuit, the execution mode defining a range of hardware resources to be utilized in arithmetic operation for each of partitions generated by logically dividing the arithmetic circuit, and causing the arithmetic circuit to execute arithmetic operation of the combinatorial optimization problem in accordance with the determined partition mode and the determined execution mode.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory view depicting an example of a combinatorial optimization problem;

FIG. 7 is an explanatory view depicting an example of a search for a binary value that indicates lowest energy;

FIG. 13 is an explanatory view (part 3) depicting an example of storage of weighting factors;

FIG. 14 is an explanatory view (part 4) depicting an example of storage of weighting factors;

FIG. 17 is an explanatory view depicting an example of storage substance of a mode setting table;

FIG. 20A is an explanatory view (part 1) depicting a comparative example of arithmetic operation time of a combinatorial optimization problem;

FIG. 20B is an explanatory view (part 2) depicting a comparative example of arithmetic operation time of a combinatorial optimization problem;

FIG. 20D is an explanatory view (part 4) depicting a comparative example of arithmetic operation time of a combinatorial optimization problem;

FIG. 20E is an explanatory view (part 5) depicting a comparative example of arithmetic operation time of a combinatorial optimization problem;

FIG. 20G is an explanatory view (part 7) depicting a comparative example of arithmetic operation time of a combinatorial optimization problem;

FIG. 20H Is an explanatory view (part 8) depicting a comparative example of arithmetic operation time of a combinatorial optimization problem;

FIG. 20J is an explanatory view (part 10) depicting a comparative example of arithmetic operation time of a combinatorial optimization problem;

FIG. 20L is an explanatory view (part 12) depicting a comparative example of arithmetic operation time of a combinatorial optimization problem;

DESCRIPTION OF EMBODIMENTS

In an optimization apparatus, the number of spin bits to be utilized (corresponding to the scale of a problem) or the number of bits of a weighting factor (corresponding to an accuracy of a condition expression in the problem) is changeable in response to a problem to be solved. For example, in a problem in a certain field, a comparatively small spin bit number is sometimes used while the bit number of a weighting factor may be comparatively small. On the other hand, in a problem in a different field, although the spin bit number may be comparatively small, a comparatively great bit number of a weighting factor is sometimes used. However, it is inefficient to manufacture an optimization apparatus, which includes a spin bit number and a bit number of a weighting factor suitable for a problem, individually for each problem.

In the following, an embodiment of an optimization problem arithmetic program, an optimization problem arithmetic method and an optimization problem arithmetic apparatus according to the present technology is described in detail with reference to the drawings.

Figure 1:
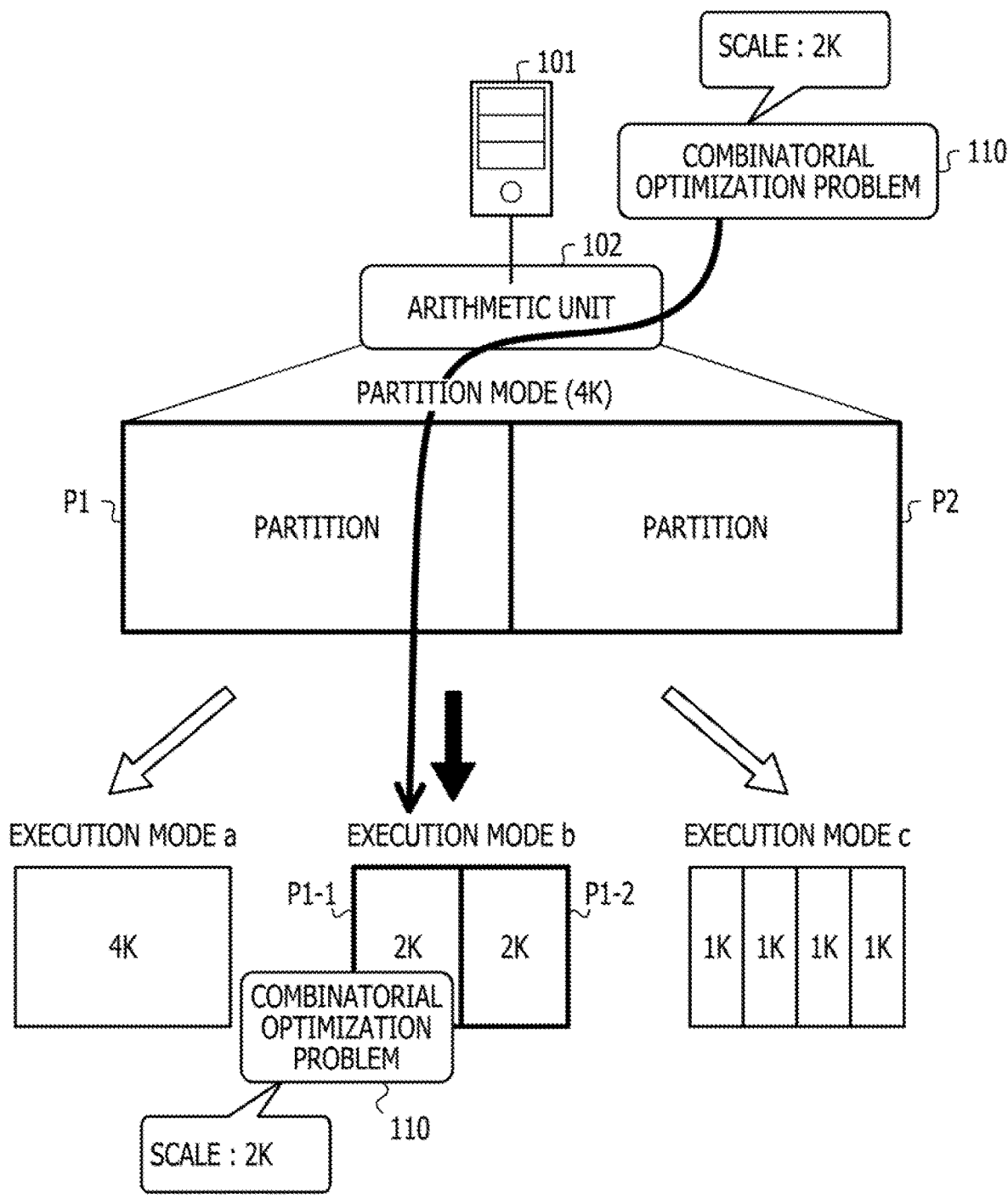
FIG. 1 is an explanatory view depicting a working example of an optimization problem arithmetic method according to an embodiment.

FIG. 1 is an explanatory view depicting a working example of an optimization problem arithmetic method according to an embodiment. Referring to FIG. 1, an optimization problem arithmetic apparatus 101 is a computer in which an arithmetic unit 102 performs arithmetic operation of a combinatorial optimization problem. The arithmetic unit 102 is a device for solving a combinatorial optimization problem.

The arithmetic unit 102 can be logically divided into a plurality of partitions. To divide into partitions signifies to delimit the range of hardware resources to be utilized upon arithmetic operation. In the arithmetic unit 102, the individual partitions can solve different problems independently of each other.

For example, if the arithmetic unit 102 is divided into eight partitions, it is possible for eight users to simultaneously solve problems different from one another. The arithmetic unit 102 may be, for example, a separate device that is coupled to and used together with the optimization problem arithmetic apparatus 101 or may be a device built in the optimization problem arithmetic apparatus 101.

The optimization problem arithmetic apparatus 101 can change a partition mode for defining a logical division state of the arithmetic unit 102 by a setting to the arithmetic unit 102. Depending upon in what manner the arithmetic unit 102 is to be divided, the range of hardware resources that can be utilized upon arithmetic operation and the scale or the accuracy of a combinatorial optimization problem that can be solved by each partition is determined.

However, if the partition mode is changed dynamically, there is the possibility that a result of arithmetic operation in a partition may become abnormal. Accordingly, in the case where the partition mode is to be changed, the optimization problem arithmetic apparatus 101 changes the partition mode after, for example, a state in which arithmetic operation is not performed by any partition is established.

It is to be noted that it is arbitrarily settable in what manner the arithmetic unit 102 is to be divided, for example, in what partition mode is to be prepared.

Further, the optimization problem arithmetic apparatus 101 can change the execution mode in each partition mode by a setting to the arithmetic unit 102. The execution mode is a mode that defines a range of hardware resources to be utilized upon arithmetic operation. For example, the arithmetic unit 102 can designate a range of hardware resources to be utilized upon arithmetic operation through a partition mode and an execution mode.

However, in order to suppress an influence from being had on a different partition, the arithmetic unit 102 does not perform, in each partition, change to an execution mode in which the partition size is greater than that in the partition mode. The partition size represents a maximum scale or a maximum accuracy of a problem that can be solved in each mode. For example, change to an execution mode by which the range of hardware resources to be utilized upon arithmetic operation becomes greater than that of hardware resources that can be utilized in each partition is not performed.

Further, if, in a certain partition, change to an execution mode whose partition size is smaller than that in the partition mode is performed, the range of hardware resources to be utilized upon arithmetic operation is subdivided more finely. For example, one partition is further divided into a plurality of partitions.

Here, in the optimization apparatus (Ising machine) that solves a combinatorial optimization problem, it is sometimes demanded to solve problems of different scales or different requested accuracies. However, the optimization apparatus in the related art has only one mode (the range of hardware resources utilized upon arithmetic operation is fixed) and is not configured such that it performs optimum operation in response to the scale or requested accuracy of the problem.

Accordingly, in the optimization apparatus in the related art, in the case where the scale or the accuracy of a problem to be solved is less than a maximum scale or a maximum accuracy of a problem that can be solved by hardware, the range in which the hardware searches or the memory size that is transferred by direct memory access (DMA) becomes great and increased operation time is required. For example, in the case of solving a problem whose scale is "1024 bits (1K)" when the maximum scale of a problem that can be solved by hardware is "8192 bits (8K)," since the search range becomes great and wasteful DMA transfer is performed, the arithmetic operation performance is deteriorated.

Therefore, the present embodiment described below is directed to an optimization problem arithmetic method that efficiently solves a combinatorial optimization problem by arithmetic operation of the combinatorial optimization problem performed by the arithmetic unit 102 that is set to a partition mode and an execution mode according to a scale and a requested accuracy of a problem. In the following, an example of processing of the optimization problem arithmetic apparatus 101 is described.

The optimization problem arithmetic apparatus 101 accepts a combinatorial optimization problem to the arithmetic unit 102. Here, the combinatorial optimization problem to be accepted is a problem of a calculation target to be solved and is, for example, a problem designated by a user. It is to be noted that an example of the combinatorial optimization problem is hereinafter described with reference to FIG. 6.

The optimization problem arithmetic apparatus 101 determines a partition mode of the arithmetic unit 102 and an execution mode that specifies a range of hardware resources to be utilized upon arithmetic operation in the arithmetic unit 102 in the partition mode, for example, in response to a scale or a requested accuracy of the combinatorial optimization problem.

Here, the scale of a combinatorial optimization problem is represented, for example, by a spin bit number of an Ising model of the combinatorial optimization problem. The Ising model is a model representative of a behavior of a spin of magnetic material. The arithmetic unit 102 calculates, for example, replacing the problem of the calculation target with an Ising model. Further, the requested accuracy of a combinatorial optimization problem is represented, for example, by a bit number of a weighting factor indicative of a magnitude of an interaction between bits.

For example, the optimization problem arithmetic apparatus 101 decides whether or not the scale of a combinatorial optimization problem is smaller than a maximum scale of a problem that can be solved by a first partition mode. Here, the first partition mode is one of a plurality of partition modes that can be set to the arithmetic unit 102 and is, for example, a current partition mode of the arithmetic unit 102.

Then, in the case where the scale of the combinatorial optimization problem is smaller than the maximum scale, the optimization problem arithmetic apparatus 101 determines the partition mode for the arithmetic unit 102 to the first partition mode. For example, if the first partition mode is the current partition mode, change of the partition mode is not performed.

Further, the optimization problem arithmetic apparatus 101 determines the execution mode of the arithmetic unit 102 to a first execution mode that specifies a range of hardware resources corresponding to the scale of the combinatorial optimization problem from among execution modes that specify a range of hardware resources to be utilized upon arithmetic operation in the first partition mode.

Here, the range of hardware resources corresponding to the scale of the combinatorial optimization problem is, for example, a minimal range of hardware resources with which a problem of the scale can be solved. For example, if the scale of the combinatorial optimization problem is "2048 bits (2K)," the minimal range of hardware resources with which a problem of the scale can be solved is a range of hardware resources with which a problem of a scale equal to or smaller than 2048 bits (2K) can be solved.

On the other hand, in the case where the scale of the combinatorial optimization problem is greater than the maximum scale, in the intact, it is difficult to solve the combinatorial optimization problem by the first partition mode. Therefore, the optimization problem arithmetic apparatus 101 may determine the partition mode of the arithmetic unit 102 to a second partition mode in which hardware resources corresponding to the scale of the combinatorial optimization problem can be utilized. For example, the optimization problem arithmetic apparatus 101 determines the partition mode for the arithmetic unit 102 to the second partition mode in which a problem of a scale equal to or greater than the scale of the combinatorial optimization problem can be solved.

However, in the case where the partition mode is to be changed, the optimization problem arithmetic apparatus 101 changes the partition mode in a state in which arithmetic operation is not performed in any partition in order to suppress a result, which is being operated in the partition, from becoming abnormal.

This makes it possible to perform arithmetic operation of the combinatorial optimization problem in a setting according to the scale of the combinatorial optimization problem. It is to be noted that, in the case where the scale of the combinatorial optimization problem is greater than the maximum scale, the optimization problem arithmetic apparatus 101 may divide the combinatorial optimization problem using an existing distributed method to solve the combinatorial optimization problem.

Further, for example, the optimization problem arithmetic apparatus 101 may decide whether or not the requested accuracy of the combinatorial optimization problem is within a range of a maximum accuracy of a problem that can be solved by the first partition mode. Then, in the case where the requested accuracy of the combinatorial optimization problem is within the range of the maximum accuracy, the optimization problem arithmetic apparatus 101 determines the partition mode of the arithmetic unit 102 to the first partition mode. Further, the optimization problem arithmetic apparatus 101 determines the execution mode of the arithmetic unit 102 to the first execution mode that specifies a range of hardware resources corresponding to the requested accuracy of the combinatorial optimization problem.

Here, the range of hardware resources corresponding to the requested accuracy of the combinatorial optimization problem is, for example, a minimal range of hardware resources with which a problem of the requested accuracy can be solved. For example, if the requested accuracy of the combinatorial optimization problem is "32 bits," the minimal range of hardware resources with which a problem of the requested accuracy can be solved is a range of hardware resources within which a problem of the accuracy of 32 bits or less can be solved.

This makes it possible to perform arithmetic operation of a combinatorial optimization problem in accordance with a setting according to the requested accuracy of the combinatorial optimization problem.

In the example of FIG. 1, the problem of a calculation target is "combination optimization problem 110" and the scale of the combinatorial optimization problem 110 is "2048 bits (2K)." Further, the first partition mode is a "partition mode (4K)" that is a current partition mode of the arithmetic unit 102.

The partition mode (4K) is a partition mode that specifies a state in which the arithmetic unit 102 is logically divided into two partitions. In the example of FIG. 1, the arithmetic unit 102 is logically divided into partitions P1 and P2. The maximum scale of a problem that can be solved by the partition mode (4K) is "4096 bits (4K)." For example, the maximum scale of a problem that can be solved by each of the partitions P1 and P2 is "4096 bits (4K)."

Further, execution modes that can be set in each of the partitions P1 and P2 in the partition mode (4K) are execution modes a, b and c. The execution mode a is an execution mode in which a problem of a scale equal to or smaller than "4096 bits (4K)" can be solved. The execution mode b is an execution mode in which a problem of a scale equal to or smaller than "2048 bits (2K)" can be solved. The execution mode c is an execution mode in which a problem of a scale equal to or smaller than "1024 bits (1K)" can be solved.

Here, description is given taking a case in which a partition mode and an execution mode for the arithmetic unit 102 are determined in response to the scale of the combinatorial optimization problem 110 as an example.

In this case, the optimization problem arithmetic apparatus 101 decides whether or not the combinatorial optimization problem 110 is smaller than the maximum scale of a problem that can be solved in the partition mode (4K). Here, the scale "2048 bits (2K)" of the combinatorial optimization problem 110 is smaller than the maximum scale "4096 bits (4K)."

Therefore, the optimization problem arithmetic apparatus 101 decides that the scale of the combinatorial optimization problem 110 is smaller than the maximum scale. Then, the optimization problem arithmetic apparatus 101 determines the partition mode of the arithmetic unit 102 to the partition mode "4K." For example, the optimization problem arithmetic apparatus 101 does not perform change of the partition mode.

Further, the optimization problem arithmetic apparatus 101 determines the execution mode of the arithmetic unit 102 to the first execution mode that defines a range of hardware resources corresponding to the scale of the combinatorial optimization problem 110 from among the execution modes a, b and c of the partition mode (4K). Here, the scale of the combinatorial optimization problem 110 is "2048 bits (2K)."

In this case, the optimization problem arithmetic apparatus 101 determines the execution mode of the arithmetic unit 102, for example, to the execution mode b that specifies a minimal range of hardware resources with which a problem of a scale of "2048 bits (2K)" can be solved. In the execution mode b, although the maximum scale of a problem that can be solved by each partition is smaller, hardware resources to be used are less in comparison with those in the execution mode a.

The optimization problem arithmetic apparatus 101 causes the arithmetic unit 102 to execute arithmetic operation of the combinatorial optimization problem by the determined partition mode and execution mode.

For example, the optimization problem arithmetic apparatus 101 sets the determined partition mode and execution mode to the arithmetic unit 102 and causes the arithmetic unit 102 to execute arithmetic operation of the combinatorial optimization problem.

In the example of FIG. 1, the optimization problem arithmetic apparatus 101 causes the arithmetic unit 102 to execute arithmetic operation of the combinatorial optimization problem 110 by the determined partition mode (4K) and execution mode b. For example, if the execution mode in the partition mode (4K) is the "execution mode a," the optimization problem arithmetic apparatus 101 changes the execution mode of the arithmetic unit 102 to the "execution mode b" and causes the arithmetic unit 102 to execute arithmetic operation of the combinatorial optimization problem 110.

If, in the partition mode (4K), the execution mode of the arithmetic unit 102 is changed from the execution mode a to the execution mode b, for example, the partition P1 is divided into a partition P1-1 and another partition P1-2. The maximum scale of a problem that can be solved by each of the partitions P1-1 and P1-2 is "2048 bits (2K)." In this case, the optimization problem arithmetic apparatus 101 allocates, for example, the combinatorial optimization problem 110 to the partition P1-1 such that arithmetic operation of the combinatorial optimization problem 110 is executed by the partition P1-1 in the partition mode (4K) and the execution mode b.

In this manner, according to the optimization problem arithmetic apparatus 101, arithmetic operation of a combinatorial optimization problem may be performed by the arithmetic unit 102 in a partition mode and an execution mode according to the scale or a requested accuracy of the problem. Consequently, a range of hardware resources to be utilized upon arithmetic operation may be set in response to the scale or the requested accuracy of the problem, and the arithmetic operation performance may be increased to achieve high speed arithmetic processing.

In the example of FIG. 1, arithmetic operation of the combinatorial optimization problem 110 may be executed by the arithmetic unit 102 (partition P1-1) set to the partition mode (4K) and the execution mode b according to the scale of the problem. Consequently, it is possible to solve the combinatorial optimization problem 110 by the execution mode b of a scale as small as possible in accordance with the scale of the problem thereby to suppress wasteful DMA transfer and so forth and increase the arithmetic operation performance.

Figure 2:
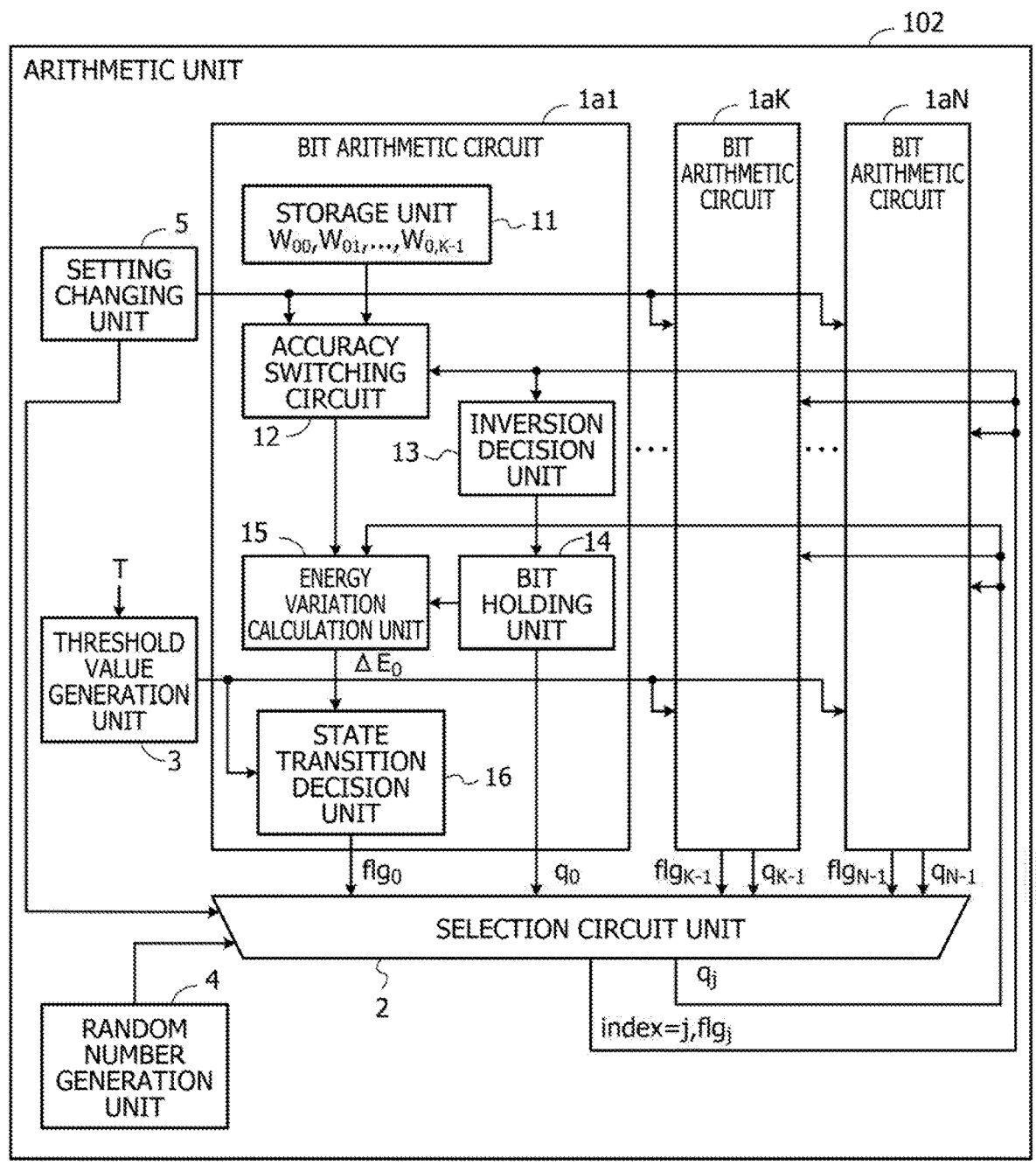
FIG. 2 is an explanatory view depicting a working example of an arithmetic unit.

Now, a working example of the arithmetic unit 102 depicted in FIG. 1 is described. FIG. 2 is an explanatory view depicting the working example of the arithmetic unit 102. Referring to FIG. 2, the arithmetic unit 102 searches for a value (ground state) of each bit when the energy function assumes a minimum value from among combinations (states) of values of a plurality of bits (spin bits) corresponding to a plurality of spins included in an Ising model into which the problem of the calculation target (combination optimization problem) is converted.

An Ising type energy function E(x) is defined, for example, by the following expression (1).

$$E(x) = -\sum_{\langle i,j \rangle} W_{ij} x_i x_j - \sum_i b_i x_i \quad (1)$$

The first term on the right side indicates an integration of the product of the values (0 or 1) of two bits and a coupling factor in regard to all combinations of two bits selectable from all bits included in the Ising model without any leak and any overlap. The total bit number included in the Ising model is K (K is an integer equal to or greater than 2). Further, i and j are each an integer equal to or greater than 0 but equal to or smaller than K−1. $x_i$ is a variable (also called state variable) representative of a value of the ith bit. $x_j$ is a variable representative of a value of the jth bit. $W_{ij}$ is a weighting factor indicative of a magnitude of an interaction between the ith and jth bits. It is to be noted that $W_{ii}=0$. Further, in many cases, $W_{ij}=W_{ji}$ (for example, a factor matrix of weighting factors is, in many cases, a symmetrical matrix).

The second term on the right side of the expression (1) above indicates the sum total of the product of the bias factor and the bit value of all bits. $b_i$ indicates a bias factor of the ith bit.

Further, if the value of the variable $x_i$ varies to 1−$x_i$, the increase amount of the variable $x_i$ may be represented as $\Delta x_i=(1-x_i)-x_i=1-2x_i$. Accordingly, the energy variation $\Delta E_i$ by spin inversion (variation in value) is represented by the following expression (2).

$$\begin{aligned}\Delta E_i &= E(x)|_{x_i \to 1-x_i} - E(x) \\ &= -\Delta x_i \left(\sum_j W_{ij} x_j + b_i\right) \\ &= -\Delta x_i h_i \\ &= \begin{cases} -h_i & (\text{for } x_i = 0 \to 1) \\ +h_i & (\text{for } x_i = 1 \to 0) \end{cases}\end{aligned} \quad (2)$$

$h_i$ is called local field and is represented by the following expression (3).

$$h_i = \sum_j W_{ij} x_j + b_i \quad (3)$$

An energy variation $\Delta E_i$ is the product of the local field $h_i$ by a sign (+1 or −1) in response to $\Delta x_i$. A variation $\Delta h_i$ of the local field $h_i$ is represented by the following expression (4).

$$\Delta h_i = \begin{cases} +W_{ij} & (\text{for } x_j = 0 \to 1) \\ -W_{ij} & (\text{for } x_j = 1 \to 0) \end{cases} \quad (4)$$

Processing for updating the local field $h_i$ when a certain variable $x_j$ changes is performed in parallel.

The arithmetic unit 102 is, for example, a semiconductor integrated circuit of one chip and is implemented using a field programmable gate array (FPGA) or the like. The arithmetic unit 102 includes bit arithmetic circuits 1a1, . . . , 1aK, . . . , 1aN (a plurality of bit arithmetic circuits), a selection circuit unit 2, a threshold value generation unit 3, a random number generation unit 4 and a setting changing unit 5. Here, N is a total number of bit arithmetic circuits the arithmetic unit 102 includes. N is an integer equal to or greater than K. With the bit arithmetic circuits 1a1, . . . , 1aK, . . . , 1aN, identification information (whose index=0, . . . , K−1, . . . , N−1) is associated.

The bit arithmetic circuits 1a1, . . . , 1aK, . . . , 1aN are unit elements that provide 1 bit included in a bit string representative of a state of the Ising model. The bit string may be called spin bit string or state vector. Each of the bit arithmetic circuits 1a1, . . . , 1aK, . . . , 1aN stores a weighting factor between an own bit and a different bit, decides reversibility of the own bit according to inversion of the different bit based on the weighting factor and outputs a signal representative of the reversibility of the own bit to the selection circuit unit 2.

The selection circuit unit 2 selects a bit to be inverted (inversion bit) from within a spin bit string. For example, the selection circuit unit 2 accepts a signal of reversibility outputted from each of the bit arithmetic circuits 1a1, . . . , 1aK that are used in search for a ground state of the Ising model from among the bit arithmetic circuits 1a1, . . . , 1aK, . . . , 1aN. The selection circuit unit 2 preferentially selects one of bits corresponding to bit arithmetic circuits from which a signal that inversion is possible is outputted from among the bit arithmetic circuits 1a1, . . . , 1aK and determines the bit as an inversion bit. For example, the selection circuit unit 2 performs selection of the inversion bit based on a random number bit outputted from the random number generation unit 4. The selection circuit unit 2 outputs a signal indicative of the selected inversion bit to the bit arithmetic circuits 1a1, . . . , 1aK. The signal indicative of the inversion bit includes identification information (index=j) of the inversion bit, a flag indicative of the reversibility (fig$_j$=1) and a signal indicative of a current value $q_j$ of the inversion bit (value before the inversion in the current cycle). However, no bit may be inverted. In the case where no bit is to be inverted, the selection circuit unit 2 outputs fig$_j$=0.

The threshold value generation unit 3 generates a threshold value that is used when the reversibility of a bit is decided for each of the bit arithmetic circuits 1a1, . . . , 1aK, . . . , 1aN. The threshold value generation unit 3 outputs a signal indicative of such threshold value to each of the bit arithmetic circuits 1a1, . . . , 1aK, . . . , 1aN. As hereinafter described, the threshold value generation unit 3 uses a parameter (temperature parameter) T indicative of a temperature and a random number in generation of a threshold value. The threshold value generation unit 3 includes a random number generator for generating the random number. The threshold value generation unit 3 preferably includes a random number generator individually for each of the bit arithmetic circuits 1a1, . . . , 1aK, . . . , 1aN, which individually perform generation and supply of a threshold value. However, in the threshold value generation unit 3, a random number generator may be shared by a given number of bit arithmetic circuits.

The random number generation unit 4 generates and outputs a random number bit to the selection circuit unit 2. The random number bit generated by the random number generation unit 4 is used for selection of an inversion bit by the selection circuit unit 2.

The setting changing unit 5 performs change of a first bit number (spin bit number) of a bit string (spin bit string) representative of a state of the Ising model of a calculation target from among the bit arithmetic circuits 1a1, . . . , 1aK, . . . , 1aN. Further, the setting changing unit 5 performs change of a second bit number of a weighting factor for each of the bit arithmetic circuits equal in number to the first bit number.

Here, the first bit number (spin bit number) is equivalent to the scale of the problem (combination optimization problem). The second bit number (bit number of a weighting factor) is equivalent to the accuracy of the problem. The optimization problem arithmetic apparatus 101 controls the setting to the setting changing unit 5 in regard to the first and second bit numbers to implement arithmetic operation by a partition mode and an execution mode determined in response to the scale and the requested accuracy of the combinatorial optimization problem.

Now, a circuit configuration of the bit arithmetic circuit is described. Although description is given principally of the bit arithmetic circuit 1a1 (index=0), also the other bit arithmetic circuits are implemented by a similar circuit configuration (for example, it is sufficient if, for the Xth (X is an integer equal to or greater than 1 but equal to or smaller than N) bit arithmetic circuit, index=X−1 is applied).

The bit arithmetic circuit 1a1 includes a storage unit 11, an accuracy switching circuit 12, an inversion decision unit 13, a bit holding unit 14, an energy variation calculation unit 15 and a state transition decision unit 16.

The storage unit 11 is, for example, a register or a static random access memory (SRAM). The storage unit 11 stores a weighting factor between an own bit (here, a bit of index=0) and a different bit. Here, for the spin bit number (first bit number) K, the total number of weighting factors is $K^2$. In the storage unit 11, for the bit of index=0, K weighting factors $W_{00}, W_{01}, \ldots, W_{0,K-1}$ are stored. Here, the weighting factor is represented by a second bit number L. Accordingly, in the storage unit 11, K×L bits are required in order to store the weighting factors. It is to be noted that the storage unit 11 may be provided outside the bit arithmetic circuit 1a1 but inside the arithmetic unit 102 (this similarly applies also to the storage unit of the other bit arithmetic circuits).

If one of bits of a spin bit string is inverted, the accuracy switching circuit 12 reads out a weighting factor for the inverted bit from the own storage unit 11 (of the bit arithmetic circuit 1a1) and outputs the read out weighting factor to the energy variation calculation unit 15. For example, the accuracy switching circuit 12 accepts identification information of the inversion bit from the selection circuit unit 2, reads out a weighting factor corresponding to the set of the inversion bit and the own bit from the storage unit 11 and outputs the weighting factor to the energy variation calculation unit 15.

At this time, the accuracy switching circuit 12 performs reading out of a weighting factor represented by the second bit number set by the setting changing unit 5. The accuracy switching circuit 12 changes the second bit number of the factor to be read out from the storage unit 11 in response to the setting of the second bit number by the setting changing unit 5.

For example, the accuracy switching circuit 12 includes a selector for reading out a bit string of a given bit number from the storage unit 11. In the case where the given bit number to be read out by the selector is greater than the second bit number, the accuracy switching circuit 12 reads out a unit bit string including a weighting factor corresponding to the inversion bit by the selector and extracts a weighting factor represented by the second bit number from the read out unit bit string. As an alternative, in the case where the given bit number to be read out by the selector is smaller than the second bit number, the accuracy switching circuit 12 may extract a weighting factor represented by the second bit number from the storage unit 11 by coupling a plurality of bit strings read out by the selector.

The inversion decision unit 13 accepts a signal outputted from the selection circuit unit 2 and indicative of index=j and $fig_j$ and decides based on the signal whether or not the own bit is selected as the inversion bit. In the case where the own bit is selected as the inversion bit (for example, in the case where index=j indicates the own bit and $fig_j$ indicates that inversion is possible), the inversion decision unit 13 inverts the bit stored in the bit holding unit 14. For example, in the case where the bit held in the bit holding unit 14 is 0, the bit is changed to 1. On the other hand, in the case where the bit held in the bit holding unit 14 is 1, the bit is changed to 0.

The bit holding unit 14 is a register that holds 1 bit. The bit holding unit 14 outputs the held bit to the energy variation calculation unit 15 and the selection circuit unit 2.

The energy variation calculation unit 15 calculates the energy variation value $\Delta E_0$ of the Ising model using the weighting factor read out from the storage unit 11 and outputs the energy variation value $\Delta E_0$ to the state transition decision unit 16. For example, the energy variation calculation unit 15 accepts a value of the inversion bit (value before the inversion in the current cycle) from the selection circuit unit 2 and calculates $\Delta h_0$ by the expression (4) given hereinabove in response to whether the inversion bit is to be inverted from 1 to 0 or from 0 to 1. Then, the energy variation calculation unit 15 adds $\Delta h_0$ to $h_0$ in the preceding cycle to update $h_0$. The energy variation calculation unit 15 includes a register for holding $h_0$ and holds $h_0$ after updated by the register.

Further, the energy variation calculation unit 15 accepts the own bit at present from the bit holding unit 14 and calculates the energy variation value $\Delta E_0$ of the Ising model in the case where the own bit is to be inverted from 0 to 1 if it is 0 but is to be inverted from 1 to 0 if it is 1 by the expression (2) given hereinabove. The energy variation calculation unit 15 outputs the calculated energy variation value $\Delta E_0$ to the state transition decision unit 16.

The state transition decision unit 16 outputs a signal $fig_0$ indicative of reversibility of the own bit in response to calculation of an energy variation by the energy variation calculation unit 15 to the selection circuit unit 2. For example, the state transition decision unit 16 is a comparator that accepts the energy variation value $\Delta E_0$ calculated by the energy variation calculation unit 15 and compares reversibility of the own bit in response to comparison of the energy change value $\Delta E_0$ with the threshold value generated by the threshold value generation unit 3. Here, the decision by the state transition decision unit 16 is described.

It is known that, in simulated annealing, if an allowance probability $p(\Delta E, T)$ of a state transition that causes a certain energy variation $\Delta E$ is determined as indicated by the expression (5) given below, the state reaches an optimum solution (ground state) in the limit of time (number of iterations) infinity.

$$p(\Delta E, T) = f\left(-\frac{\Delta E}{T}\right) \qquad (5)$$

In the expression (5) above, T is the temperature parameter T described hereinabove. Here, as the function f, the following expression (6) (metropolis algorithm) or the expression (7) (Gibbs method) given below is used.

$$f_{metro}(x) = \min(1, e^x) \qquad (6)$$

$$f_{Gibbs}(x) = \frac{1}{1+e^{-x}} \qquad (7)$$

The temperature parameter T is represented, for example, by the following expression (8). For example, the temperature parameter T is given by a function that logarithmically decreases in response to the number of iterations. For example, the constant c is determined in response to the problem.

$$T = \frac{T_0 \log(c)}{\log(t+c)} \qquad (8)$$

Here, $T_0$ is an initial temperature value and preferably has a value sufficiently high value in response to the problem.

In the case where the allowance probability $p(\Delta E, T)$ represented by the expression (5) above is used, if it is assumed that a steady state is reached after sufficient iterations of a state transition at a certain temperature, the state is generated in accordance with a Boltzmann distribution. For example, the occupancy probability of each individual state follows a Boltzmann distribution in a thermal equilibrium in thermodynamics. Therefore, by creating a state in accordance with a Boltzmann distribution at a certain temperature and then gradually lowering the temperature such that a state in accordance with a Boltzmann distribution is generated at a temperature lower than the certain temperature, a state in accordance with a Boltzmann distribution at different temperatures may be followed. Then, when the temperature is decreased to 0, a state (ground state) of the lowest energy by the Boltzmann distribution at the temperature 0 is implemented at a high possibility. Since this state is very similar to a state variation when a material is annealed, this method is called simulated annealing. At this time, that a state transition that the energy increases occurs stochastically is equivalent to thermal excitation in physics.

For example, a circuit that outputs a flag (fig=1) indicating that a state transition that causes an energy variation $\Delta E$ is allowed in the allowance probability $p(\Delta E, T)$ may be implemented by a comparator that outputs a value according to comparison between $f(-\Delta E/T)$ and a uniform random number u having a value within an interval [0, 1].

However, a same function may be implemented even if such transformation as described below is performed. Even if a same monotonically increasing function is applied to two numbers, the magnitude relation does not change. Accordingly, even if a same monotonically increasing function is applied to the two inputs of the comparator, the output of the comparator does not change. For example, as the monotonically increasing function to be applied to $f(-\Delta E, T)$, an inverse function $f^{-1}(-\Delta E, T)$ of $f(-\Delta E, T)$ may be used, and as the monotonically increasing function to be applied to the uniform random number u, $f^{-1}(u)$ where $-\Delta E/T$ of $f^{-1}(-\Delta E, T)$ is changed to u may be used. In this case, the circuit that has a function similar to that of the comparator described above may be a circuit that outputs 1 when $-\Delta E/T$ is greater than $f^{-1}(u)$. Further, since the temperature parameter T is in the positive, the state transition decision unit 16 may be a circuit that outputs $fig_0=1$ when $-\Delta E$ is greater than $T \cdot f^{-1}(u)$ (or when $\Delta E$ is smaller than $-(T \cdot f^{-1}(u))$).

The threshold value generation unit 3 generates a uniform random number u and outputs the value of f (u) using a conversion table for converting the uniform random number u into a value of $f^{-1}(u)$ described above. In the case where the metropolis method is applied, $f^{-1}(u)$ is given by the following expression (9). Meanwhile, in the case where Gibbs method is applied, $f^{-1}(u)$ is given by the expression (10) given below.

$$f^{-1}_{metro}(u) = \log(u) \qquad (9)$$

$$f^{-1}_{Gibbs}(u) = \log\left(\frac{u}{1-u}\right) \qquad (10)$$

The conversion table is stored into a memory (not depicted) such as a random access memory (RAM) or a flash memory coupled to the threshold value generation unit 3. The threshold value generation unit 3 outputs the product $(T \cdot f^{-1}(u))$ of the temperature parameter T and $f^{-1}(u)$ as a threshold value. Here, $T \cdot f^{-1}(u)$ corresponds to thermal excitation energy.

It is to be noted that, when $fig_j$ is inputted from the selection circuit unit 2 to the state transition decision unit 16 and indicates that a state transition is not allowed (for example, when no state transition occurs), the state transition decision unit 16 may perform comparison with a threshold value after an offset value is added to $-\Delta E_0$. Further, in the case where it continues that no state transition occurs, the state transition decision unit 16 may cause the offset value to be added to be increased. On the other hand, when $fig_j$ indicates that a state transition is allowed (for example, when a state transition occurs), the state transition decision unit 16 sets the offset value to 0. Addition of the offset value to $-\Delta E_0$ or increase of the offset value makes it ready to allow a state transition and, in the case where the current state is in a local solution, escape from the local solution is promoted.

A spin bit string in the case where the temperature parameter T is set gradually smaller in this manner and the value of the temperature parameter T is decreased, for example, by a given number of times (or in the case where the temperature parameter T reaches a minimum value) is retained into the bit arithmetic circuits $1a1, \ldots, 1aK$. The arithmetic unit 102 outputs the spin bit string in the case where the value of the temperature parameter T is decreased by the given number of times (or in the case where the temperature parameter T reaches the minimum value) as a solution. The arithmetic unit 102 may include a control unit (not depicted) that reads out and outputs the temperature parameter T, settings of a weighting factor to the storage units for the bit arithmetic circuits $1a1, \ldots, 1aK$ and a spin bit string retained in the bit arithmetic circuits $1a1, \ldots, 1aK$.

In the arithmetic unit 102, the spin bit number (first bit number) of an Ising model and the bit number (second bit number) of a weighting factor between bits can be changed by the setting changing unit 5. Here, the spin bit number is equivalent to a scale of a circuit for implementing the Ising model (scale of the problem). As the scale increases, the arithmetic unit 102 may be applied to a combinatorial optimization problem having an increasing number of combination candidates. Meanwhile, the bit number of a weighting factor corresponds to an accuracy of a representation of an interrelation between bits (accuracy of a conditional representation in the problem). As the accuracy increases, a condition for an energy variation $\Delta E_i$ upon spin inversion may be set in increasing detail. In a certain problem, the spin bit number may be great while the bit number representative of a weighting factor is small. In another problem, the spin bit number may be small while the bit number representative of a weighting factor is great. It is inefficient to individually fabricate optimization apparatuses suitable for individual problems.

Therefore, in the arithmetic unit 102, the scale and the accuracy may be made variable by configuring the setting changing unit 5 so as to make it possible to set a spin bit number representative of a state of an Ising model and a bit number of a weighting factor. For example, the partition mode may be changed. As a result, it is possible for one arithmetic unit 102 to implement a scale and an accuracy suitable for a problem.

For example, each of the bit arithmetic circuits $1a1, \ldots, 1aK, \ldots, 1aN$ includes an accuracy switching circuit, by which the bit length of a weighting factor to be read out from the own storage unit is switched in response to a setting of the setting changing unit 5. Further, the selection circuit unit 2 inputs a signal indicative of an inversion bit to bit arithmetic circuits the number of which (for example, the number is K) corresponds to a spin bit number set by the setting changing unit 5 and selects an inversion bit from among the bits corresponding to the number of (K) bit arithmetic circuits. Consequently, even if optimization apparatuses each having a scale and an accuracy according to a problem are not fabricated individually, the single arithmetic unit 102 may implement an Ising model with the scale and the accuracy according to the problem.

Here, the storage unit provided in each of the bit arithmetic circuits $1a1, \ldots, 1aN$ is implemented by a storage device of a comparatively small capacity such as an SRAM as described hereinabove. Therefore, also it is considered that, if the spin bit number increases, depending upon the bit number of a weighting factor, the storage capacity of the storage unit may be insufficient. On the other hand, according to the arithmetic unit 102, also it is possible for the setting changing unit 5 to set a scale and an accuracy such that restriction to the capacity of the storage unit may be satisfied. For example, it is conceivable for the setting changing unit 5 to set the bit number of a weighting factor so as to decrease as the spin bit number increases. Also it is conceivable for the setting changing unit 5 to set the spin bit number so as to decrease as the bit number of a weighting factor increases.

Further, in the example described above, K bit arithmetic circuits from among N bit arithmetic circuits are used in an Ising model. In the case where $N-K \geq K$, the arithmetic unit 102 may implement an Ising model same as the Ising model described above using K bit arithmetic circuits from among the remaining N-K bit arithmetic circuits such that the degree of parallelism of processing of a same problem is increased by both Ising models to speed up the calculation.

Furthermore, the arithmetic unit 102 may implement a different Ising model corresponding to a different problem using some of the remaining N-K bit arithmetic circuits such that arithmetic operation of the different problem is performed in parallel with the problem represented by the Ising model described above.

As an alternative, the arithmetic unit 102 may not use the remaining N-K bit arithmetic circuits. In this case, the selection circuit unit 2 may compulsorily set all of the flags fig that are to be outputted from the remaining N-K bit arithmetic circuits to zero such that the bits corresponding to the remaining N-K bit arithmetic circuits are not selected at all as an inversion candidate.

Now, an example of a system configuration of an information processing system 300 including the optimization problem arithmetic apparatus 101 depicted in FIG. 1 is described.

Figure 3:
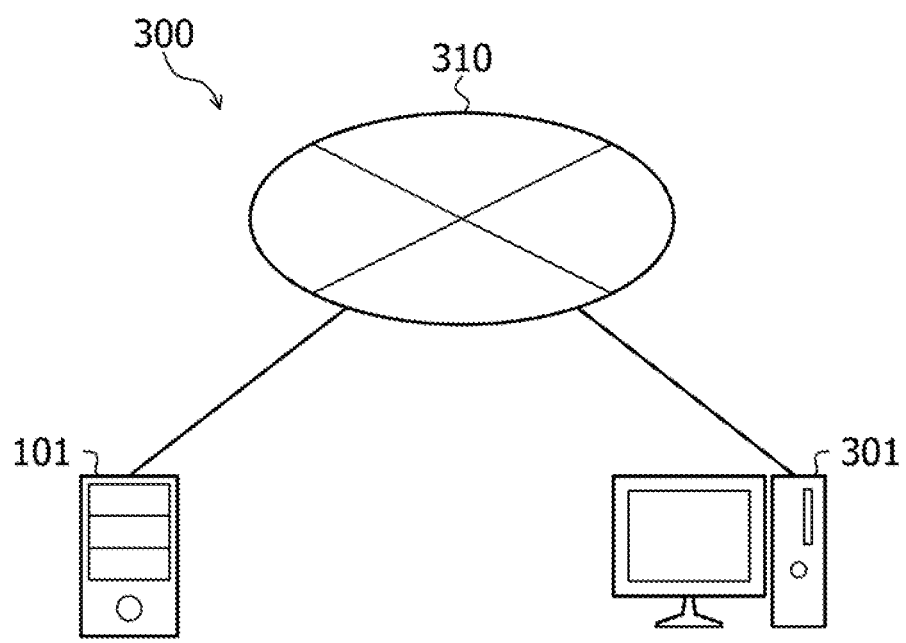
FIG. 3 is an explanatory view depicting an example of a system configuration of an information processing system.

FIG. 3 is an explanatory view depicting an example of a system configuration of the information processing system 300. Referring to FIG. 3, the information processing system 300 includes an optimization problem arithmetic apparatus 101 and a client apparatus 301. In the information processing system 300, the optimization problem arithmetic apparatus 101 and the client apparatus 301 are coupled to each other by a wired or wireless network 310. The network 310 is, for example, a local area network (LAN), a wide area network (WAN), the Internet or the like.

The optimization problem arithmetic apparatus 101 provides a function for replacing a combinatorial optimization problem with an Ising model and solving the combinatorial optimization problem by a search for a ground state of the Ising model. The optimization problem arithmetic apparatus 101 is, for example, an on-premise server or a crowd computing server.

The client apparatus 301 is a client computer used by a user and is used for inputting, for example, of a problem to be solved by the user to the optimization problem arithmetic apparatus 101. The client apparatus 301 is, for example, a personal computer (PC), a tablet type PC or the like.

Figure 4:
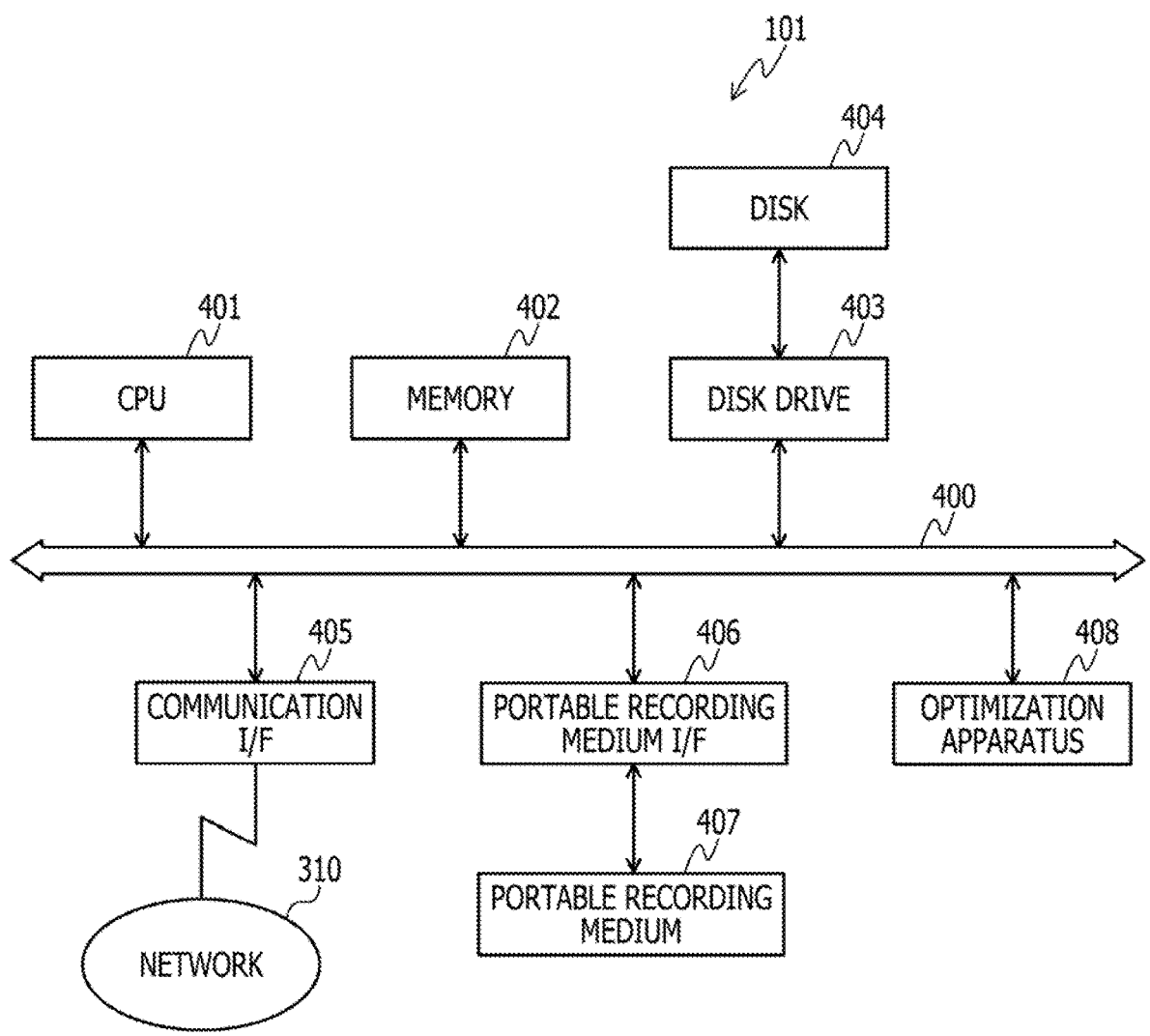
FIG. 4 is a block diagram depicting an example of a hardware configuration of an optimization problem arithmetic apparatus.

FIG. 4 is a block diagram depicting an example of a hardware configuration of an optimization problem arithmetic apparatus. The optimization problem arithmetic apparatus depicted in FIG. 4 may be the optimization problem arithmetic apparatus 101 depicted in FIG. 1. Referring to FIG. 4, the optimization problem arithmetic apparatus 101 includes a central processing unit (CPU) 401, a memory 402, a disk drive 403, a disk 404, a communication interface (I/F) 405, a portable recording medium I/F 406, a portable recording medium 407 and an optimization apparatus 408. The components mentioned are coupled to one another by a bus 400. The bus 400 is, for example, a peripheral component interconnect express (PCIe) bus.

Here, the CPU 401 is responsible for control of the entire optimization problem arithmetic apparatus 101. The CPU 401 may include a plurality of cores. The memory 402 includes, for example, a read only memory (ROM), a RAM, a flash ROM and so forth. For example, the flash ROM stores programs of an operating system (OS); the ROM stores application programs; and the RAM is used as a working area of the CPU 401. A program stored in the memory 402 is loaded into the CPU 401 such that processes coded therein are executed by the CPU 401.

The disk drive 403 controls read/write of data from/into the disk 404 under the control of the CPU 401. The disk 404 stores data written therein under the control of the disk drive 403. The disk 404 may be, for example, a magnetic disk or an optical disk.

The communication I/F 405 is coupled to the network 310 through a communication line and is coupled to an external computer (for example, the client apparatus 301 depicted in FIG. 3) through the network 310. The communication I/F 405 is responsible for interfacing between the network 310 and the inside of the apparatus and controls inputting/outputting from/to the external computer. For the communication I/F 405, for example, a model or a LAN adapter may be adopted.

The portable recording medium I/F 406 controls read/write of data from/into the portable recording medium 407 under the control of the CPU 401. The portable recording medium 407 stores data written therein under the control of the portable recording medium I/F 406. As the portable recording medium 407, for example, a compact disc (CD)-ROM, a digital versatile disk (DVD), a universal serial bus (USB) memory and so forth are applicable.

The optimization apparatus 408 searches for a ground state of an Ising model under the control of the CPU 401. The optimization apparatus 408 is an example of the arithmetic unit 102 depicted in FIG. 1.

It is to be noted that the optimization problem arithmetic apparatus 101 may include, for example, a solid state drive (SSD), an inputting apparatus, a display and so forth in addition to the components described above. Further, the optimization problem arithmetic apparatus 101 may not include, for example, the disk drive 403, disk 404, portable recording medium I/F 406 or portable recording medium 407 among the components described above. Meanwhile, the client apparatus 301 depicted in FIG. 3 includes, for example, a CPU, a memory, a communication I/F, an inputting apparatus, a display and so forth.

Figure 5:
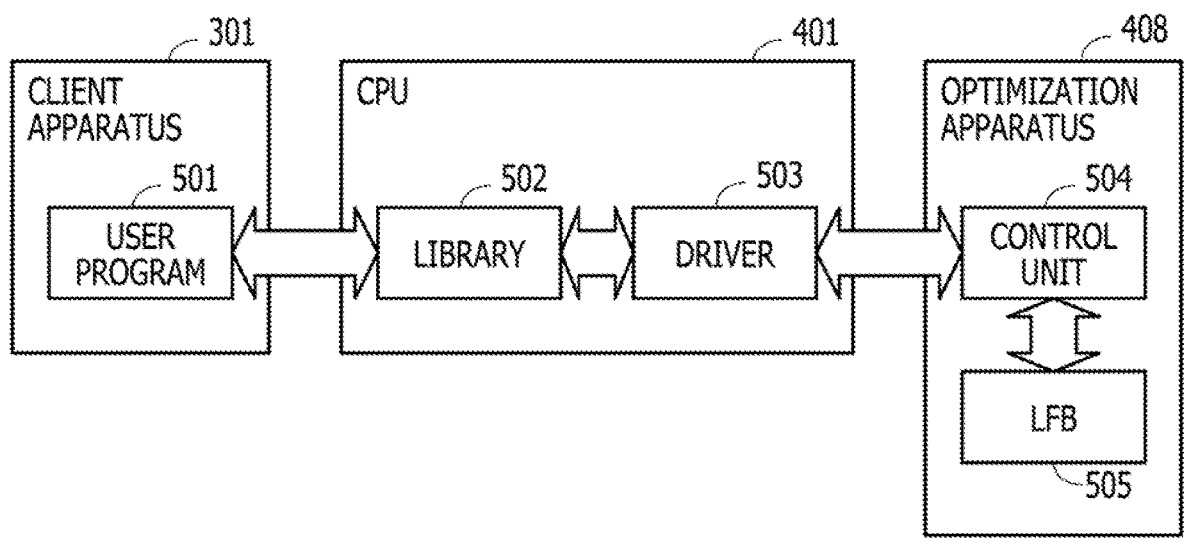
FIG. 5 is an explanatory view depicting an example of a relation of hardware components in an Information processing system.

FIG. 5 is an explanatory view depicting an example of a relation of hardware components in an information processing system. The information processing system described with reference to FIG. 5 may be the information processing system 300 depicted in FIG. 3. Referring to FIG. 5, the client apparatus 301 executes a user program 501. The user program 501 is provided to perform inputting of various data (for example, the substance of a problem to be solved, an operation condition of a utilization schedule of the optimization apparatus 408 and so forth) to the optimization problem arithmetic apparatus 101 and displaying and so forth of an arithmetic operation result by the optimization apparatus 408.

The CPU 401 is a processor (arithmetic unit) for executing a library 502 and a driver 503. A program of the library 502 and a program of the driver 503 are stored, for example, in the memory 402 (refer to FIG. 4).

The library 502 accepts various data inputted by the user program 501 and converts a problem to be solved by the user into a problem for searching for a lowest energy state of an Ising model. The library 502 provides information relating to the problem after the conversion (for example, a spin bit number, a bit number representative of a weighting factor, a value of the weighting factor, an initial value of a temperature parameter and so forth) to the driver 503. Further, the library 502 acquires a search result for a solution by the optimization apparatus 408 from the driver 503, converts the search result into result information that may be recognized easily by the user (for example, information of a result display screen image) and provides the result information to the user program 501.

The driver 503 supplies information provided from the library 502 to the optimization apparatus 408. Further, the driver 503 acquires a search result for a solution by an Ising model from the optimization apparatus 408 and provides the search result to the library 502.

The optimization apparatus 408 includes a control unit 504 and a local field block (LFB) 505 as hardware components.

The control unit 504 includes a RAM for storing an operation condition of the LFB 505 accepted from the driver 503 and controls arithmetic operation by the LFB 505 based on the operation condition. Further, the control unit 504 performs setting of initial values to various registers provided in the LFB 505, storage of weighting factors into the SRAM, reading out of a spin bit string (search result) after completion of the arithmetic operation and so forth. The control unit 504 is implemented, for example, by an FPGA.

The LFB 505 includes a plurality of local field elements (LFEs). The LFEs are unit elements corresponding to spin bits. One LFE corresponds to one spin bit. As hereinafter described, the optimization apparatus 408 includes, for example, a plurality of LFBs.

FIG. 6 is an explanatory view depicting an example of a combinatorial optimization problem. As an example of the combinatorial optimization problem, a traveling salesman problem is considered. Here, it is assumed that a route along which a salesman travels around five cities including cities A, B, C, D and E at the lowest cost (distance, fee and so forth). A graph 601 indicates one route where a city is represented by a node and a movement between cities is represented by an edge. This route is represented, for example, by a matrix 602 in which a row is associated with an order number and a column is associated with a city. The matrix 602 indicates that cities to which a bit "1" is set are visited in an ascending order of the row number.

Further, the matrix 602 can be converted into a binary value 603 corresponding to the spin bit string. In the example of the matrix 602, the binary value 603 is represented by 5×5=25 bits. The bit number of the binary value 603 (spin bit string) increases as the number of cities of a traveling target increases. For example, as the scale of the combinatorial optimization problem increases, an increased number of spin bits are required and the bit number (scale) of the spin bit string increases.

FIG. 7 is an explanatory view depicting an example of a search for a binary value that indicates lowest energy. Referring to FIG. 7, the energy before one bit in a binary value 702 is inverted (before spin inversion) is represented by $E_{init}$ first.

The optimization apparatus 408 calculates the energy variation amount $\Delta E$ when an arbitrary one bit of the binary value 702 is inverted. A graph 701 exemplifies an energy variation by one-bit inversion according to an energy function where the axis of abscissa indicates the binary value and the axis of ordinate indicates the energy. The optimization apparatus 408 determines $\Delta E$, for example, by the expression (2) given hereinabove.

The optimization apparatus 408 applies the calculation described above to all bits of the binary value 702 to calculate the energy variation amount $\Delta E$ by inversion of each bit. For example, when the bit number of the binary value 702 is N, N inversion patterns 704 are obtained. A graph 703 exemplifies the state of the energy variation for each inversion pattern.

The optimization apparatus 408 selects one of the inversion patterns 704, which satisfy an inversion condition (given decision condition between the threshold value and $\Delta E$), at random based on $\Delta E$ of the inversion patterns. The optimization apparatus 408 adds or subtracts $\Delta E$ corresponding to the selected inversion pattern to or from $E_{init}$ before the spin inversion to calculate an energy value E after the spin inversion. The optimization apparatus 408 sets the determined energy value E as $E_{init}$ and performs the procedure described above repeatedly using the binary value 705 after the spin inversion.

As described hereinabove, one factor of W used in the expressions (2) and (3) given hereinabove is a weighting factor for spin inversion indicative of a magnitude of an interaction between bits. The bit number representing a weighting factor is called accuracy. As the accuracy increases, a condition for the energy variation amount $\Delta E$ upon spin inversion may be set in increasing detail. For example, the total size of W is "accuracy×spin bit number× spin bit number" in regard to all combinations of two bits included in the spin bit string. As an example, in the case where the spin bit number is 8K (=8192), the total size of W is "accuracy×8K×8K" bits.

Now, an example of a circuit configuration of the LFB 505 that performs the search exemplified in FIG. 5 is described. The optimization apparatus 408 includes, for example, eight LFBs 505.

Figure 8:
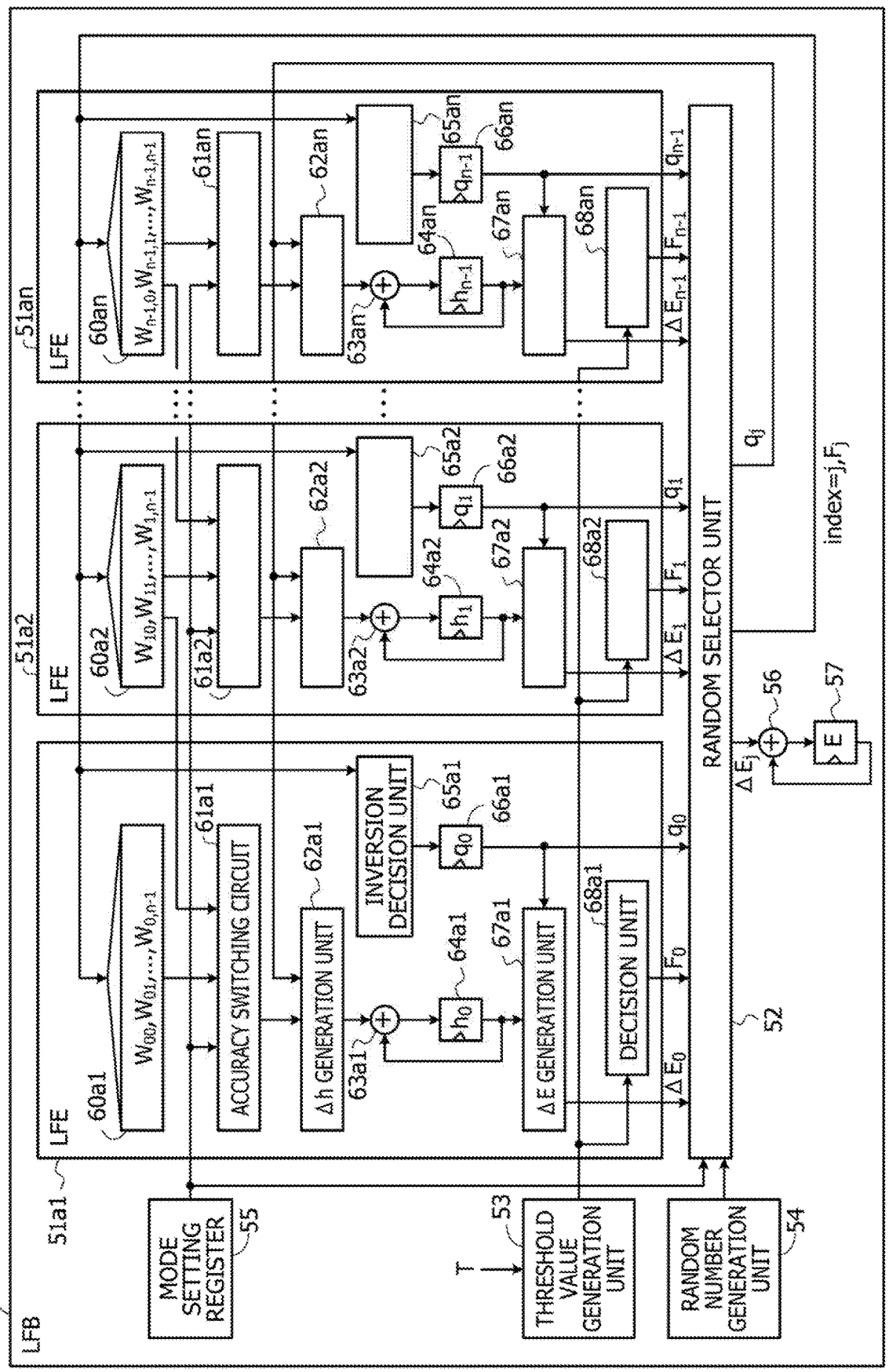
FIG. 8 is an explanatory view depicting an example of a circuit configuration of an LFB.

FIG. 8 is an explanatory view depicting an example of a circuit configuration of an LFB. Referring to FIG. 8, the LFB 505 includes LFEs 51a1, 51a2, . . . , 51an, a random selector unit 52, a threshold value generation unit 53, a random number generation unit 54, a mode setting register 55, an adder 56 and an E storage register 57.

Each of the LFEs 51a1, 51a2, . . . , 51an is used as one bit of a spin bit. n is an integer equal to or greater than 2 and indicates the number of LFEs provided in the LFB 505. With each of the LFEs 51a1, 51a2, . . . , 51an, identification information (index) of the LFE is associated. With the LFEs 51a1, 51a2, . . . , 51an, index=0, 1, . . . , n−1 are associated, respectively. The LFEs 51a1, 51a2, . . . , 51an are an example of the bit arithmetic circuits 1a1, . . . , 1aN depicted in FIG. 2.

In the following, a circuit configuration of the LFE 51a1 is described. Also the LFEs 51a2, . . . , 51an are implemented by a circuit configuration similar to that of the LFE 51a1. It is sufficient, for description of the circuit configuration of the LFEs 51a2, . . . , 51an, if the representation "a1" at the tail end of a reference character of each factor in the following description is replaced with "a2," . . . , "an" (for example, in such a manner that the reference character of "60a1" is replaced with "60an"). Also in regard to a suffix to each value such as h, q, ΔE or W, it may be replaced with a suffix corresponding to each of "a2," . . . , "an."

The LFE 51a1 includes an SRAM 60a1, an accuracy switching circuit 61a1, a Δh generation unit 62a1, an adder 63a1, an h storage register 64a1, an inversion decision unit 65a1, a bit storage register 66a1, a ΔE generation unit 67a1 and a decision unit 68a1.

The SRAM 60a1 stores weighting factors W. The SRAM 60a1 corresponds to the storage unit 11 depicted in FIG. 2. In the SRAM 60a1, weighting factors W from among the weighting factors W of all spin bits, equal in number to the weighting factors W that are to be used in the LFE 51a1, are stored. Therefore, if the spin bit number is K (K is an integer equal to or greater than 2 but equal to or smaller than n), the size of all weighting factors stored in the SRAM 60a1 is "accuracy×K" bits. In FIG. 8, as an example, a case in which the spin bit number K=n is exemplified. In this case, in the SRAM 60a1, weighting factors $W_{00}, W_{01}, \ldots, W_{0,n-1}$ are stored.

The accuracy switching circuit 61a1 acquires index that is identification information of an inversion bit and a flag F indicating that inversion is allowed from the random selector unit 52 and extracts a weighting factor corresponding to the inversion bit from the SRAM 60a1. The accuracy switching circuit 61a1 outputs the extracted weighting factor to the Δh generation unit 62a1. For example, the accuracy switching circuit 61a1 may acquire index and the flag F stored in the SRAM 60a1 by the random selector unit 52 from the SRAM 60a1. As an alternative, the accuracy switching circuit 61a1 may include a signal line (not depicted) for receiving index and the flag F supplied from the random selector unit 52.

Here, the accuracy switching circuit 61a1 accepts a setting of a bit number (accuracy) of a weighting factor set to the mode setting register 55 and switches the bit number of a weighting factor to be read out from the SRAM 60a1 in response to the setting.

For example, the accuracy switching circuit 61a1 includes a selector for reading out a bit string of a given unit number of bits (unit bit string) from the SRAM 60a1. The accuracy switching circuit 61a1 reads out a unit bit string of a bit number r including a weighting factor corresponding to the inversion bit by the selector. For example, in the case where the unit bit number r to be read out by the selector is greater than a bit number z of the weighting factor, the accuracy switching circuit 61a1 shifts the bit portion indicative of the weighting factor corresponding to the inversion bit from within the read out bit string to the least significant bit (LSB) side and substitutes 0 into any other bit portion and then performs reading out of the weighting factor. As an alternative, a case may be conceivable in which the unit bit number r is smaller than the bit number z set by the mode setting register 55. In this case, the accuracy switching circuit 61a1 may combine the plurality of unit bit strings read out by the selector to extract the weighting factor with the set bit number z.

It is to be noted that the accuracy switching circuit 61a1 is coupled also to the SRAM 60a2 provided in the LFE 51a2. As hereinafter described, also it is possible for the accuracy switching circuit 61a1 to read out a weighting factor from the SRAM 60a2.

The Δh generation unit 62a1 accepts a current bit value (bit value before inversion in the current cycle) of the inversion bit from the random selector unit 52, and calculates a variation amount $\Delta h_0$ of a local field $h_0$ by the expression (4) given hereinabove using the weighting factor acquired from the accuracy switching circuit 61a1. The Δh generation unit 62a1 outputs $\Delta h_0$ to the adder 63a1.

The adder 63a1 adds $\Delta h_0$ to the local field $h_0$ stored in the h storage register 64a1 and outputs the sum to the h storage register 64a1.

The h storage register 64a1 fetches a value outputted from the adder 63a1 (local field $h_0$) in synchronism with a dock signal not depicted. The h storage register 64a1 is, for example, a flip-flop. It is to be noted that the initial value of the local field $h_0$ stored in the h storage register 64a1 is a bias factor $b_0$. The initial value is set by the control unit 504.

The inversion decision unit 65a1 accepts index=j of the inversion bit and the flag $F_j$ indicative of the reversibility from the random selector unit 52 and decides whether or not the own bit is selected as the inversion bit. In the case where the own bit is selected as the inversion bit, the inversion decision unit 65a1 inverses the spin bit stored in the bit storage register 66a1.

The bit storage register 66a1 holds a spin bit corresponding to the LFE 51a1. The bit storage register 66a1 is, for example, a flip-flop. The spin bit stored in the bit storage register 66a1 is inverted by the inversion decision unit 65a1. The bit storage register 66a1 outputs the spin bit to the ΔE generation unit 67a1 and the random selector unit 52.

The ΔE generation unit 67a1 calculates the energy variation amount $\Delta E_0$ of the Ising model according to the inversion of the own bit by the expression (2) given hereinabove based on the local field $h_0$ of the h storage register 64a1 and the spin bit of the bit storage register 66a1. The ΔE generation unit 67a1 outputs the energy variation amount $\Delta E_0$ to the decision unit 68a1 and the random selector unit 52.

The decision unit 68a1 compares the energy variation amount $\Delta E_0$ outputted from the ΔE generation unit 67a1 with the threshold value generated by the threshold value generation unit 53 to generate a flag $F_0$ indicative of whether or not inversion of the own bit is to be allowed (indicative of reversibility of the own bit) and outputs the flag $F_0$ to the random selector unit 52. For example, the decision unit 68a1 outputs $F_0=1$ (inversion is allowed) when $\Delta E_0$ is smaller than the threshold value $-(T \cdot f^{-1}(u))$, but outputs $F_0=0$ (inversion is not allowed) when $\Delta E_0$ is equal to or greater than the threshold value $-(T \cdot f^{-1}(u))$. Here, $f^{-1}(u)$ is a function given by one of the expression (9) and the expression (10) in accordance with an applicable rule. Further, u is a uniform random number within the interval [0, 1].

The random selector unit 52 accepts an energy variation amount, a flag indicative of reversibility of a spin bit and the spin bit from each of the LFEs 51a1, 51a2, ..., 51an, and selects a bit (inversion bit) to be inverted from among spin bits whose inversion is allowed.

The random selector unit 52 supplies the current bit value (bit $q_j$) of the selected inversion bit to the Δh generation units 62a1, 62a2, ..., 62an provided in the LFEs 51a1, 51a2, ..., 51an, respectively. The random selector unit 52 is an example of the selection circuit unit 2 depicted in FIG. 2.

The random selector unit 52 outputs index=j of the inversion bit and the flag $F_j$ indicative of the reversibility to the SRAMs 60a1, 60a2, ..., 60an provided in the LFEs 51a1, 51a2, ..., 51an, respectively. It is to be noted that the random selector unit 52 may output index=j of the inversion bit and the flag $F_j$ Indicative of the reversibility to the accuracy switching circuits 61a1, 61a2, ..., 61an provided in the LFEs 51a1, 51a2, ..., 51an, respectively, as described hereinabove.

Further, the random selector unit 52 outputs index=j of the inversion bit and the flag F indicative of the reversibility to the inversion decision units 65a1, 65a2, ..., 65an provided in the LFEs 51a1, 51a2, ..., 51an, respectively. Furthermore, the random selector unit 52 supplies $\Delta E_j$ corresponding to the selected inversion bit to the adder 56.

Here, the random selector unit 52 accepts a setting of a spin bit number in a certain Ising model (for example, the number of LFEs to be used) from the mode setting register 55. For example, the random selector unit 52 uses the LFEs corresponding in number to the set spin bit number in an ascending order of index such that a search for a solution is performed. For example, in the case where K LFEs are to be used from among the n LFEs, the random selector unit 52 selects an inversion bit from within a spin bit string corresponding to the LFEs 51a1, ..., 51aK. At this time, it is conceivable that, for example, the random selector unit 52 compulsorily sets the flag F outputted from each of the n-K LFEs 51a(K−1), ..., 51an that are not used to zero.

The threshold value generation unit 53 generates and supplies a threshold value to be used for comparison with the energy variation amount ΔE to the decision units 68a1, 68a2, ..., 68an provided in the LFEs 51a1, 51a2, ..., 51an, respectively. As described hereinabove, the threshold value generation unit 53 generates a threshold value using the temperature parameter T, a uniform random number u within the interval [0, 1] and $f^{-1}(u)$ indicated by the expression (9) or the expression (10). The threshold value generation unit 53 includes a random number generator, for example, individually for each LFE and generates a threshold value using the uniform random number u for each LFE. However, a random number generator may be shared by several LFEs. The initial value of the temperature parameter T and the decreasing cycle or the decreasing amount of the temperature parameter T in simulated annealing and so forth are controlled by the control unit 504.

The random number generation unit 54 generates a random number bit to be used for selection of an inversion bit in the random selector unit 52 and supplies the random number bit to the random selector unit 52.

The mode setting register 55 supplies a signal indicative of a bit number of a weighting factor (for example, an accuracy of a problem) to the accuracy switching circuits 61a1, 61a2, ..., 61an provided in the LFEs 51a1, 51a2, ..., 51an, respectively. Further, the mode setting register 55 supplies a signal indicative of a spin bit number (for example, a scale of a problem) to the random selector unit 52. Setting of a spin bit number or a bit number of a weighting factor to the mode setting register 55 is performed by the control unit 504. The mode setting register 55 is an example of the setting changing unit 5 depicted in FIG. 2.

The adder 56 adds an energy variation amount $\Delta E_j$ outputted from the random selector unit 52 to the energy value E stored in the E storage register 57 and outputs a result of the addition to the E storage register 57.

The E storage register 57 fetches the energy value E outputted from the adder 56 in synchronism with a dock signal not depicted. The E storage register 57 is, for example, a flip-flop. It is to be noted that the initial value of the energy value E is calculated using the expression (1) given hereinabove by the control unit 504 and is set to the E storage register 57.

For example, in the case where K LFEs are used for a search for a solution, the control unit 504 obtains a spin bit string by reading out the spin bits of the bit storage registers 66a1, ..., 66aK.

Figure 9:
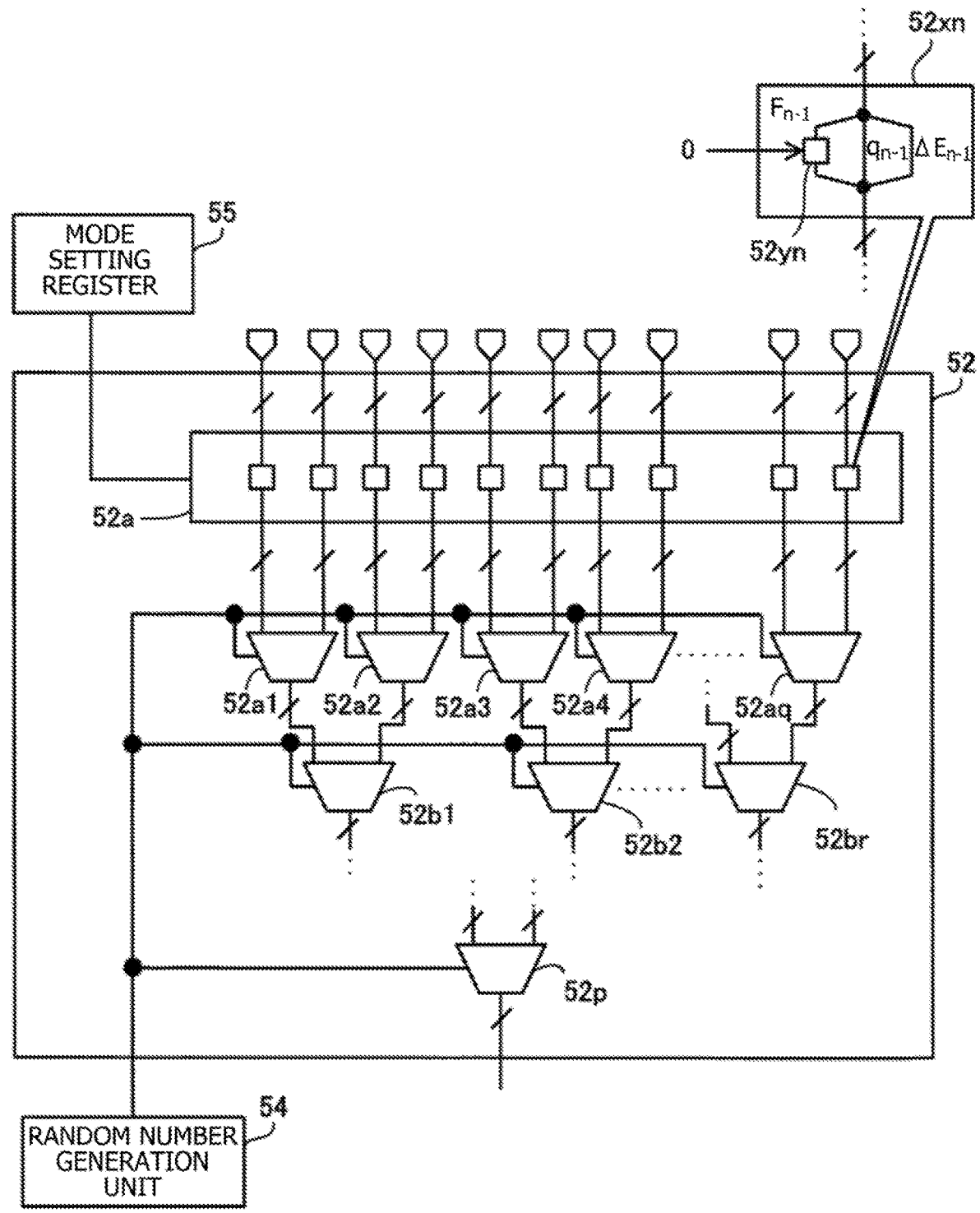
FIG. 9 is an explanatory view depicting an example of a circuit configuration of a random selector unit.

FIG. 9 is an explanatory view depicting an example of a circuit configuration of a random selector unit. Referring to FIG. 9, the random selector unit 52 includes a flag controlling unit 52a and a plurality of selection circuits coupled in a tree state including a plurality of stages.

The flag controlling unit 52a controls the value of a flag to be inputted to each of selection circuits 52a1, 52a2, 52a3, 52a4, ..., 52aq at the first stage in response to a setting of the spin bit number of the mode setting register 55. In FIG. 9, a partial circuit 52xn for controlling the value of a flag to be inputted to one input of the selection circuit 52aq (corresponding to an output of the LFE 51an) is exemplified. A flag setting unit 52yn of the partial circuit 52xn is a switch for compulsorily setting a flag Fn to be outputted from the LFE 51an that is not used to zero.

To each of the selection circuits 52a1, 52a2, 52a3, 52a4, ..., 52aq at the first stage, two sets each including a variable $q_i$, which is outputted from each of the LFEs 51a1, 51a2, ..., 51an, F and $\Delta E_i$, are inputted. For example, to the selection circuit 52a1, a set including a variable $q_0$ outputted from the LFE 51a1, $F_0$ and $\Delta E_0$ and another set including a variable $q_1$ outputted from the LFE 51a2, $F_1$ and $\Delta E_1$ are inputted. Further, to the selection circuit 52a2, a set including a variable $q_2$, $F_2$ and $\Delta E_2$ and another set including a variable $q_3$, $F_3$ and $\Delta E_3$ are inputted, and to the selection circuit 52a3, a set including a variable $q_4$, $F_4$ and $\Delta E_4$ and another set including a variable $q_5$, $F_5$ and $\Delta E_5$ are inputted. Furthermore, to the selection circuit 52a4, a set Including a variable $q_6$, $F_6$ and $\Delta E_6$ and another set including a variable $q_7$, $F_7$ and ΔE are inputted, and to the selection circuit 52aq, a set including a variable $q_{n-2}$, $F_{n-2}$ and $\Delta E_{n-2}$ and another set including a variable $q_{n-1}$, $F_{n-1}$ and $\Delta E_{n-1}$ are Inputted.

Then, each of the selection circuits 52a1, ..., 52aq selects, based on the two sets of the variable $q_i$, $F_i$ and $\Delta E_i$ inputted thereto and a one-bit random number outputted from the random number generation unit 54, a variable $q_i$, $F_i$ and $\Delta E_i$ of one set. At this time, each of the selection circuits 52a1, ..., 52aq preferentially selects a set in which $F_i$ is 1 and selects, in the case where $F_i$ is 1 in both sets, one of the sets based on the one-bit random number (this similarly applies also to the other selection circuits). Here, the random number generation unit 54 generates a one-bit random number individually for each selection circuit and supplies the one-bit random number to each selection circuit. Further, each of the selection circuits 52a1, ..., 52aq generates an identification value of one bit indicative of the variable $q_i$, $F_i$ and $\Delta E_i$ of which set are selected and outputs a signal including the selected variable $q_i$, F and $\Delta E_i$ and the identification value (referred to as state signal). It is to be noted that the number of the selection circuits $52a1, \ldots, 52aq$ at the first stage is one half the number of LFEs $51a1$, $51a2, \ldots, 51an$, for example, n/2.

To each of the selection circuits $52b1, 52b2, \ldots, 52br$ at the second stage, two state signals outputted from the selection circuits $52a1, \ldots, 52aq$ are inputted. For example, to the selection circuit $52b1$, state signals outputted from the selection circuits $52a1$ and $52a2$ are inputted, and to the selection circuit $52b2$, state signals outputted from the selection circuits $52a3$ and $52a4$ are inputted.

Then, each of the selection circuits $52b1, \ldots, 52br$ selects, based on two state signals and a one-bit random number outputted from the random number generation unit 54, one of the two state signals. Further, each of the selection circuits $52b1, \ldots, 52br$ adds, to an identification value included in the selected state signal, one bit such that it indicates which one of the state signals is selected to update the identification value and outputs the selected state signal.

Similar processing is performed also by the selection circuits at the third and succeeding stages and the bit width of an identification value successively increases by one bit at the selection circuit at each stage, and a state signal that is an output of the random selector unit 52 is outputted from the selection circuit $31p$ at the last stage. The identification value included in the state signal outputted from the random selector unit 52 is index indicative of an inversion bit represented by a binary number.

It is to be noted that the random selector unit 52 may accept index corresponding to the LFE together with the flag F from each LFE and output index corresponding to an inversion bit by performing selection of index by each selection circuit similarly to the variable $q_i$, $F_i$ and $\Delta E_i$. In this case, each LFE includes a register for storage of index and outputs index from the register to the random selector unit 52.

In this manner, the random selector unit 52 sets a signal, which is outputted from each of the LFEs $51a(K+1), \ldots, 51an$ other than the LFEs $51a1, \ldots, 51aK$ equal in number to the set spin bit number K from among the LFEs $51a1, \ldots, 51an$ and is indicative of the reversibility, compulsorily so as to indicate that inversion is not allowed. The random selector unit 52 selects an inversion bit based on the signals indicative of the reversibility and outputted from the LFEs $51a1, \ldots, 51aK$ and the signals set to the LFEs $51a(K+1), \ldots, 51an$ and indicating that inversion is not allowed. The random selector unit 52 outputs a signal indicative of the inversion bit to the bit arithmetic circuits $51a1, \ldots, 51aK$ and also to the LFEs $51a(K+1), \ldots, 51an$.

Since the flag F of any LFE that is not used is compulsorily set to 0 under the control of the flag controlling unit 52a in this manner, the bits corresponding to the LFEs that are not used for the spin bit string may be excluded from inversion candidates.

Now, an example of storage of weighting factors into the SRAMs $60a1, 60a2, \ldots, 60an$ of the LFEs $51a1, 51a2, \ldots, 51an$ is described. First, a tradeoff relation between the scale and the accuracy in regard to the SRAM capacity is described.

Figure 10:
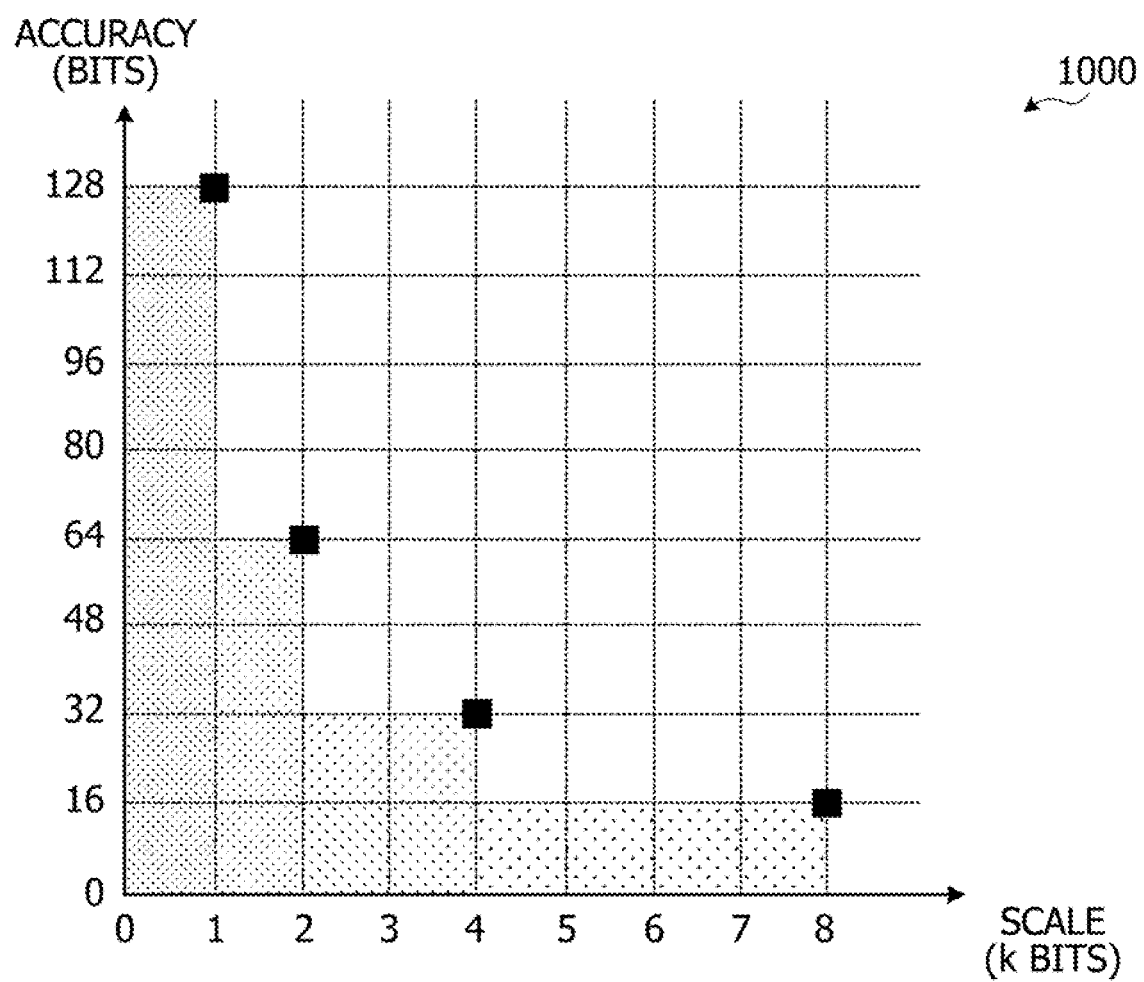
FIG. 10 is an explanatory view depicting an example of a tradeoff relation between a scale and an accuracy.

FIG. 10 is an explanatory view depicting an example of a tradeoff relation between the scale and the accuracy. Referring to FIG. 10, a graph 1000 indicates a tradeoff relation between the scale and the accuracy in the case where the upper limit to the capacity for storage of weighting factors in an SRAM for each LFE is 128K (kilo) bits. Here, 1K=1024. The axis of abscissa of the graph 1000 is the scale (Kbit) and the axis of ordinate is the accuracy (bit). Note that, as an example, n=8192 is assumed.

In this case, for the scale of 1 Kbit, the accuracy is 128 bits in the maximum. Further, for the scale of 2 Kbits, the accuracy is 64 bits in the maximum. For the scale of 4 Kbits, the accuracy is 32 bits in the maximum. For the scale of 8 Kbits, the accuracy is 16 bits in the maximum.

Therefore, it is assumed that the optimization apparatus 408 can utilize, for example, the following four modes. Each mode corresponds to a partition mode. The first mode is a mode of the scale 1 Kbit/accuracy 128 bits. The second mode is a mode of the scale 2 Kbits/accuracy 64 bits. The third mode is a mode of the scale 4 Kbits/accuracy 32 bits. The fourth mode is a mode of the scale 8 Kbits/accuracy 16 bits.

Now, an example of storage of weighting factors according to each of the four modes is described. The weighting factors are individually stored into the SRAMs $60a1$, $60a2, \ldots, 60an$ by the control unit 504. Note that it is assumed that the unit bit number to be read out from the SRAMs $60a1, 60a2, \ldots, 60an$ by the selectors of the accuracy switching circuits $61a1, 61a2, \ldots, 61an$, respectively, is 128 bits as an example.

Figure 11:
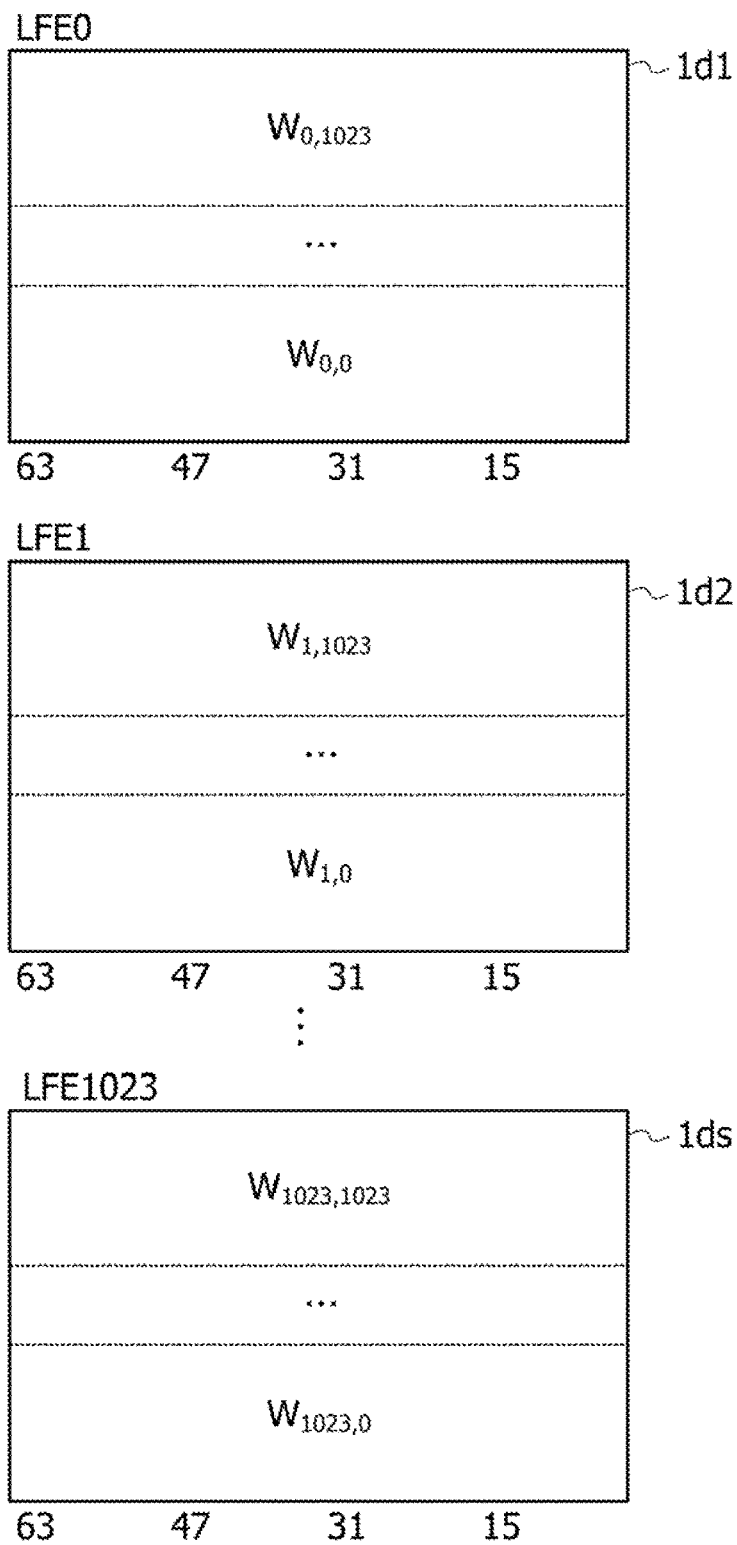
FIG. 11 is an explanatory view (part 1) depicting an example of storage of weighting factors.

FIG. 11 is an explanatory view (part 1) depicting an example of storage of weighting factors. In the case where the first mode (scale 1 Kbit/accuracy 128 bits) is used, the weighting factor W is represented by the following expression (11).

$$W = \begin{pmatrix} W_{0,0} & \cdots & W_{0,1023} \\ \vdots & \ddots & \vdots \\ W_{1023,0} & \cdots & W_{1023,1023} \end{pmatrix} \quad (11)$$

Data $1d1, 1d2, \ldots$, ids indicate an example of storage of weighting factors in the SRAMs $60a1, 60a2, \ldots, 60as$ in the case where the first mode (scale 1 Kbit/accuracy 128 bits) is used. Here, s=1024. The data $1d1, 1d2, \ldots$, ids are stored into the SRAMs $60a1, 60a2, \ldots, 60as$, respectively. In this mode, 1K (=1024) LFEs are used. It is to be noted that, in FIG. 11, the LFEs $51a1, \ldots, 51as$ are sometimes represented, using the individual identification numbers, as LFE0, $\ldots$, LFE1023 (this similarly applies also to the succeeding figures).

The data $1d1$ indicates $W_{0,0}$ to $W_{0,1023}$ stored in the SRAM $60a1$ of the LFE $51a1$ (LFE0). The data $1d2$ indicates $W_{1,0}$ to $W_{1,1023}$ stored in the SRAM $60a2$ of the LFE $51a2$ (LFE1). The data ids indicates $W_{1023,0}$ to $W_{1023,1023}$ stored in the SRAM $60as$ of the LFE $51as$ (LFE1023). The bit number of one weighting factor $W_{ij}$ is 128 bits.

Figure 12:
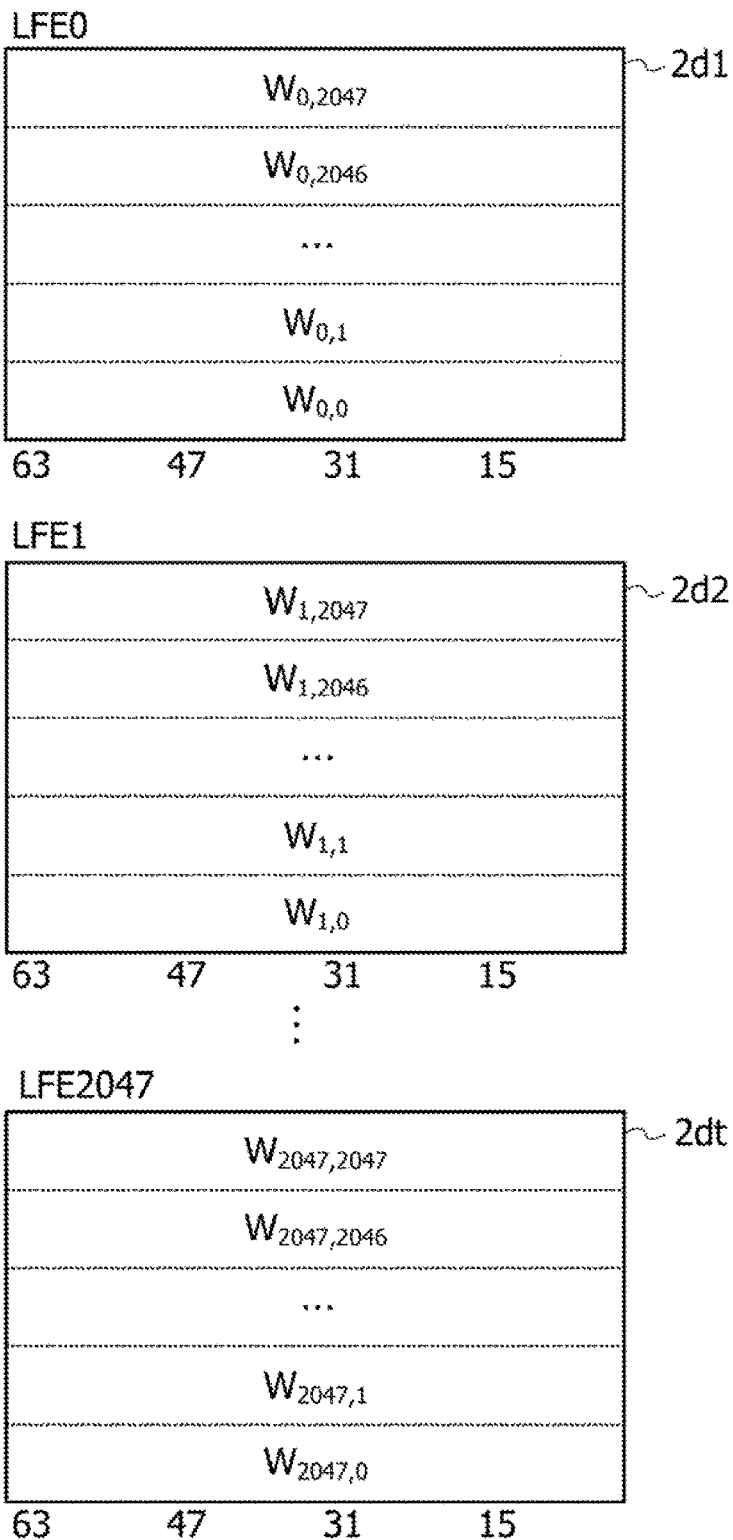
FIG. 12 is an explanatory view (part 2) depicting an example of storage of weighting factors.

FIG. 12 is an explanatory view (part 2) depicting an example of storage of weighting factors. In the case where the second mode (scale 2 Kbits/accuracy 64 bits) is used, the weighting factor W is represented by the following expression (12).

$$W = \begin{pmatrix} W_{0,0} & \cdots & W_{0,2047} \\ \vdots & \ddots & \vdots \\ W_{2047,0} & \cdots & W_{2047,2047} \end{pmatrix} \quad (12)$$

Data $2d1, 2d2, \ldots, 2dt$ indicate an example of storage of weighting factors in the SRAMs $60a1, 60a2, \ldots, 60at$ in the case where the second mode (scale 2 Kbits/accuracy 64 bits) is used. Here, t=2048. The data $2d1, 2d2, \ldots, 2dt$ are stored into the SRAMs $60a1, 60a2, \ldots, 60at$, respectively. In this mode, 2K (=2048) LFEs are used.

The data 2d1 indicates $W_{0,0}$ to $W_{0,2047}$ stored in the SRAM 60a1 of the LFE 51a1 (LFE0). The data 2d2 indicates $W_{1,0}$ to $W_{1,2047}$ stored in the SRAM 60a2 of the LFE 51a2 (LFE1). The data 2dt indicates $W_{2047,0}$ to $W_{2047,2047}$ stored in the SRAM 60at of the LFE S1at (LFE2047). The bit number of one weighting factor $W_{ij}$ is 64 bits.

FIG. 13 is an explanatory view (part 3) depicting an example of storage of weighting factors. In the case where the third mode (scale 4 Kbits/accuracy 32 bits) is used, the weighting factor W is represented by the following expression (13).

$$W = \begin{pmatrix} W_{0,0} & \cdots & W_{0,4095} \\ \vdots & \ddots & \vdots \\ W_{4095,0} & \cdots & W_{4095,4095} \end{pmatrix} \quad (13)$$

Data 3d1, 3d2, . . . , 3du indicate an example of storage of weighting factors in the SRAMs 60a1, 60a2, . . . , 60au in the case where the third mode (scale 4 Kbits/accuracy 32 bits) is used. Here, u=4096. The data 3d1, 3d2, . . . , 3du are stored into the SRAMs 60a1, 60a2, . . . , 60au, respectively. In this mode, 4K (=4096) LFEs are used.

The data 3d1 indicates $W_{0,0}$ to $W_{0,4095}$ stored in the SRAM 60a1 of the LFE 51a1 (LFE0). The data 3d2 indicates $W_{1,0}$ to $W_{1,4095}$ stored in the SRAM 60a2 of the LFE 51a2 (LFE1). The data 3du indicates $W_{4095,0}$ to $W_{4095,4095}$ stored in the SRAM 60au of the LFE 51au (LFE4095). The bit number of one weighting factor $W_{ij}$ is 32 bits.

FIG. 14 is an explanatory view (part 4) depicting an example of storage of weighting factors. In the case where the fourth mode (scale 8 Kbits/accuracy 16 bits) is used, the weighting factor W is represented by the following expression (14).

$$W = \begin{pmatrix} W_{0,0} & \cdots & W_{0,8191} \\ \vdots & \ddots & \vdots \\ W_{8191,0} & \cdots & W_{8191,8191} \end{pmatrix} \quad (14)$$

Data 4d1, 4d2, . . . , 4dn indicate an example of storage of weighting factors in the SRAMs 60a1, 60a2, . . . , 60an in the case where the fourth mode (scale 8 Kbits/accuracy 16 bits) is used. Here, n=8192. The data 4d1, 4d2, . . . , 4dn are stored into the SRAMs 60a1, 60a2, . . . , 60an, respectively. In this mode, 8K (=8192) LFEs are used.

The data 4d1 indicates $W_{0,0}$ to $W_{0,8191}$ stored in the SRAM 60a1 of the LFE 51a1 (LFE0). The data 4d2 indicates $W_{1,0}$ to $W_{1,8191}$ stored in the SRAM 60a2 of the LFE 51a2 (LFE1). The data 4dn indicates $W_{8191,0}$ to $W_{8191,8191}$ stored in the SRAM 60an of the LFE 51an (LFE8191). The bit number of one weighting factor $W_{ij}$ is 16 bits.

Now, an arithmetic processing procedure of the optimization apparatus 408 is described. It is to be noted that initial values and operation conditions according to a problem are inputted to the optimization apparatus 408. The initial values include, for example, initial values of the energy value E, local field $h_j$, spin bit $q_j$ and temperature parameter T, weighting factor W and so forth. The operation conditions include those of an update time number N1 of a state with one temperature parameter, a change time number N2 of the temperature parameter, the decreasing width of the temperature parameter, and so forth. The control unit 504 sets the inputted initial values and operation conditions to the registers and the SRAMs of the LFEs described hereinabove.

Figure 15:
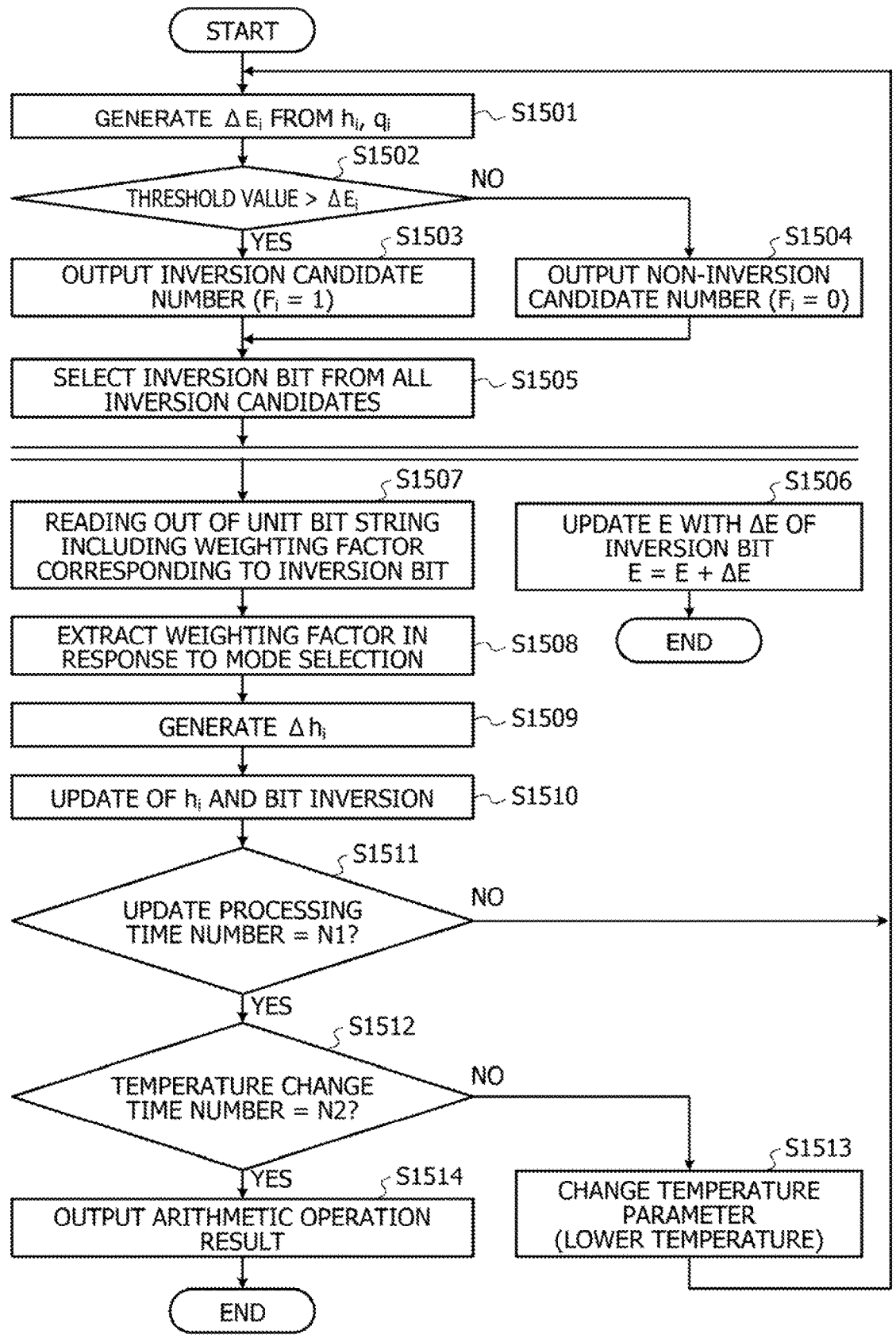
FIG. 15 is a flow chart depicting an example of an arithmetic operation processing procedure of an optimization apparatus.

FIG. 15 is a flow chart depicting an example of the arithmetic operation processing procedure of the optimization apparatus 408. In the description of FIG. 15, it is written that the LFE corresponding to index=i is the LFE 51ax (the first LFE is the LFE 51a1 and the nth LFE is the LFE 51an). Also each component included in the LFE 51ax is written with "x" added to the tall end of a reference character like, for example, SRAM 60ax. Arithmetic operations by the LFEs 51a1, . . . , 51an are executed in parallel.

Referring to the flow chart of FIG. 15, the ΔE generation unit 67ax generates an energy variation amount $\Delta E_i$ in the case where the bit $q_i$ is inverted based on the local field $h_i$ stored in the h storage register 64ax and the bit $q_i$ stored in the bit storage register 66ax (step S1501). For generation of $\Delta E_i$, the expression (2) given hereinabove is used.

The decision unit 68ax compares the energy variation amount $\Delta E_i$ generated by the ΔE generation unit 67ax and the threshold value (=−(T·f$^{-1}$(u))) generated by the threshold value generation unit 53 with each other to decide whether or not the threshold value>$\Delta E_i$ is satisfied (step S1502). Here, in the case where the threshold value >$\Delta E_i$(step S1502: Yes) is satisfied, the processing advances to step S1503. In the case where the threshold value≤$\Delta E_i$ (step S1502: No) is satisfied, the processing advances to step S1504.

The decision unit 68ax outputs an inversion candidate signal ($F_i$=1) to the random selector unit 52 (step S1503). Then, the processing advances to step S1505.

The decision unit 68ax outputs a non-inversion candidate signal ($F_i$=0) to the random selector unit 52 (step S1504). Then, the processing advances to step S1505.

At step S1505, the random selector unit 52 selects one inversion bit from among all inversion candidates (bits corresponding to the LFEs that satisfy $F_i$=1) outputted from the LFEs 51a1, . . . , 51an. The random selector unit 52 outputs index=j, $F_j$ and $q_j$ corresponding to the selected inversion bit to the LFEs 51a1, . . . , 51an. Further, the random selector unit 52 outputs $\Delta E_j$ corresponding to the selected inversion bit to the adder 56. Consequently, the next steps S1506 (energy update process) and S1507 (state update process) are started in parallel.

The adder 56 adds the energy variation amount ΔE corresponding to the inversion bit to the energy value E to update the energy value E stored in the E storage register 57 (step S1506). For example, E=E+ΔE. Then, the energy update process ends.

The accuracy switching circuit 61ax acquires index=j and the flag $F_j$ corresponding to the inversion bit and reads out a unit bit string including a weighting factor corresponding to the inversion bit from the SRAM 60ax (step S1507). The unit bit string is a unit of a bit string that is read out all at once from the SRAM 60ax by the selector of the accuracy switching circuit 61ax. The bit number of the unit bit string (unit bit number) is 128 bits as an example (may be some other number). In this case, at step S1507, a unit bit string of 128 bits is read out from the SRAM 60ax.

For example, in the case where 128/a (a=1, 2, 4 or 8) bits are selected as the accuracy, the accuracy switching circuit 61ax reads out the "Integer(j/a)"th unit bit string as counted from the top (top is counted as 0th) unit bit string of the SRAM 60ax. Here, Integer(j/a) is a function for extracting the integer part from a value of (j/a).

The accuracy switching circuit 61ax extracts, from the unit bit string read out at step S1507, a weighting factor $W_{ij}$ (weighting factor corresponding to the inversion bit $q_j$) of a bit number according to the mode selection set by the mode setting register 55 (step S1508). For example, where a bit string of z bits is to be extracted from a unit bit string of 128 bits, the accuracy switching circuit 61ax shifts the bit range of z bits corresponding to the inversion bit to the LSB side and sets 0 to the other upper bits to extract a weighting factor of z bits as described hereinabove.

It is to be noted that the accuracy switching circuit 61ax specifies the bit range depending upon to what numbered partition from the top (0th) the bit range corresponds to the inversion bit when the unit bit string read out at step S1507 is divided into partitions of a bit length according to the accuracy from the top.

According to the examples of FIGS. 12 to 14, in the case of the accuracy of 64 bits, the bit range is the 0th partition when j is an even number while the bit range is the first partition when j is an odd number. On the other hand, in the case of the accuracy of 32 bits, the bit range is the 0th partition when mod(j, 4)=0; the bit range is the first partition when mod(j, 4)=1; the bit range is the second partition when mod(j, 4)=2; and the bit range is the third partition when mod(j, 4)=3. Here, mod(u, v) is a function indicative of a remainder when u is divided by v. Also in the case of the accuracy of 16 bits, the "mod(j, 8)"th partition from the top of the read out unit bit string of 128 bits is the bit range corresponding to the inversion bit similarly. It is to be noted that, in the case of the accuracy of 128 bits, the accuracy switching circuit 61ax determines the unit bit string of 128 bits read out at step S1507 as it is as the weighting factor corresponding to the inversion bit.

In the example described above, for the accuracy of 128/a (a=1, 2, 4, 8) bits, the "mod(j, a)"th partition (the size of one partition is 128/a bits) from the top of the unit bit string of 128 bits read out at step S1507 is the bit range Indicative of the weighting factor corresponding to the inversion bit.

The Δh generation unit 62ax generates $\Delta h_i$ based on the inversion direction of the inversion bit and the weighting factor $W_{ij}$ extracted by the accuracy switching circuit 61ax (step S1509). For the generation of $\Delta h_i$, the expression (4) given hereinabove is used. Further, the inversion direction of the inversion bit is decided from the inversion bit $q_j$ outputted from the random selector unit 52 (bit before the inversion in the current cycle).

At step S1510, the adder 63ax adds $\Delta h_i$ generated by the Δh generation unit 62ax to the local field $h_i$ stored in the h storage register 64ax to update the local field $h_i$ stored in the h storage register 64ax. Further, the inversion decision unit 65ax decides based on index=j and the flag $F_j$ outputted from the random selector unit 52 whether or not the own bit is selected as the inversion bit. In the case where the own bit is selected as the inversion bit, the inversion decision unit 65ax inverts the spin bit stored in the bit storage register 66ax, but in the case where the own bit is not selected as the inversion bit, the inversion decision unit 65ax maintains the spin bit of the bit storage register 66ax. Here, the case where the own bit is selected as the inversion bit is a case in which index=j=i and $F_j$=1 are satisfied in regard to the signal outputted from the random selector unit 52.

The control unit 504 decides from the temperature parameter T at present whether or not the update processing time number of each of the spin bits held in the LFEs 51a1, . . . , 51an reaches N1 (whether the update processing time number=N1) (step S1511). In the case where the update processing time number reaches N1 (step S1511: Yes), the processing advances to step S1512. In the case where the update processing time number does not reach N1 (step S1511: No), the control unit 504 increments the update processing time number by 1 and advances the processing to step S1501.

The control unit 504 decides whether or not the update time number of the temperature parameter T reaches N2 (whether or not the temperature changing time number=N2 is satisfied) (step S1512). In the case where the temperature changing time number reaches N2 (step S1512: Yes), the processing advances to step S1514. In the case where the temperature changing time number does not reach N2 (step S1512: No), the control unit 504 increments the temperature changing time number by 1 and advances the processing to step S1513.

The control unit 504 changes the temperature parameter T (step S1513). For example, the control unit 504 decreases the value of the temperature parameter T with a decreasing width according to the operation condition (this is equivalent to that the temperature is lowered). Then, the processing advances to step S1501.

The control unit 504 reads out the spin bit stored in the bit storage register 66ax and outputs the spin bit as an arithmetic operation result (step S1514). For example, the control unit 504 reads out spin bits stored individually in the storage registers 66a1, . . . , 66aK corresponding to the spin bit number K set by the mode setting register 55 and outputs the spin bits to the CPU 401. For example, the control unit 504 supplies the read out spin bit string to the CPU 401. Then, the arithmetic process ends.

It is to be noted that, at step S1505, the random selector unit 52 may exclude LFEs that are not to be used from candidates for bit inversion by compulsorily setting 0 to the value of F to be outputted from the LFEs that are not to be used in response to the setting of the mode setting register 55.

According to the optimization apparatus 408, it is made possible by the mode setting register 55 to set a spin bit number and a weighting factor representative of a state of an Ising model, and a scale and an accuracy suitable for a problem may be implemented by the optimization apparatus 408 of one chip.

For example, the accuracy switching circuit 61ax switches the bit length of a weighting factor to be read out from the SRAM 60ax in response to the setting of the mode setting register 55. By using the accuracy switching circuit 61ax, various accuracies may be implemented without changing the unit bit number to be read out from the SRAM 60ax by the selector of the accuracy switching circuit 61ax as indicated by step S1508. For example, the accuracy may be varied, for example, without requiring remake of signal lines for reading out for the unit bit number from the SRAM 60ax by the selector of the accuracy switching circuit 61ax.

Further, the random selector unit 52 inputs a signal representative of an inversion bit to LFEs the number of which (for example, the number is K) corresponds to the spin bit number set by the mode setting register 55 and selects an inversion bit from among bits corresponding to the number of (K) LFEs. Although the random selector unit 52 inputs the signal indicative of an inversion bit also to the n-K LFEs that are not to be used, by setting the flag F to be outputted from the n-K LFEs compulsorily to 0 (inversion not allowed), the LFEs not to be used are excluded from selection candidates for an inversion bit.

Consequently, even if optimization apparatuses each having a scale and an accuracy according to a problem are not fabricated individually, an Ising model may be implemented with the scale and the accuracy according to the problem by the single optimization apparatus 408.

Now, another example of mode setting is described. For example, the optimization apparatus 408 may also provide a fifth mode of a scale 4 Kbits/accuracy 64 bits in addition to the four modes described hereinabove by storing weighting factors into the SRAMs 60a1, . . . , 60an in the following manner.

Figure 16:
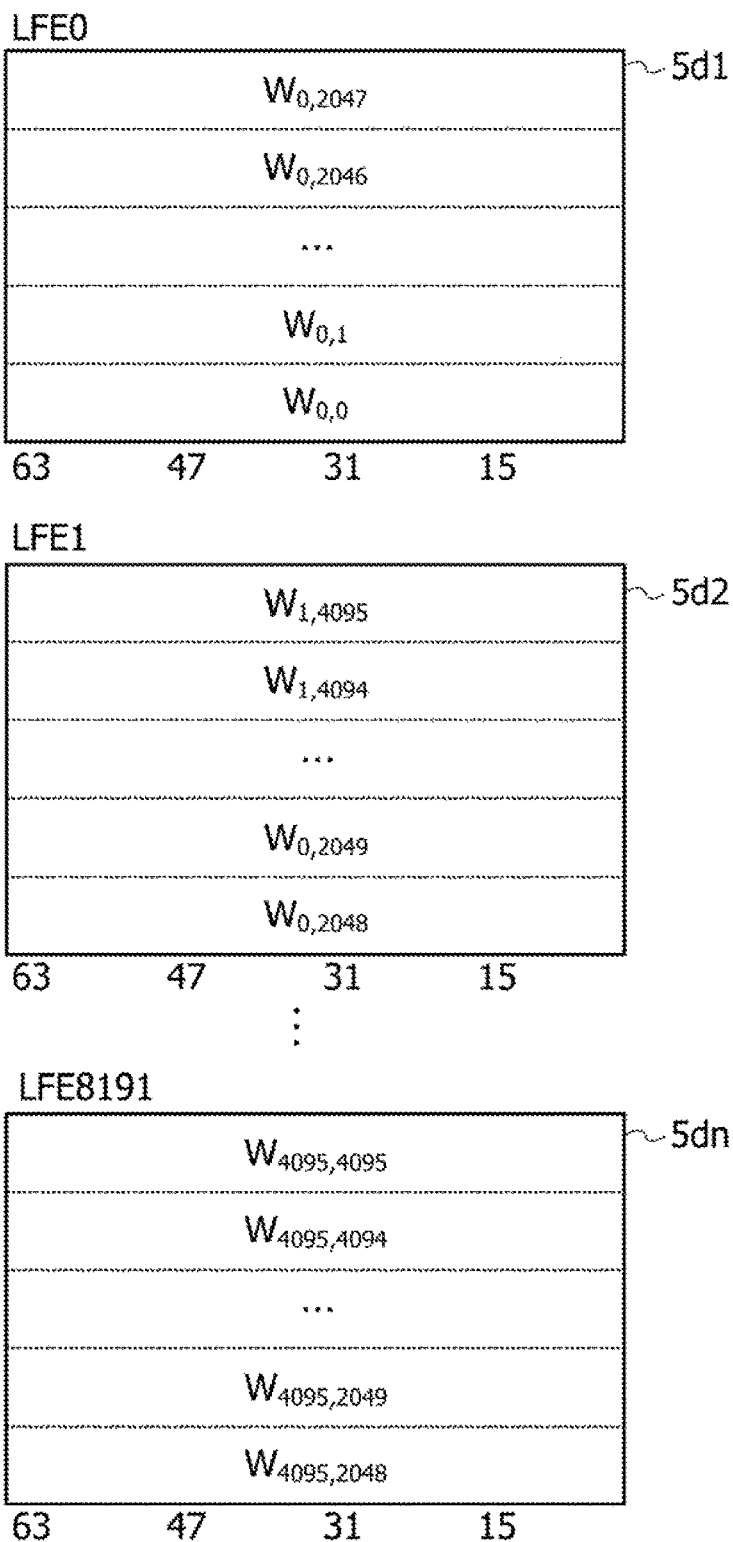
FIG. 16 is an explanatory view (part 5) depicting an example of storage of weighting factors.

FIG. 16 is an explanatory view (part 5) depicting an example of storage of weighting factors. Data 5d1, 5d2, . . . , 5dn indicate an example of storage of weighting factors in the SRAMs 60a1, 60a2, . . . , 60an in the case where the fifth mode (scale 4 Kbits/accuracy 64 bits) is used. Here, n=8192. The data 5d1, 5d2, . . . , 5dn are stored into the SRAMs 60a1, 60a2, . . . , 60an, respectively. In this mode, for a spin bit string, 4K (=4096) LFEs are used, and as a use only for storage of weighting factors, further 4K (=4096) LFEs are used.

The data 5d1 indicates $W_{0,0}$ to $W_{0,2047}$ stored in the SRAM 60a1 of the LFE 51a1 (LFE0). The data 5d2 indicates $W_{0,2048}$ to $W_{0,4095}$ stored in the SRAM 60a2 of the LFE 51a2 (LFE1). The data 5dn indicates $W_{4095,2048}$ to $W_{4095,4095}$ stored in the SRAM 60an of the LFE 51an (LFE8191). The bit number of one weighting factor $W_{ij}$ is 64 bits.

Here, the accuracy switching circuit 61a1 of the LFE 51a1 may acquire a weighting factor also from the SRAM 60a2 of the LFE 51a2 as described hereinabove. For example, the accuracy switching circuit 61a1 may take a method of stopping the functions of the LFE 51a2 other than the SRAM 60a2 and lending the capacity of the SRAM 60a2 to the LFE 51a1 by utilizing a reading out path from the SRAM 60a2 of the LFE 51a2 adjacent the accuracy switching circuit 61a1. For example, it is made possible for the SRAM of an odd-numbered LFE (the top LFE is determined as the first LFE) to utilize the SRAM of an even-numbered LFE (or it can be regarded that it is made possible, where the top LFE is determined as the 0th LFE, for an even-numbered LFE to utilize the SRAM of an odd-numbered LFE).

In the manner, the accuracy switching circuits 61a1, . . . , 61an read out some of weighting factors relating to an own bit and a different bit from the SRAMs of different LFEs that are not used as a spin bit in response to a change of the bit number of weighting factors. In this case, the random selector unit 52 may exclude, for example, bits corresponding to the other LFES that are not used as a spin bit from selection candidates for an inversion bit by setting the flag F that is outputted from such other LFEs compulsorily to 0 (inversion not allowed).

This makes it possible to implement the fifth mode of the scale 4 Kbits/accuracy 64 bits. Similarly, also it is possible to implement a higher accuracy by decreasing the scale. In this manner, according to the optimization apparatus 408, the scale and the accuracy may be changed flexibility in response to a problem.

Now, the storage substance of a mode setting table 1700 provided in the optimization problem arithmetic apparatus 101 is described. The mode setting table 1700 is stored in a storage device such as the memory 402 or the disk 404 depicted in FIG. 4.

FIG. 17 is an explanatory view depicting an example of the storage substance of the mode setting table 1700. Referring to FIG. 17, the mode setting table 1700 includes fields for a partition mode, a scale, a used LFB number and an accuracy and stores mode setting information 1700-1 to 1700-5 as records by setting information to the fields.

Here, the partition mode indicates a mode name of a partition mode. The partition mode "8P (8 division)" is a mode for logically dividing the optimization apparatus 408 into eight partitions. The partition mode "8P (8 division)" corresponds to the first mode described hereinabove.

The partition mode "4P (4 division)" is a mode for logically dividing the optimization apparatus 408 into four partitions. The partition mode "4P (4 division)" corresponds to the second mode described above. The partition mode "2P (2 division)" is a mode for logically dividing the optimization apparatus 408 into two partitions. The partition mode "2P (2 division)" corresponds to the third mode described above.

The partition mode "FULL" is a mode for using the optimization apparatus 408 as a single partition without dividing the optimization apparatus 408. As the partition mode "FULL," two partition modes are provided corresponding to combinations of a scale and an accuracy. The partition mode "FULL (scale: 8K, accuracy: 16 bits)" corresponds to the fourth mode described hereinabove. Meanwhile, the partition mode "FULL (scale: 4K, accuracy: 64 bits)" corresponds to the fifth mode described hereinabove.

The scale indicates a maximum scale of a problem (combination optimization problem) that can be solved by the partition mode. The used LFB number indicates the number of LFBs used in each partition in the partition mode. The accuracy indicates a maximum accuracy of a problem (combination optimization problem) that can be solved in each partition mode.

For example, the mode setting information 1700-1 indicates the scale "1024 bits (1K)" of the partition mode "8P (8 division)," used LFB number "1" and accuracy "128 bits." It is to be noted that, although only one partition mode, the partition mode "8P (8 division)," is provided here, this is not restrictive. For example, as the partition mode "8P (8 division)," a plurality of different modes may be provided which are same in regard to the scale and the used LFB number but are different in accuracy from each other. This similarly applies also to the other partition modes.

Figure 18:
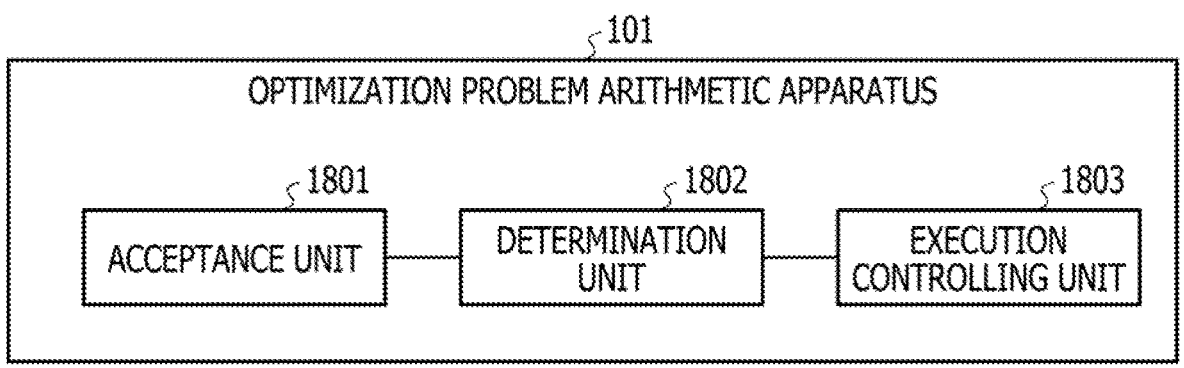
FIG. 18 is a block diagram depicting an example of a functional configuration of an optimization problem arithmetic apparatus.

FIG. 18 is a block diagram depicting an example of a functional configuration of an optimization problem arithmetic apparatus. The optimization problem arithmetic apparatus depicted in FIG. 18 may be the optimization problem arithmetic apparatus 101 depicted in FIG. 1. Referring to FIG. 18, the optimization problem arithmetic apparatus 101 includes an acceptance unit 1801, a determination unit 1802 and an execution controlling unit 1803. The acceptance unit 1801 to execution controlling unit 1803 have functions implemented by causing the CPU 401 to execute a program stored in a storage device such as the memory 402, disk 404 or portable recording medium 407 depicted in FIG. 4 or implemented by the communication I/F 405. A processing result of each functional unit is stored into a storage device such as the memory 402 or the disk 404.

The acceptance unit 1801 accepts a combinatorial optimization problem to the optimization apparatus 408. The combinatorial optimization problem accepted here is a problem of a calculation target to be solved. For example, the acceptance unit 1801 accepts a combinatorial optimization problem by accepting an input of information of the combinatorial optimization problem from the client apparatus 301 depicted in FIG. 3. The information of the combinatorial optimization problem includes, for example, initial values and operation conditions according to the problem.

The determination unit 1802 determines a partition mode and an execution mode of the optimization apparatus 408 in response to the scale or requested accuracy of the combinatorial optimization problem. Here, the partition mode specifies a logical division state of the optimization apparatus 408. Meanwhile, the execution mode specifies a range of hardware resources to be utilized upon arithmetic operation in the partition mode. The execution mode may be determined in a unit of a partition.

For example, the determination unit 1802 acquires a scale and a requested accuracy of the accepted combinatorial optimization problem. The scale of the combinatorial optimization problem here is represented, for example, by a spin bit number of an Ising model of the combinatorial optimization problem. The requested accuracy of the combinatorial optimization problem is represented, for example, by a bit number of a weighting factor that indicates a magnitude of an interaction between bits. For example, the determination unit 1802 acquires a spin bit number (scale) of the problem after the accepted combinatorial optimization problem is converted and a bit number (requested accuracy) representative of a weighting factor from the library 502 (refer to FIG. 5).

Then, the determination unit 1802 decides whether or not the scale of the combinatorial optimization problem is smaller than a maximum scale of a problem that can be solved by the first partition mode. The first partition mode is, for example, a partition mode at present from among a plurality of partition modes that can be set to the optimization apparatus 408.

For example, the determination unit 1802 acquires a maximum scale (spin bit number) of a problem that can be solved by the current partition mode and a maximum accuracy (bit number of a weighting factor) from the library 502. Then, the determination unit 1802 decides whether or not the scale of the combinatorial optimization problem is smaller than the acquired maximum scale.

For example, in the case where the acquired maximum scale is "4096 bits (4K)" and the maximum accuracy is "32 bits," the current partition mode is the partition mode "2P (2 division)" (refer to FIG. 17). In this case, the determination unit 1802 decides whether or not the scale of the combinatorial optimization problem is smaller than the acquired maximum scale "4096 bits (4K)."

It is to be noted that the library 502 may acquire information of the current partition mode by calling a function prepared in advance. For example, the library 502 may acquire a maximum scale of a problem that can be solved by the current partition mode by calling a getMaxNumBit( ) function. Further, the library 502 may acquire a maximum accuracy of a problem that can be solved by the current partition mode by calling a getWeightRange( ) function.

Then, in the case where the scale of the combinatorial optimization problem is smaller than the maximum scale, the determination unit 1802 determines the partition mode of the optimization apparatus 408 to the first partition mode. Further, the determination unit 1802 determines the execution mode of the optimization apparatus 408 to the first execution mode for specifying a range of hardware resources corresponding to the scale of the combinatorial optimization problem.

Here, the first execution mode is an execution mode that defines a range of hardware resources that satisfies the following conditions (i) and (ii) from among execution modes that specify a range of hardware resources to be utilized upon arithmetic operation in the first partition mode.

(i) The maximum scale of a problem that can be solved is smaller than the maximum scale of a program that can be solved by the first partition mode.

(ii) A problem of a scale equal to or greater than the scale of the combinatorial optimization problem may be solved.

For example, the determination unit 1802 first refers to the mode setting table 1700 depicted in FIG. 17 to specify a partition mode corresponding to the acquired combination of a maximum scale and a maximum accuracy. This makes it possible for the determination unit 1802 to specify the first partition mode that is the current partition mode of the optimization apparatus 408.

Then, the determination unit 1802 refers to the mode setting table 1700 to specify an execution mode that defines a range of hardware resources that satisfies the conditions (i) and (ii) from among the execution modes that define a range of hardware resources to be utilized upon arithmetic operation in the first partition mode.

For example, if the partition mode is "FULL (scale: 8K, accuracy: 16 bits)," the execution mode that can be set to the optimization apparatus 408 is the execution mode "FULL," execution mode "2P," execution mode "4P" or execution mode "8P."

The execution mode "FULL" is an execution mode that specifies a range of hardware resources that can solve a problem of the scale "8192 bits (8K)" in the maximum. The execution mode "2P" is an execution mode that specifies a range of hardware resources that can solve a problem of the scale "4096 bits (4K)" in the maximum. The execution mode "4P" is an execution mode that specifies a range of hardware resources that can solve a problem of the scale "2048 bits (2K)" in the maximum. The execution mode "8P" is an execution mode that specifies a range of hardware resources that can solve a problem of the scale "1024 bits (1K)" in the maximum.

It is to be noted that, in the initial setting, the execution mode in the partition mode "FULL (scale: 8K, accuracy 16 bits)" is the execution mode "FULL." In the following description, the execution mode in the initial setting in each partition mode is sometimes referred to as "initial mode."

On the other hand, if the partition mode is "FULL (scale: 4K, accuracy: 64 bits)," the execution mode that can be set to the optimization apparatus 408 is the execution mode "2P," execution mode "4P" or execution mode "8P." It is to be noted that the initial mode of the partition mode "FULL (scale: 4K, accuracy 64 bits)" is the execution mode "2P."

Further, if the partition mode is "2P (2 division)," the execution mode that can be set to the optimization apparatus 408 is the execution mode "2P," execution mode "4P" or execution mode "8P." It is to be noted that the initial mode of the partition mode "2P (2 division)" is the execution mode "2P."

Further, if the partition mode is "4P (4 division)," the execution mode that can be set to the optimization apparatus 408 is the execution mode "4P" or execution mode "8P." It is to be noted that the initial mode of the partition mode "4P (4 division)" is the execution mode "4P."

If the partition mode is "8P (8 division)," the execution mode that can be set to the optimization apparatus 408 is only the execution mode "8P."

As an example, if the first partition mode is "FULL (scale: 8K, accuracy 16 bits)," the maximum scale of a problem that can be solved is "8192 bits (8K)." Further, if the scale of a combinatorial optimization problem is "2048 bits (2K)," the execution mode that satisfies the condition (ii) above is the execution mode "FULL," execution mode "2P" or execution mode "4P."

Accordingly, the execution mode that specifies a range of hardware resources that satisfy the conditions (i) and (ii) given hereinabove is the execution mode "2P" or the execution mode "4P." In this case, the determination unit 1802 determines, from between the execution mode "2P" and the execution mode "4P," the execution mode "4P," whose scale of a problem that can be solved is smallest, as the first execution mode.

Further, if the scale of the combinatorial optimization problem is substantially equal to the maximum scale of a problem that can be solved by the first partition mode, the determination unit 1802 determines the partition mode of the optimization apparatus 408 to the first partition mode. Then, the determination unit 1802 determines the execution mode of the optimization apparatus 408 to the initial mode of the first partition mode. The initial mode is an execution mode that defines a range of hardware resources corresponding to the maximum scale of a problem that can be solved by each partition mode.

The execution controlling unit 1803 controls the optimization apparatus 408 to execute arithmetic operation of the combinatorial optimization problem by the determined partition mode and execution mode. It is assumed that, for example, the determined partition mode and execution mode are the partition mode "FULL (scale: 8K, accuracy 16 bits)" and execution mode "4P," respectively. The partition mode "FULL (scale: 8K, accuracy 16 bits)" is the current partition mode.

In this case, the execution controlling unit 1803 refers, for example, to the mode setting table 1700 to specify a scale and an accuracy corresponding to the execution mode "4P." The scale and the accuracy corresponding to the execution mode "4P" are equivalent to a scale and an accuracy corresponding to the partition mode "4P (4 division)," respectively. Therefore, the scale and the accuracy corresponding to the execution mode "4P" are the scale "2048 bits (2K)" and the accuracy "64 bits," respectively.

Then, the execution controlling unit 1803 inputs the specified scale (spin bit number) and accuracy (bit number of a weighting factor) to the optimization apparatus 408. In the optimization apparatus 408, the control unit 504 accepts the scale (spin bit number) and the accuracy (bit number of a weighting factor) from the execution controlling unit 1803 and inputs them to the mode setting register 55 of the LFB 505.

The accuracy (bit number of a weighting factor) inputted to the mode setting register 55 is inputted to the accuracy switching circuit of each LFE. For example, the accuracy switching circuit 61a1 accepts the inputted accuracy (bit number of the weighting factor) and switches the bit number of a weighting factor to be read out from the SRAM 60a1 in response to the accuracy (bit number of a weighting factor).

Meanwhile, the scale (spin bit number) inputted to the mode setting register 55 is inputted to the random selector unit 52. For example, the random selector unit 52 uses LFEs corresponding in number to the inputted scale (spin bit number) in the ascending order of index such that a search for a solution is performed.

Consequently, the partition mode "FULL (scale: 8K, accuracy 16 bits)" and the execution mode "4P" are set to the optimization apparatus 408. In this case, in the optimization apparatus 408, four partitions of the execution mode "4P" in the partition mode "FULL (scale: 8K, accuracy 16 bits)" are formed.

It is to be noted that by which hardware resource (for example, the LFB) each partition is to be implemented may be decided by the execution controlling unit 1803 or may be decided by the control unit 504 of the optimization apparatus 408.

Then, the execution controlling unit 1803 controls the optimization apparatus 408, to which the execution mode "4P" in the partition mode "FULL (scale: 8K, accuracy 16 bits)" is set, to execute arithmetic operation of the combinatorial optimization problem. For example, the execution controlling unit 1803 causes one of the four partitions in the optimization apparatus 408 to execute arithmetic operation of the combinatorial optimization problem.

Consequently, the execution mode "4P" in the partition mode "FULL (scale: 8K, accuracy 16 bits)" may be set to the optimization apparatus 408 to perform calculation according to the scale of the combinatorial optimization problem.

For example, the execution controlling unit 1803 inputs initial values and operation conditions according to the problem to the optimization apparatus 408. The initial values include, for example, initial values of the energy value E, the local field $h_i$, the spin bit $q_i$ and the temperature parameter T, weighting factor W and so forth. Meanwhile, the operation conditions includes an update time number N1 of a state in one temperature parameter, a change time number N2 of the temperature parameter, the decreasing width of the temperature parameter and so forth.

In the optimization apparatus 408, the control unit 504 sets the inputted initial values and operation conditions to the registers and the SRAMs of the LFEs. It is to be noted that, in the case where an LFE that is not used exists, the control unit 504 sets, for example, all 0s as W to the SRAM of the LFE.

The execution controlling unit 1803 inputs the specified scale (spin bit number) and accuracy (bit number of a weighting factor) to the optimization apparatus 408. As a result, the scale (spin bit number) and the accuracy (bit number of a weighting factor) are Inputted from the control unit 504 to the mode setting register 55 and a partition mode and an execution mode are set to the optimization apparatus 408. The execution controlling unit 1803 inputs an arithmetic operation start flag (for example, the arithmetic operation start flag=1) to the optimization apparatus 408. The control unit 504 accepts the input of the arithmetic operation start flag and starts arithmetic operation by the LFB 505.

Figure 19:
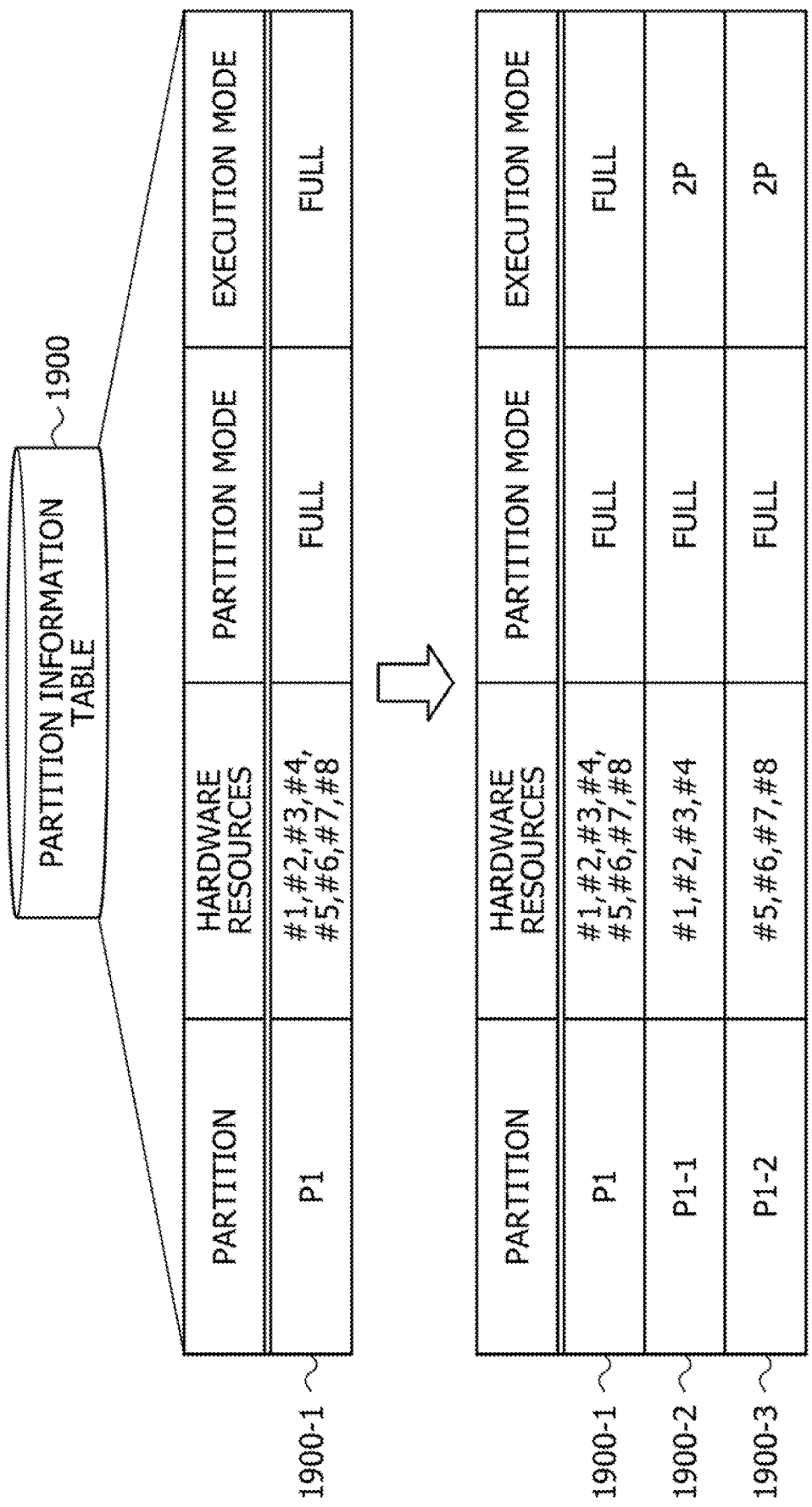
FIG. 19 is an explanatory view depicting an example of a partition information table.

It is to be noted that the execution controlling unit 1803 uses, for example, such a partition information table 1900 as depicted in FIG. 19 to manage information of the partitions in the optimization apparatus 408. The partition Information table 1900 is stored into a storage device such as the memory 402 or disk 404 depicted in FIG. 4 or the like.

FIG. 19 is an explanatory view depicting an example of the partition information table 1900. Referring to FIG. 19, the partition information table 1900 includes fields for a partition, a hardware resource, a partition mode and an execution mode, and if information is set to the fields, partition information (for example, partition information 1900-1) is stored as a record.

Here, the partition is an identifier for specifying a partition. The hardware resource is an identifier for specifying a hardware resource corresponding to the partition. Here, #1 to #8 are identifiers for specifying LFBs the optimization apparatus 408 includes. The LFBs are, for example, the LFB 505 depicted in FIG. 8, LFBs 70a to 70h hereinafter described with reference to FIG. 23 or the like. The partition mode Indicates a current partition mode. The execution mode indicates an execution mode in the partition mode.

For example, the partition information 1900-1 indicates the hardware resources "#1 to #8" corresponding to the partition P1, partition mode "FULL" and execution mode "FULL." It is to be noted that the partition mode "FULL" corresponds, for example, to the partition mode "FULL (scale: 8K, accuracy 16 bits)."

Here, it is assumed that the partition information 1900-1 indicates a partition mode and an execution mode in the initial state of the optimization apparatus 408. Here, a case is supposed in which the execution mode is changed from the execution mode "FULL" to the execution mode "2P" in the partition mode "FULL (scale: 8K, accuracy 16 bits)."

In this case, into the partition information table 1900, for example, partition information 1900-2 and 1900-3 is stored as a new record. For example, the partition information 1900-2 indicates the hardware resources "#1 to #4" corresponding to the partition P1-1 that is one of partitions into which the partition P1 is divided, partition mode "FULL" and execution mode "2P."

It is to be noted that, in the case where a certain partition (for example, the partition P1) is divided into a plurality of partitions by changing the execution mode, the partitions after the division are managed with branch numbers of the partition before the division (for example, P1-1 and P1-2). This makes it easy to specify a corresponding relation of partitions before and after the division.

For example, the execution controlling unit 1803 refers to the partition information table 1900 to designate the partition (hardware resource) in the optimization apparatus 408 such that the control unit 504 of the optimization apparatus 408 may execute arithmetic operation of the combinatorial optimization problem in regard to the designated partition.

Referring back to FIG. 18, in the case where arithmetic operation of the combinatorial optimization problem by the optimization apparatus 408 in the determined first partition mode and first execution mode is completed, the execution controlling unit 1803 may change the execution mode of the optimization apparatus 408 to the initial mode of the first partition mode.

The initial mode is an execution mode that defines a range of hardware resources corresponding to a maximum scale of a problem that can be solved by the first partition mode. For example, after the arithmetic operation for the partition in the first execution mode is completed, the execution controlling unit 1803 changes the execution mode of the optimization apparatus 408 to the initial mode of the first partition mode.

For example, the execution controlling unit 1803 refers to the mode setting table 1700 to specify a scale and an accuracy corresponding to the initial mode of the first partition mode. Then, the execution controlling unit 1803 inputs the specified scale (spin bit number) and accuracy (bit number of a weighting factor) to the optimization apparatus 408.

Consequently, at the timing at which arithmetic operation of the combinatorial optimization problem is completed, the execution mode of the optimization apparatus 408 may be returned to the initial mode in the first partition mode to restore the original state in which a problem of a scale greater than that in the first execution mode can be solved.

It is to be noted that, if the execution mode is changed to the initial mode, for example, the partition information table 1900 depicted in FIG. 19 is updated. For example, if, in the partition mode "FULL (scale: 8K, accuracy 16 bits)," the execution mode is changed from the execution mode "2P" to the initial mode, the partition information 1900-2 and 1900-3 is deleted.

On the other hand, in the case where the scale of the combinatorial optimization problem is greater than the maximum scale of a problem that can be solved by the first partition mode, in this state, it is difficult to solve the combinatorial optimization problem. In this case, the determination unit 1802 may determine the partition mode of the optimization apparatus 408 to the second partition mode by which a problem of a scale equal to or greater than the scale of the combinatorial optimization problem can be solved. Then, the determination unit 1802 may determine the execution mode of the optimization apparatus 408 to the initial mode of the second partition mode.

However, there is the possibility that, if the partition mode is changed dynamically, a result of arithmetic operation being performed in regard to each partition may become abnormal. Accordingly, in the case where the partition mode is to be changed, the optimization problem arithmetic apparatus 101 changes the partition mode after it establishes, for example, a state in which arithmetic operation is not performed by any partition.

For example, when the execution controlling unit 1803 is to change the partition mode, it stops a calculation node (what is called container) that is responsible for each partition. Then, the execution controlling unit 1803 unloads the driver 503 once and then loads the driver 503 again. Thereupon, the execution controlling unit 1803 inputs a scale and an accuracy corresponding to the second partition mode to the optimization apparatus 408. As a result, the second partition mode is set to the optimization apparatus 408. Then, the execution controlling unit 1803 re-activates the calculation node (container). This makes it possible to change the partition mode.

It is to be noted that, if the partition mode is changed, for example, the partition information table 1900 depicted in FIG. 19 is updated. For example, if the partition mode is changed, the partition information table 1900 is initialized and partition information corresponding to the partition mode after the change is stored as a new record.

Further, in the case where the scale of the combinatorial optimization problem is greater than the maximum scale of a problem that can be solved by the first partition mode, the optimization problem arithmetic apparatus 101 may divide and solve the combinatorial optimization problem by an existing distributed method. For example, the determination unit 1802 divides the combinatorial optimization problem. Then, the determination unit 1802 determines a partition mode and an execution mode of the optimization apparatus 408 in response the scale or the requested accuracy of the divided problem. Then, the execution controlling unit 1803 controls the optimization apparatus 408 to execute arithmetic operation of the problem after the division by the determined partition mode and execution mode.

Consequently, in the case where the scale of the combinatorial optimization problem is greater than the maximum scale of a problem that can be solved by the first partition mode, even if the partition mode is not changed, the combinatorial optimization problem may be solved. It is to be noted that the solution of the combinatorial optimization problem is the integrated solutions of the problems after the division.

On the other hand, in the case where the requested accuracy of the combinatorial optimization problem is outside the range of the maximum accuracy of a problem that can be solved by the first partition mode (current partition mode), in this state, it is difficult to solve the combinatorial optimization problem. In this case, the execution controlling unit 1803 may first solve, for example, a problem obtained by scaling down the combinatorial optimization problem (to N times) such that the scale fits in the range of the maximum accuracy of a problem that can be solved by the current partition mode and then re-calculate the solution (to 1/N times) so as to have energy that conforms to that of the original problem.

For example, in the case of the partition mode "FULL (scale: 8K, accuracy 16 bits)," since the maximum accuracy is "16 bits," if "3276700" is designated as a factor of the quadratic term of the problem, in this state, it is difficult to solve the problem. In this case, the execution controlling unit 1803 performs scaling down, for example, to 1/100 such that the problem becomes a problem in which the factor of the quadratic term is 32767 and solves the scaled down problem, whereafter it performs re-calculation of energy (to 100 times) so as to conform to the original image and returns a result of the calculation.

Consequently, even if the requested accuracy of the combinatorial optimization problem is outside the range of the maximum accuracy of a problem that can be solved by the first partition mode, the combinatorial optimization problem may be solved.

It is to be noted that, although the foregoing description is given to an example of a case in which a partition mode and an execution mode are determined in response to the scale of a combinatorial optimization problem, this is not restrictive.

The determination unit 1802 may determine a partition mode and an execution mode of the optimization apparatus 408 in response to an accepted requested accuracy of a combinatorial optimization problem. For example, the determination unit 1802 decides whether or not the requested accuracy of the combinatorial optimization problem is within the range of the maximum accuracy of a problem that can be solved by the first partition mode.

Here, in the case where the requested accuracy of the combinatorial optimization problem is within the range of the maximum accuracy of a problem that can be solved by the first partition mode, the determination unit 1802 determines the partition mode of the optimization apparatus 408 to the first partition mode. Further, the determination unit 1802 determines the execution mode of the optimization apparatus 408 to the second execution mode that defines a range of hardware resources corresponding to the requested accuracy of the combinatorial optimization problem.

Here, the second execution mode is an execution mode that defines a range of hardware resources that satisfies the condition of the (iii) given below from among execution modes that define a range of hardware resources that are utilized upon arithmetic operation in the first partition mode.

(iii) The requested accuracy of the combinatorial optimization problem is within the range of the maximum accuracy.

Consequently, in the case where, in the first partition mode, a plurality of execution modes that are same in scale but are different in accuracy exist (for example, the scale is "1K" and the accuracy is "64 bits, 32 bits, 16 bits") or in a like case, calculation may be performed by a setting according to the requested accuracy of the combinatorial optimization problem.

The determination unit 1802 may determine a partition mode and an execution mode of the optimization apparatus 408 in response an accepted scale and requested accuracy of the combinatorial optimization problem. For example, the determination unit 1802 may determine the partition mode of the optimization apparatus 408 to a partition mode that satisfies the conditions of (ii) and (iii) described above. In this case, the determination unit 1802 determines the execution mode of the optimization apparatus 408 to the initial mode of the determined partition mode.

For example, it is assumed that the scale of the combinatorial optimization problem is "4096 bits (4K)" and the requested accuracy of the combinatorial optimization problem is "64 bits." In this case, in the example of the partition mode depicted in FIG. 10, if only the scale of the combinatorial optimization problem is considered, the partition mode "2P (scale: 4K, accuracy: 32 bits)" and the partition mode "FULL (scale: 4K, accuracy: 64 bits)" are applicable.

However, the partition mode "2P (scale: 4K, accuracy: 32 bits)" does not satisfy the requested accuracy of the combinatorial optimization problem. Therefore, the determination unit 1802 determines the partition mode of the optimization apparatus 408 to the partition mode "FULL (scale: 4K, accuracy: 64 bits)." Then, the determination unit 1802 determines the execution mode of the optimization apparatus 408 to the initial mode "FULL" in the partition mode "FULL (scale: 4K, accuracy: 64 bits)." Consequently, calculation may be performed by a setting according to the scale and the requested accuracy of the combinatorial optimization problem.

Now, arithmetic operation time of a combinatorial optimization problem according to an execution mode in a partition mode is described. FIG. 20A is an explanatory view (part 1) depicting a comparative example of arithmetic operation time of a combinatorial optimization problem. Referring to FIG. 20A, a comparison table 2001 indicates arithmetic operation time of an optimization apparatus in which a partition mode and an execution mode are not changeable (are fixed) and arithmetic operation time of the optimization apparatus 408 in which a partition mode and an execution mode are changeable (variable).

Here, a case is assumed in which eight combinatorial optimization problems of a scale "1024 bits (1K)" are solved.

Here, type Indicates whether or not a partition mode and an execution mode are changeable. The type "not changeable (fixed)" indicates that change is not allowed. For example, the type "not changeable (fixed)" corresponds to an optimization apparatus in the related art in which none of a partition mode and an execution mode can be changed. The type "changeable (variable)" indicates that change is allowed. For example, the type "changeable (variable)" corresponds to the optimization apparatus 408 in which both a partition mode and an execution mode are changeable.

Partition mode indicates the current partition mode. However, in the case of the type "not changeable (fixed)," since it has only one mode, the partition mode is represented as "–(Null)." Problem scale×quantity indicates a scale of the combinatorial optimization problem and a quantity of combinatorial optimization problems. Calculation time indicates an arithmetic operation time period of a combinatorial optimization problem of a problem scale and a quantity. Here, the arithmetic operation time indicates an arithmetic operation time period in the case where arithmetic operation of combinatorial optimization problems of a problem scale× quantity is executed most efficiently.

According to the comparison table 2001, since, in the type "changeable (variable)," since eight combinatorial optimization problems of the scale "1024 bits (1K)" may be arithmetically operated simultaneously by eight partitions of the partition mode "8P (8 division)," the arithmetic operation time is "T1." T1 corresponds to an arithmetic operation time period in the case where a combinatorial optimization problem of the scale "1024 bits (1K)" is arithmetically operated by the same number of iterations and the same number of repetitions. It is to be noted that a broken line in FIG. 20A represents a logical division state (partition) of the optimization apparatus 408. The execution mode is the initial mode "8P."

In contrast, in the type "not changeable (fixed)," since the simultaneous execution number is "1," the arithmetic operation time is "T1×8." For example, by performing arithmetic operation setting a partition mode according to a scale of a combinatorial optimization problem, it may be recognized that the arithmetic operation time period of the combinatorial optimization problem may be shortened.

FIG. 20B is an explanatory view (part 2) depicting a comparative example of arithmetic operation time of a combinatorial optimization problem. Referring to FIG. 20B, a comparison table 2002 indicates arithmetic operation time of an optimization apparatus in which a partition mode and an execution mode are not changeable (are fixed) and arithmetic operation time of the optimization apparatus 408 in which a partition mode and an execution mode are changeable (variable).

Here, a case is assumed in which four combinatorial optimization problems of the scale "2048 bits (2K)" are solved.

According to the comparison table 2002, since, in the type "changeable (variable)," four combinatorial optimization problems of the scale "2048 bits (2K)" may be arithmetically operated by four partitions of the partition mode "4P (4 division)," the arithmetic operation time is "T2." T2 corresponds to an arithmetic operation time period in the case where a combinatorial optimization problem of the scale "2048 bits (2K)" is arithmetically operated by the same number of iterations and the same number of repetitions. The execution mode is the initial mode "4P."

In contrast, in the type "not changeable (fixed)," since the simultaneous execution number is "1," the arithmetic operation time is "T2×4." For example, by performing arithmetic operation setting a partition mode according to a scale of a combinatorial optimization problem, it may be recognized that the arithmetic operation time period of the combinatorial optimization problem may be shortened.

Figure 20C:
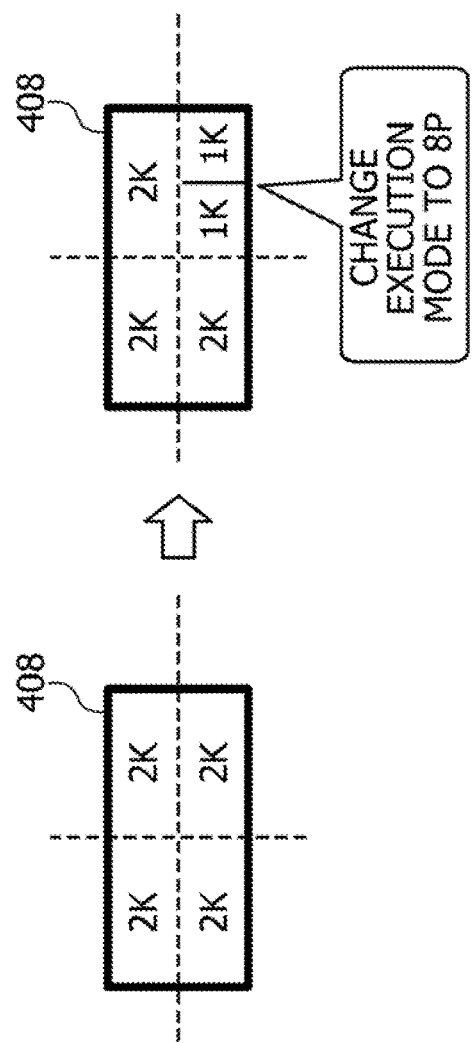
FIG. 20C is an explanatory view (part 3) depicting a comparative example of arithmetic operation time of a combinatorial optimization problem.

FIG. 20C is an explanatory view (part 3) depicting a comparative example of arithmetic operation time of a combinatorial optimization problem. Referring to FIG. 20C, a comparison table 2003 indicates arithmetic operation time of an optimization apparatus in which a partition mode and an execution mode are not changeable (are fixed) and arithmetic operation time of the optimization apparatus 408 in which a partition mode and an execution mode are changeable (variable).

Here, a case is supposed in which three combinatorial optimization problems of the scale "2048 bits (2K)" and two combinatorial optimization problems of the scale "1024 bits (1K)" are solved. Further, a case is supposed in which, in the optimization apparatus 408, the execution mode of one of four partitions in the partition mode "4P (4 division)" is changed to the execution mode "8P." The execution modes of the remaining three partitions are the execution mode "4P."

In the type "changeable (variable)," three combinatorial optimization problems of the scale "2048 bits (2K)" may be arithmetically operated simultaneously by the three partitions of the partition mode "4P (4 division)" and the execution mode "4P." Further, two combinatorial optimization problem of the scale "1024 bits (1K)" may be arithmetically operated simultaneously by the two partitions of the partition mode "4P (4 division)" and the execution mode "8P." Therefore, the arithmetic operation time is "Max(T2, T1)."

In contrast, in the type "not changeable (fixed)," since the simultaneous execution number is "1," the arithmetic operation time is "T2×3+T1×2." For example, it may be recognized that the arithmetic operation time of a combinatorial optimization problem may be reduced by performing arithmetic operation setting a partition mode or an execution mode according to the scale of the combinatorial optimization problem.

It is to be noted that, if arithmetic operation of the combinatorial optimization problem of the scale "1024 bits (1K)" is completed in the optimization apparatus 408, the optimization apparatus 408 returns the execution mode of the partition to the execution mode "4P" under the control of the optimization problem arithmetic apparatus 101. Consequently, the state may be restored in which a problem of the scale "2048 bits (2K)" can be solved.

FIG. 20D is an explanatory view (part 4) depicting a comparative example of arithmetic operation time of a combinatorial optimization problem. Referring to FIG. 20D, a comparison table 2004 indicates arithmetic operation time of an optimization apparatus in which a partition mode and an execution mode are not changeable (are fixed) and arithmetic operation time of the optimization apparatus 408 in which a partition mode and an execution mode are changeable (variable).

Here, a case is assumed in which two combinatorial optimization problems of the scale "4096 bits (4K)" are solved.

According to the comparison table 2004, since, in the type "changeable (variable)," two combinatorial optimization problems of the scale "4096 bits (4K)" may be arithmetically operated by two partitions of the partition mode "2P (2 division)," the arithmetic operation time is "T4." T4 corresponds to an arithmetic operation time period in the case where a combinatorial optimization problem of the scale "4096 bits (4K)" is arithmetically operated by the same number of iterations and the same number of repetitions.

In contrast, in the type "not changeable (fixed)," since the simultaneous execution number is "1," the arithmetic operation time is "T4×2." For example, by performing arithmetic operation setting a partition mode according to a scale of a combinatorial optimization problem, it may be recognized that the arithmetic operation time period of the combinatorial optimization problem may be shortened.

FIG. 20E is an explanatory view (part 5) depicting a comparative example of arithmetic operation time of a combinatorial optimization problem. Referring to FIG. 20E, a comparison table 2005 indicates arithmetic operation time of an optimization apparatus in which a partition mode and an execution mode are not changeable (are fixed) and arithmetic operation time of the optimization apparatus 408 in which a partition mode and an execution mode are changeable (variable).

Here, a case is assumed in which one combinatorial optimization problem of the scale "4096 bits (4K)" and two combinatorial optimization problems of the scale "2048 bits (2K)" are solved. Further, a case is supposed in which, in the optimization apparatus 408, the execution mode of one of two partitions in the partition mode "2P (2 division)" is changed to the execution mode "4P." The execution modes of the remaining partitions are the execution mode "2P."

In the type "changeable (variable)," a combinatorial optimization problem of the scale "4096 bits (4K)" may be arithmetically operated by the partition of the partition mode "2P (2 division)" and the execution mode "2P." Further, two combinatorial optimization problems of the scale "2048 bits (2K)" may be arithmetically operated simultaneously by the two partitions of the partition mode "2P (2 division)" and the execution mode "4P." Therefore, the arithmetic operation time is "Max(T4, T2)."

In contrast, in the type "not changeable (fixed)," since the simultaneous execution number is "1," the arithmetic operation time is "T4+T2×2." For example, it may be recognized that the arithmetic operation time of a combinatorial optimization problem may be reduced by performing arithmetic operation setting a partition mode or an execution mode according to the scale of the combinatorial optimization problem.

It is to be noted that, if arithmetic operation of the combinatorial optimization problem of the scale "2048 bits (2K)" is completed in the optimization apparatus 408, the optimization apparatus 408 returns the execution mode of the partition to the execution mode "2P" under the control of the optimization problem arithmetic apparatus 101. Consequently, the state may be restored in which a problem of the scale "4096 bits (4K)" can be solved.

Figure 20F:
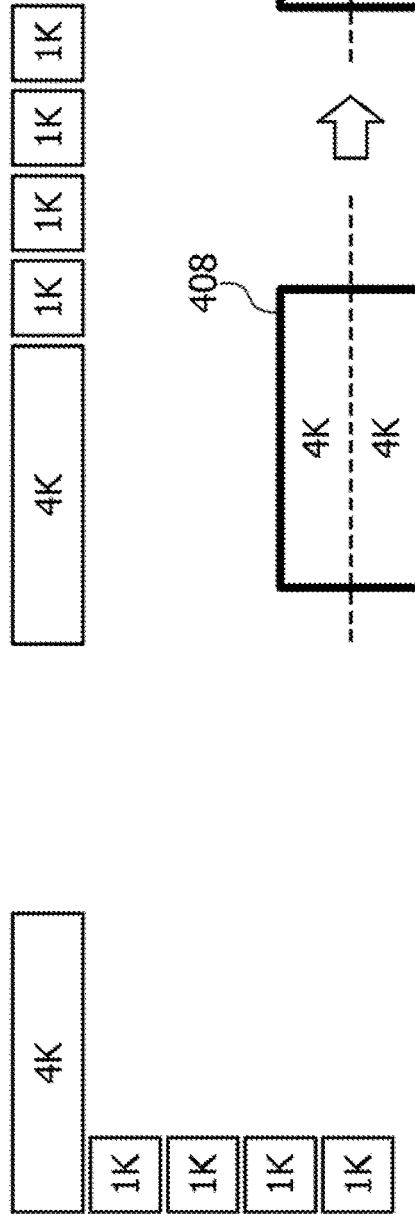
FIG. 20F is an explanatory view (part 6) depicting a comparative example of arithmetic operation time of a combinatorial optimization problem.

FIG. 20F is an explanatory view (part 6) depicting a comparative example of arithmetic operation time of a combinatorial optimization problem. Referring to FIG. 20F, a comparison table 2006 indicates arithmetic operation time of an optimization apparatus in which a partition mode and an execution mode are not changeable (are fixed) and arithmetic operation time of the optimization apparatus 408 in which a partition mode and an execution mode are changeable (variable).

Here, a case is assumed in which one combinatorial optimization problem of the scale "4096 bits (4K)" and four combinatorial optimization problems of the scale "1024 bits (1K)" are solved. Further, a case is supposed in which, in the optimization apparatus 408, the execution mode of one of two partitions in the partition mode "2P (2 division)" is changed to the execution mode "8P." The execution mode of the remaining partitions is the execution mode "2P."

In the type "changeable (variable)," a combinatorial optimization problem of the scale "4096 bits (4K)" may be arithmetically operated by the partition of the partition mode "2P (2 division)" and the execution mode "2P." Further, four combinatorial optimization problems of the scale "1024 bits (1K)" may be arithmetically operated simultaneously by the four partitions of the partition mode "2P (2 division)" and the execution mode "8P." Therefore, the arithmetic operation time is "Max(T4, T1)."

In contrast, in the type "not changeable (fixed)," since the simultaneous execution number is "1," the arithmetic operation time is "T4+T1×4." For example, it may be recognized that the arithmetic operation time of a combinatorial optimization problem may be reduced by performing arithmetic operation setting a partition mode or an execution mode according to the scale of the combinatorial optimization problem.

It is to be noted that, if arithmetic operation of the combinatorial optimization problem of the scale "1024 bits (1K)" is completed in the optimization apparatus 408, the optimization apparatus 408 returns the execution mode of the partition to the execution mode "2P" under the control of the optimization problem arithmetic apparatus 101. Consequently, the state may be restored in which a problem of the scale "4096 bits (4K)" can be solved.

FIG. 20G is an explanatory view (part 7) depicting a comparative example of arithmetic operation time of a combinatorial optimization problem. Referring to FIG. 20G, a comparison table 2007 indicates arithmetic operation time of an optimization apparatus in which a partition mode and an execution mode are not changeable (are fixed) and arithmetic operation time of the optimization apparatus 408 in which a partition mode and an execution mode are changeable (variable).

Here, a case is assumed in which one combinatorial optimization problem of the scale "4096 bits (4K)," one combinatorial optimization problem of the scale "2048 bits (2K)" and two combinatorial optimization problems of the scale "1024 bits (1K)" are solved. Further, a case is supposed in which, in the optimization apparatus 408, the execution mode of one of two partitions in the partition mode "2P (2 division)" is changed to the execution mode "4P" and the execution mode "8P." The execution mode of the remaining partitions is the execution mode "2P."

In the type "changeable (variable)," a combinatorial optimization problem of the scale "4096 bits (4K)" may be arithmetically operated by the partition of the partition mode "2P (2 division)" and the execution mode "2P." Further, a combinatorial optimization problem of the scale "2048 bits (2K)" may be arithmetically operated by the partition of the partition mode "2P (2 division)" and the execution mode "4P." Furthermore, two combinatorial optimization problems of the scale "1024 bits (1K)" may be arithmetically operated simultaneously by the two partitions of the partition mode "2P (2 division)" and the execution mode "8P." Therefore, the arithmetic operation time is "Max(T4, T2, T1)."

It is to be noted that, in the case where the optimization apparatus 408 includes eight LFBs 505, each of the partitions of the partition mode "2P (2 division)" and the execution mode "2P" is implemented by four LFBs 505. On the other hand, in the case where the execution mode of one partition is to be changed to the execution mode "4P" and the execution mode "8P," the partition of the execution mode "4P" is implemented by two LFBs 505, and each of the partitions of the execution mode "8P" is implemented by one LFB 505.

In contrast, in the type "not changeable (fixed)," since the simultaneous execution number is "1," the arithmetic operation time is "T4+T2+T1×2." For example, it may be recognized that the arithmetic operation time of a combinatorial optimization problem may be reduced by performing arithmetic operation setting a partition mode or an execution mode according to the scale of the combinatorial optimization problem.

It is to be noted that, if arithmetic operation of the combinatorial optimization problems of the scale "1024 bits (1K)" and the scale "2048 bits (2 k)" is completed in the optimization apparatus 408, the optimization apparatus 408 returns the execution mode of the partitions to the execution mode "2P" under the control of the optimization problem arithmetic apparatus 101. Consequently, the state may be restored in which a problem of the scale "4096 bits (4K)" can be solved.

FIG. 20H is an explanatory view (part 8) depicting a comparative example of arithmetic operation time of a combinatorial optimization problem. Referring to FIG. 20H, a comparison table 2008 indicates arithmetic operation time of an optimization apparatus in which a partition mode and an execution mode are not changeable (are fixed) and arithmetic operation time of the optimization apparatus 408 in which a partition mode and an execution mode are changeable (variable).

Here, a case is assumed in which eight combinatorial optimization problems of the scale "1024 bits (1K)" are solved. Further, a case is supposed in which, in the optimization apparatus 408, the execution mode of the partition in the partition mode "FULL" is changed to the execution mode "8P."

In the type "changeable (variable)," eight combinatorial optimization problems of the scale "1024 bits (1K)" may be arithmetically operated simultaneously by the eight partitions of the partition mode "FULL" and the execution mode "8P." Therefore, the arithmetic operation time is "T1."

In contrast, in the type "not changeable (fixed)," since the simultaneous execution number is "1," the arithmetic operation time is "T1×8." For example, it may be recognized that the arithmetic operation time of a combinatorial optimization problem may be reduced by performing arithmetic operation setting a partition mode or an execution mode according to the scale of the combinatorial optimization problem.

It is to be noted that, if arithmetic operation of the combinatorial optimization problems of the scale "1024 bits (1K)" is completed in the optimization apparatus 408, the optimization apparatus 408 returns the execution mode of the partition to the execution mode "FULL" under the control of the optimization problem arithmetic apparatus 101. Consequently, the state may be restored in which a problem of the scale "8192 bits (8K)" can be solved.

Figure 20I:
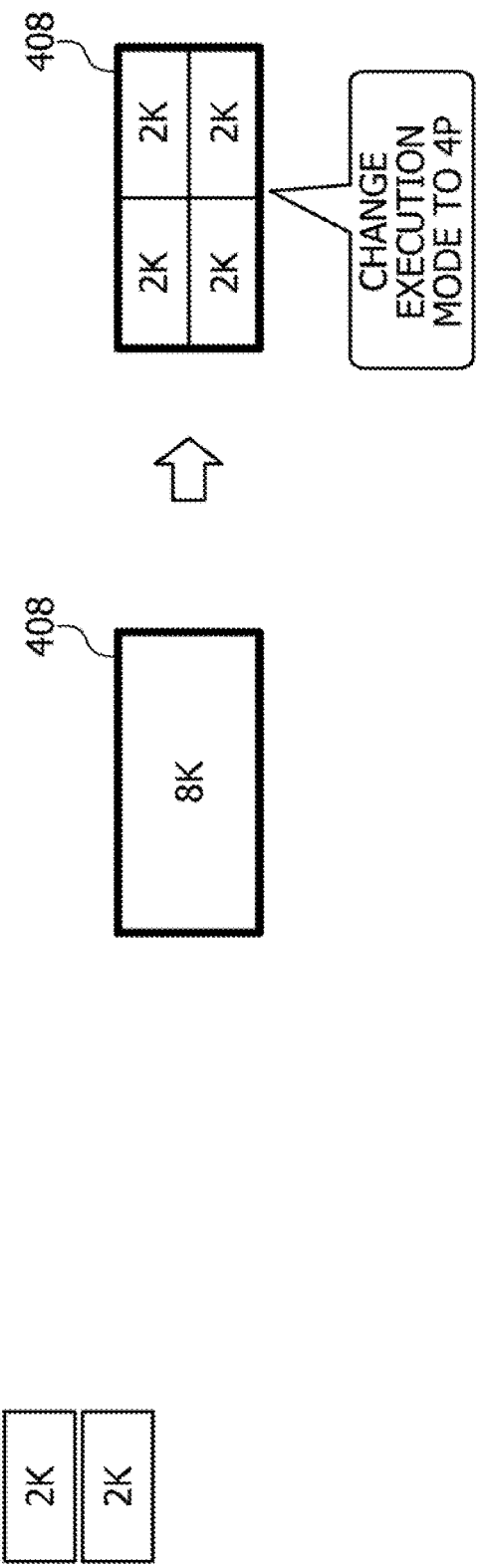
FIG. 20I is an explanatory view (part 9) depicting a comparative example of arithmetic operation time of a combinatorial optimization problem.

FIG. 20I is an explanatory view (part 9) depicting a comparative example of arithmetic operation time of a combinatorial optimization problem. Referring to FIG. 20I, a comparison table 2009 indicates arithmetic operation time of an optimization apparatus in which a partition mode and an execution mode are not changeable (are fixed) and arithmetic operation time of the optimization apparatus 408 in which a partition mode and an execution mode are changeable (variable).

Here, a case is assumed in which four combinatorial optimization problems of the scale "2048 bits (2K)" are solved. Further, a case is supposed in which, in the optimization apparatus 408, the execution mode of the partition in the partition mode "FULL" is changed to the execution mode "4P."

In the type "changeable (variable)," four combinatorial optimization problems of the scale "2048 bits (2K)" may be arithmetically operated simultaneously by the four partitions of the partition mode "FULL" and the execution mode "4P." Therefore, the arithmetic operation time is "T2."

In contrast, in the type "not changeable (fixed)," since the simultaneous execution number is "1," the arithmetic operation time is "T2×4." For example, it may be recognized that the arithmetic operation time of a combinatorial optimization problem may be reduced by performing arithmetic operation setting a partition mode or an execution mode according to the scale of the combinatorial optimization problem.

It is to be noted that, if arithmetic operation of the combinatorial optimization problems of the scale "2048 bits (2K)" is completed in the optimization apparatus 408, the optimization apparatus 408 returns the execution mode of the partition to the execution mode "FULL" under the control of the optimization problem arithmetic apparatus 101. Consequently, the state may be restored in which a problem of the scale "8192 bits (8K)" can be solved.

FIG. 20J is an explanatory view (part 10) depicting a comparative example of arithmetic operation time of a combinatorial optimization problem. Referring to FIG. 20J, a comparison table 2010 depicts arithmetic operation time of an optimization apparatus in which a partition mode and an execution mode are not changeable (are fixed) and arithmetic operation time of the optimization apparatus 408 in which a partition mode and an execution mode are changeable (variable).

Here, a case is assumed in which two combinatorial optimization problems of the scale "4096 bits (4K)" are solved. Further, a case is supposed in which, in the optimization apparatus 408, the execution mode of the partition in the partition mode "FULL" is changed to the execution mode "2P."

In the type "changeable (variable)," two combinatorial optimization problems of the scale "4096 bits (4K)" may be arithmetically operated simultaneously by the two partitions of the partition mode "FULL" and the execution mode "2P." Therefore, the arithmetic operation time is "T4."

In contrast, in the type "not changeable (fixed)," since the simultaneous execution number is "1," the arithmetic operation time is "T4×2." For example, it may be recognized that the arithmetic operation time of a combinatorial optimization problem may be reduced by performing arithmetic operation setting a partition mode or an execution mode according to the scale of the combinatorial optimization problem.

It is to be noted that, if arithmetic operation of the combinatorial optimization problems of the scale "4096 bits (4K)" is completed in the optimization apparatus 408, the optimization apparatus 408 returns the execution mode of the partition to the execution mode "FULL" under the control of the optimization problem arithmetic apparatus 101. Consequently, the state may be restored in which a problem of the scale "8192 bits (8K)" can be solved.

Figure 20K:
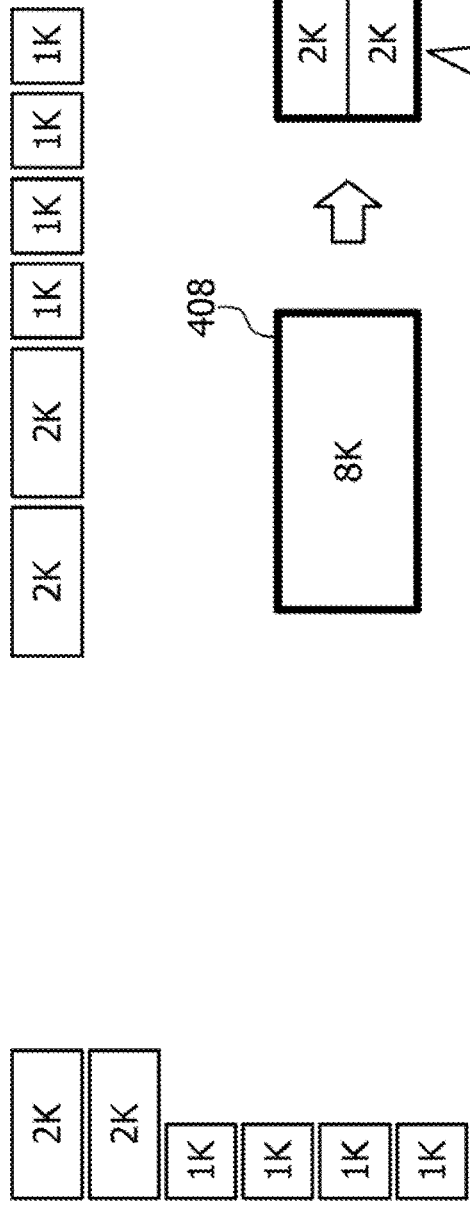
FIG. 20K is an explanatory view (part 11) depicting a comparative example of arithmetic operation time of a combinatorial optimization problem.

FIG. 20K is an explanatory view (part 11) depicting a comparative example of arithmetic operation time of a combinatorial optimization problem. Referring to FIG. 20K, a comparison table 2011 indicates arithmetic operation time of an optimization apparatus in which a partition mode and an execution mode are not changeable (are fixed) and arithmetic operation time of the optimization apparatus 408 in which a partition mode and an execution mode are changeable (variable).

Here, a case is assumed in which two combinatorial optimization problems of the scale "2048 bits (2K)" and four combinatorial optimization problems of the scale "1024 bits (1K)" are solved. Further, a case is supposed in which, in the optimization apparatus 408, the execution mode of the partition in the partition mode "FULL" is changed to the execution mode "4P" and the execution mode "8P."

In the type "changeable (variable)," two combinatorial optimization problems of the scale "2048 bits (2K)" may be arithmetically operated by the partition of the partition mode "FULL" and the execution mode "4P." Further, four combinatorial optimization problems of the scale "1024 bits (1K)" may be arithmetically operated simultaneously by the four partitions of the partition mode "FULL" and the execution mode "8P." Therefore, the arithmetic operation time is "Max(T2, T1)."

In contrast, in the type "not changeable (fixed)," since the simultaneous execution number is "1," the arithmetic operation time is "T2×2+T1×4." For example, it may be recognized that the arithmetic operation time of a combinatorial optimization problem may be reduced by performing arithmetic operation setting a partition mode or an execution mode according to the scale of the combinatorial optimization problem.

It is to be noted that, if arithmetic operation of the combinatorial optimization problems of the scale "1024 bits (1K)" and the scale "2048 bits (2K)" is completed in the optimization apparatus 408, the optimization apparatus 408 returns the execution mode of the partition to the execution mode "FULL" under the control of the optimization problem arithmetic apparatus 101. Consequently, the state may be restored in which a problem of the scale "8192 bits (8K)" can be solved.

FIG. 20L is an explanatory view (part 12) depicting a comparative example of arithmetic operation time of a combinatorial optimization problem. Referring to FIG. 20L, a comparison table 2012 depicts arithmetic operation time of an optimization apparatus in which a partition mode and an execution mode are not changeable (are fixed) and arithmetic operation time of the optimization apparatus 408 in which a partition mode and an execution mode are changeable (variable).

Here, a case is assumed in which one combinatorial optimization problem of the scale "4096 bits (4K)," one combinatorial optimization problem of the scale "2048 bits (2K)" and two combinatorial optimization problems of the scale "1024 bits (1K)" are solved. Further, a case is supposed in which, in the optimization apparatus 408, the execution mode of the partition in the partition mode "FULL" is changed to the execution mode "2P," execution mode "4P" and execution mode "8P."

In the type "changeable (variable)," a combinatorial optimization problem of the scale "4096 bits (4K)" may be arithmetically operated by the partition of the partition mode "FULL" and the execution mode "2P." Further, a combinatorial optimization problem of the scale "2048 bits (2K)" may be arithmetically operated by the partition of the partition mode "FULL" and the execution mode "4P." Furthermore, two combinatorial optimization problems of the scale "1024 bits (1K)" may be arithmetically operated simultaneously by the two partitions of the partition mode "FULL" and the execution mode "8P." Therefore, the arithmetic operation time is "Max(T4, T2, T1)."

In contrast, in the type "not changeable (fixed)," since the simultaneous execution number is "1," the arithmetic operation time is "T4+T2+T1×2." For example, it may be recognized that the arithmetic operation time of a combinatorial optimization problem may be reduced by performing arithmetic operation setting a partition mode or an execution mode according to the scale of the combinatorial optimization problem.

It is to be noted that, if arithmetic operation of the combinatorial optimization problems of the scale "1024 bits (1K)," scale "2048 bits (2K)" and scale "4096 bits (4K)" is completed in the optimization apparatus 408, the optimization apparatus 408 returns the execution mode of the partitions to the execution mode "FULL" under the control of the optimization problem arithmetic apparatus 101. Consequently, the state may be restored in which a problem of the scale "8192 bits (8K)" can be solved.

Figure 21A:
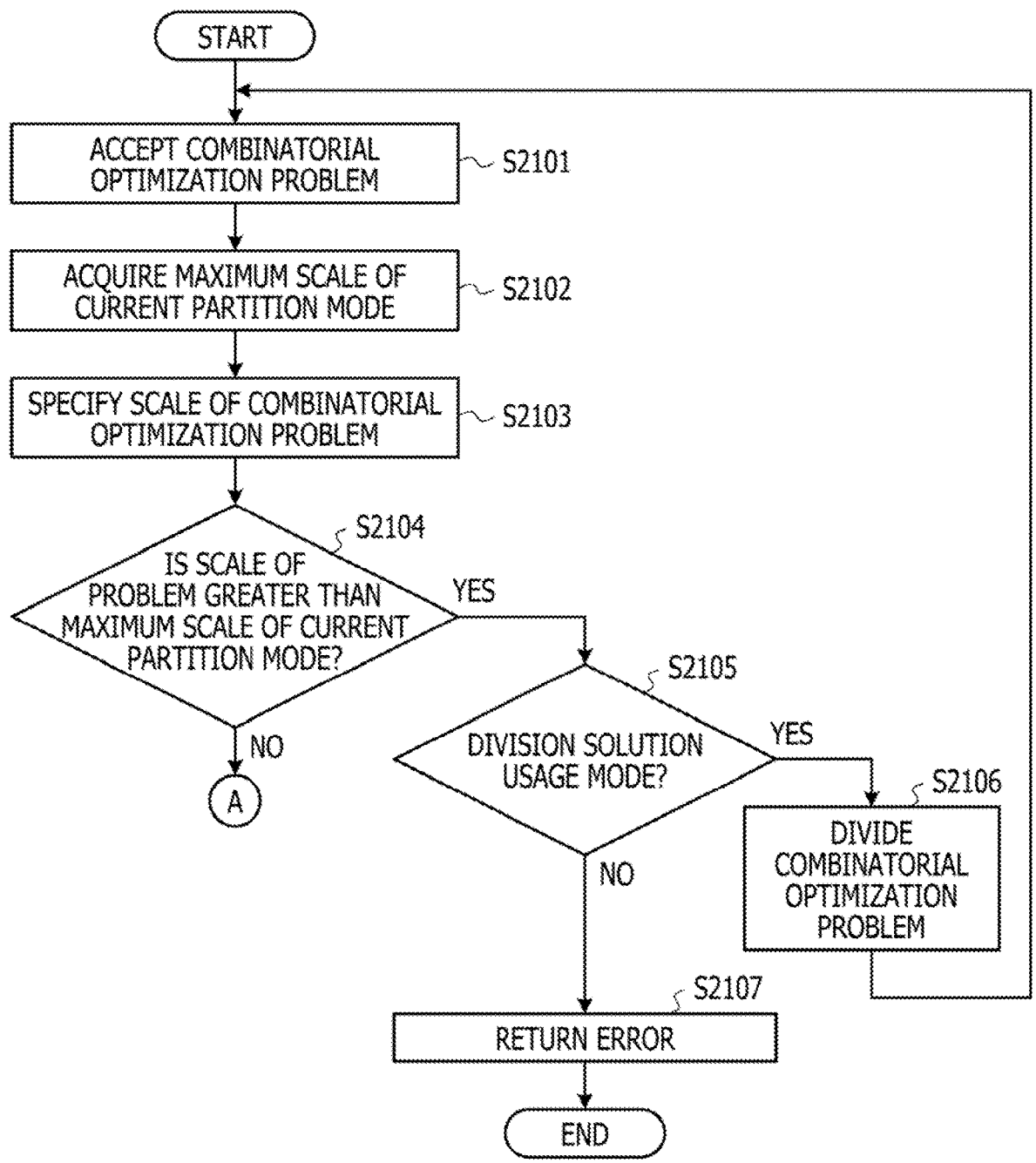
FIGS. 21A and 21B are a flow chart (part 1) depicting an example of an optimization problem arithmetic processing procedure of an optimization problem arithmetic apparatus.
Figure 21B:
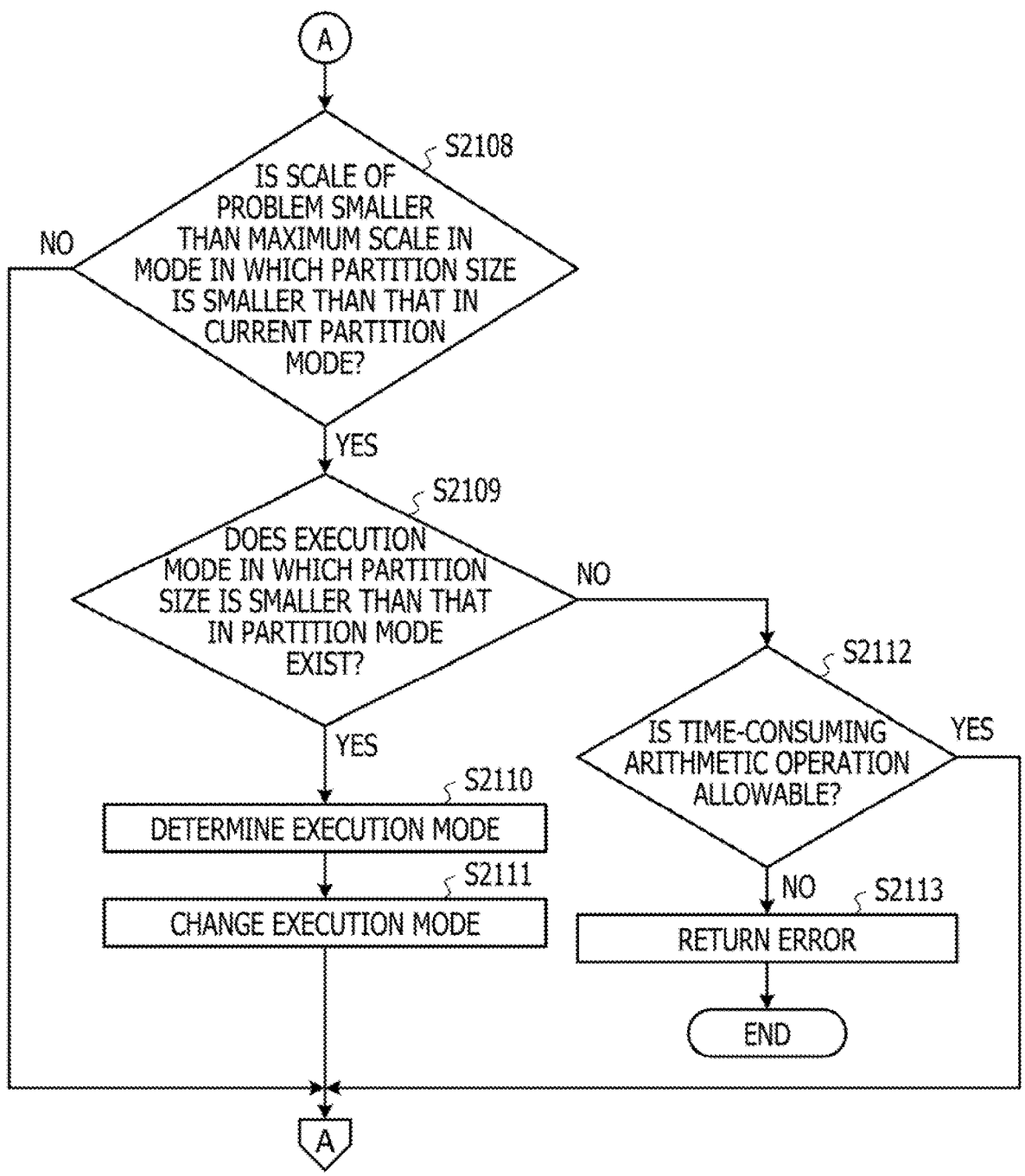
Figure 22:
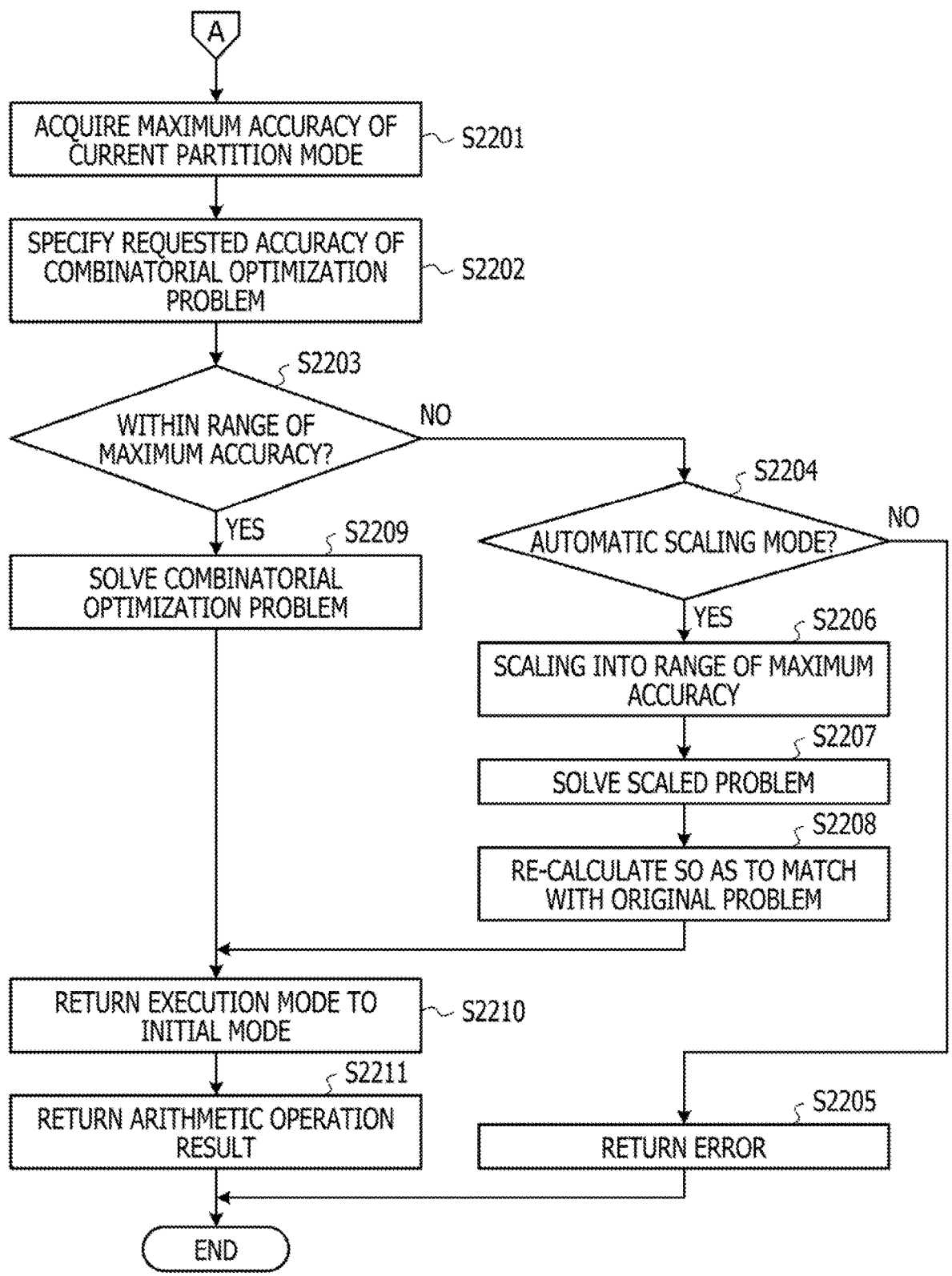
FIG. 22 is a flow chart (part 2) depicting an example of an optimization problem arithmetic processing procedure of an optimization problem arithmetic apparatus.

FIGS. 21 and 22 are flow charts depicting an example of an optimization problem arithmetic processing procedure of an optimization problem arithmetic apparatus. The optimization problem arithmetic apparatus described with reference to FIGS. 21 and 22 may be the optimization problem arithmetic apparatus 101 depicted in FIG. 1. Referring first to the flow chart of FIGS. 21A and 21B, the optimization problem arithmetic apparatus 101 first accepts information of a combinatorial optimization problem of a calculation target (step S2101)

Then, the optimization problem arithmetic apparatus 101 acquires a maximum scale (spin bit number) of a problem that can be solved by the current partition mode of the optimization apparatus 408 (step S2102). Then, the optimization problem arithmetic apparatus 101 specifies a scale of the accepted combinatorial optimization problem (step S2103).

Then, the optimization problem arithmetic apparatus 101 decides whether or not the specified scale of the combinatorial optimization problem is greater than the acquired maximum scale (step S2104). Here, in the case where the scale of the combinatorial optimization problem is greater than the maximum scale (step S2104: Yes), the optimization problem arithmetic apparatus 101 decides whether or not a distributed method usage mode is set (step S2105).

It is to be noted that the distributed method usage mode is a mode in which a problem is divided and solved by a distributed method. The distributed method usage mode may be set arbitrarily in advance. For example, when the current partition mode is "FULL," in the case where the scale of a problem is greater than "8192 bits (8K)," the distributed method is used.

Here, in the case where the distributed method usage mode is set (step S2105: Yes), the optimization problem arithmetic apparatus 101 divides the accepted combinatorial optimization problem by a division solver or the like (step S2106), whereafter the processing returns to step S2101. As a result, at step S2101, each problem after division is accepted as the combinatorial optimization problem of a calculation target.

On the other hand, in the case where the distributed method usage mode is not set (step S2105: No), the optimization problem arithmetic apparatus 101 returns an error to the user (step S2107) and ends the series of processes according to the present flow chart.

On the other hand, in the case where the scale of the combinatorial optimization problem is not greater than the maximum scale at step S2104 (step S2104: No), the optimization problem arithmetic apparatus 101 decides whether or not the specified scale of the combinatorial optimization problem is smaller than a maximum scale in a mode in which the partition size is smaller by one step than that of the current partition mode (step S2108).

Here, in the case where the scale of the combinatorial optimization problem is substantially equal to the maximum scale in the current partition mode or is greater than a maximum scale in the mode in which the partition size is smaller by one step than that of the current partition mode (step S2108: No), the optimization problem arithmetic apparatus 101 advances the processing to step S2201 depicted in FIG. 22. On the other hand, in the case where the scale of the combinatorial optimization problem is smaller than the maximum scale in the mode in which the partition size is smaller by one step than that of the current partition mode (step S2108: Yes), the optimization problem arithmetic apparatus 101 decides whether or not there exists an execution mode in which the partition size is smaller than that in the current partition mode (step S2109).

For example, in the case where the current partition mode is "FULL," the optimization problem arithmetic apparatus 101 decides at step S2108 whether or not the partition size is smaller than "4K" that is a maximum scale of the 2P mode in which the partition size is smaller by one step than that of the FULL mode. For example, in the case where the scale of the problem is "5K," "6K" or "7K," the optimization problem arithmetic apparatus 101 does not change the execution mode but keeps the FULL mode. On the other hand, in the case where the scale of the problem is equal to or smaller than "4K," the optimization problem arithmetic apparatus 101 changes the execution mode.

Here, in the case where an execution mode in which the partition size is smaller exists (step S2109: Yes), the optimization problem arithmetic apparatus 101 determines an execution mode for the optimization apparatus 408 in response to the scale of the combinatorial optimization problem (step S2110). It is to be noted that the partition mode of the optimization apparatus 408 is left the current partition mode. For example, the optimization problem arithmetic apparatus 101 determines the partition mode of the optimization apparatus 408 as the current partition mode.

Then, the optimization problem arithmetic apparatus 101 changes the execution mode in the current partition mode to the determined execution mode (step S2111) and then advances the processing to step S2201 depicted in FIG. 22. For example, the optimization problem arithmetic apparatus 101 refers to the mode setting table 1700 to specify a scale and an accuracy corresponding to the determined execution mode in the current partition mode. Then, the optimization problem arithmetic apparatus 101 inputs the specified scale and accuracy to the optimization apparatus 408 to change the execution mode in the current partition mode.

On the other hand, in the case where an execution mode in which the partition size is smaller does not exist at step S2109 (step S2109: No), the optimization problem arithmetic apparatus 101 decides whether or not time-consuming arithmetic operation is allowable (step S2112). Whether or not time-consuming arithmetic operation is allowable may be set arbitrarily in advance.

In the case where time-consuming arithmetic operation is not allowable (step S2112: No), the optimization problem arithmetic apparatus 101 returns an error to the user (step S2113) and then ends the series of processes according to the present flow chart. On the other hand, in the case where time-consuming arithmetic operation is allowable (step S2112: Yes), the optimization problem arithmetic apparatus 101 advances the processing to step S2201 depicted in FIG. 22.

Referring now to the flow chart of FIG. 22, the optimization problem arithmetic apparatus 101 first acquires a maximum accuracy (bit number of a weighting factor) of a problem that can be solved in the current partition mode (step S2201). Then, the optimization problem arithmetic apparatus 101 specifies requested accuracy of the accepted combinatorial optimization problem (step S2202).

Then, the optimization problem arithmetic apparatus 101 decides whether or not the specified requested accuracy of the combinatorial optimization problem is within a range of the acquired maximum accuracy (step S2203). Here, in the case where the requested accuracy of the combinatorial optimization problem is outside the range of the maximum accuracy (step S2203: No), the optimization problem arithmetic apparatus 101 decides whether or not an automatic scaling mode is set (step S2204).

It is to be noted that the automatic scaling mode is a mode in which the requested accuracy is scaled into the range of the maximum accuracy to solve the problem. The automatic scaling mode may be set arbitrarily in advance.

Here, in the case where the automatic scaling mode is not set (step S2204: No), the optimization problem arithmetic apparatus 101 returns an error to the user (step S2205) and ends the series of processes according to the present flow chart.

On the other hand, in the case where the automatic scaling mode is set (step S2204: Yes), the optimization problem arithmetic apparatus 101 scales (multiplies by N) the combinatorial optimization problem into the range of the maximum accuracy of a problem that can be solved in the current partition mode (step S2206).

Then, the optimization problem arithmetic apparatus 101 solves the problem scaled by the optimization apparatus 408 in the current partition mode and execution mode (step S2207). Then, the optimization problem arithmetic apparatus 101 re-calculates (multiplies by 1/N) the energy so as to conform to the original problem (step S2208) and then advances the processing to step S2210.

On the other hand, in the case where the requested accuracy of the combinatorial optimization problem is within the range of the maximum accuracy at step S2203 (step S2203: Yes), the optimization problem arithmetic apparatus 101 solves the combinatorial optimization problem by the optimization apparatus 408 in the current partition mode and execution mode (step S2209).

Then, the optimization problem arithmetic apparatus 101 changes the execution mode changed at step S2111 back to the initial mode (step S2210). However, in the case where change of the execution mode has not been performed at step S2111, the optimization problem arithmetic apparatus 101 skips step S2210.

Then, the optimization problem arithmetic apparatus 101 returns an arithmetic operation result of the combinatorial optimization problem to the user (step S2211) and ends the series of processes according to the present flow chart. Consequently, arithmetic operation may be performed using appropriate hardware resources according to the scale of the combinatorial optimization problem, and the combinatorial optimization problem may be solved efficiently.

It is to be noted that, in the case where the scale of the combinatorial optimization problem is greater than the maximum scale at step S2104 (step S2104: Yes), the optimization problem arithmetic apparatus 101 may change the partition mode of the optimization apparatus 408. For example, the optimization problem arithmetic apparatus 101 changes the partition mode of the optimization apparatus 408 to a partition mode in which a problem of a scale greater than the scale of the combinatorial optimization problem can be solved.

On the other hand, in the case where the accuracy of the combinatorial optimization problem is outside the range of the maximum accuracy at step S2203 (step S2203: No), the optimization problem arithmetic apparatus 101 may change the partition mode of the optimization apparatus 408. For example, the optimization problem arithmetic apparatus 101 changes the partition mode of the optimization apparatus 408 to a partition mode in which a problem of an accuracy equal to or higher than the accuracy of the combinatorial optimization problem can be solved.

Now, an example of an apparatus configuration of the optimization apparatus 408 is described. The optimization apparatus 408 described below is different in part of a circuit configuration from the optimization apparatus 408 described hereinabove with reference to FIGS. 5 to 16.

Figure 23:
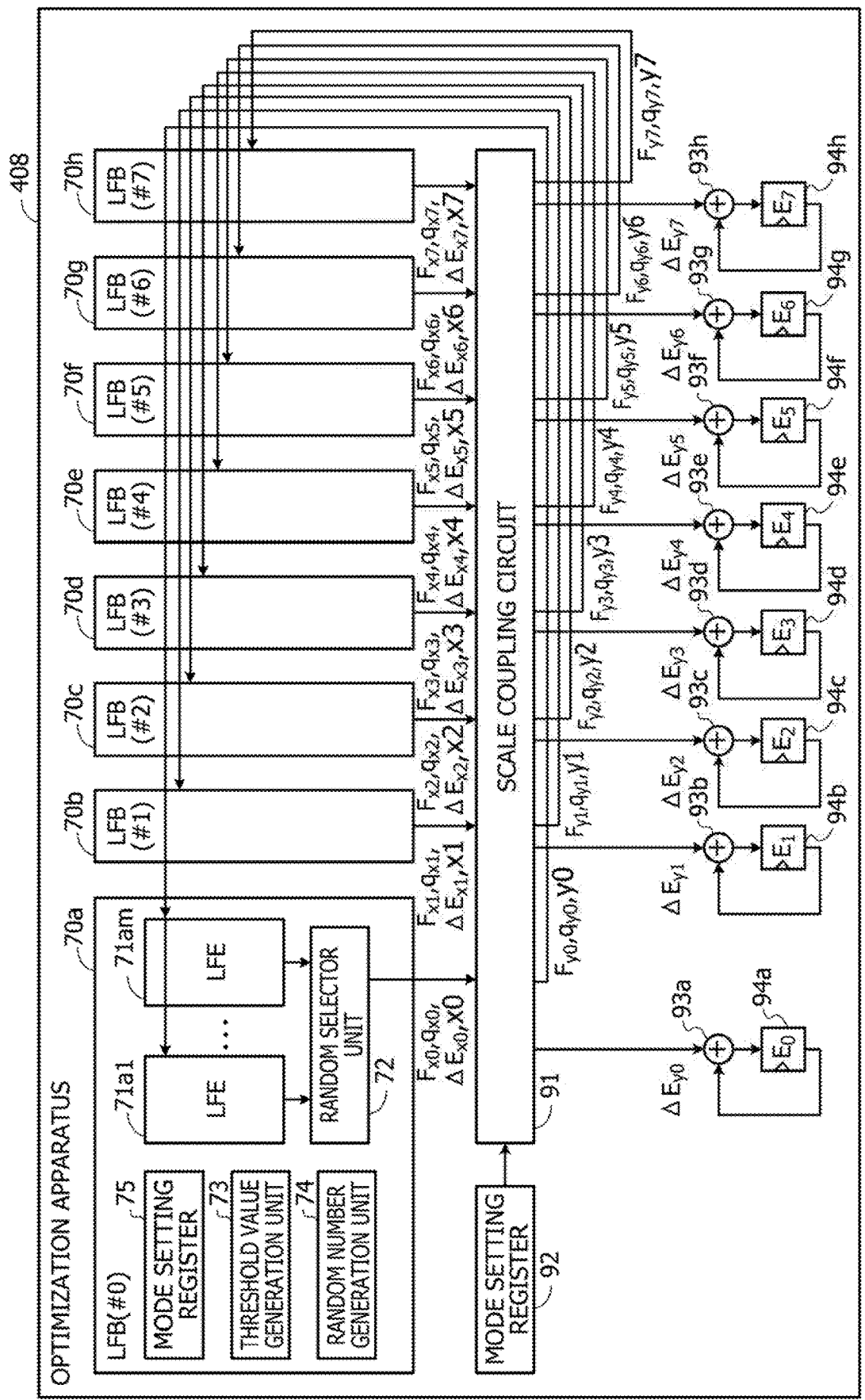
FIG. 23 is an explanatory view depicting an example of an apparatus configuration of an optimization apparatus.

FIG. 23 is an explanatory view depicting an example of an apparatus configuration of the optimization apparatus 408. The optimization apparatus 408 includes a plurality of LFBs. The optimization apparatus 408 further includes a control unit 504 for controlling the plurality of LFBs (not depicted).

Here, it is assumed that, as an example, the number of LFEs belonging to one LFB is m (m is an integer equal to or greater than 2), and the optimization apparatus 408 includes LFBs 70a, 70b, 70c, 70d, 70e, 70f, 70g and 70h. In this case, the optimization apparatus 408 includes totaling 8 m LFEs and may implement a maximum scale of 8 m bits. In the optimization apparatus 408, a partition is implemented, for example, by one or more LFBs from among the LFBs 70a, 70b, 70c, 70d, 70e, 70f, 70g and 70h. However, the number of LFBs the optimization apparatus 408 includes may be 8 or a different number.

The plurality of LFEs provided in the LFBs 70a, . . . , 70h are an example of the bit arithmetic circuits 1a1, . . . , 1aN depicted in FIG. 2. Each of the LFBs 70a, . . . , 70h may be considered as one group of LFEs including a given number of (m) LFEs as elements thereof. Further, to the LFBs 70a, . . . , 70h, identification numbers #0 to #7 are allocated, respectively.

The optimization apparatus 408 further includes a scale coupling circuit 91, a mode setting register 92, adders 93a, 93b, 93c, 93d, 93e, 93f, 93g and 93h, and storage registers 94a, 94b, 94c, 94d, 94e, 94f, 94g and 94h.

Here, the LFB 70a includes LFEs 71a1, ..., 71am, a random selector unit 72, a threshold value generation unit 73, a random number generation unit 74 and a mode setting register 75. The LFEs 71a1, ..., 71am, random selector unit 72, threshold value generation unit 73, random number generation unit 74 and mode setting register 75 correspond to hardware elements having same names as those described hereinabove with reference to FIG. 8, and therefore, description of them is omitted. However, the random selector unit 72 outputs a set of state signals (flag $F_{x0}$, spin bit $q_{x0}$ and energy variation amount $\Delta Exo$) regarding a selected inversion bit to the scale coupling circuit 91. Further, the random selector unit 72 may not include the flag controlling unit 52a (however, may include the flag controlling unit 52a). For example, in the random selector unit 72, state signals from the LFEs are inputted two by two to the selection circuits at the first stage of the random selector unit 72 without the intervention of the flag controlling unit 52a. It is to be noted that also the LFBs 70b, ..., 70h include a circuit configuration similar to that of the LFB 70a.

The scale coupling circuit 91 accepts state signals from the LFBs 70a, ..., 70h and performs selection of an inversion bit based on the state signals. The scale coupling circuit 91 supplies a signal relating to the inversion bit to the LFEs of the LFBs 70a, ..., 70h.

For example, the scale coupling circuit 91 outputs a flag $F_{y0}$, a bit qyo and index indicative of the inversion bit=y0 to the LFEs 71a1, ..., 71am of the LFB 70a1. Here, in the succeeding figures, such representation as "index=x0" outputted from the random selector unit 72 and the scale coupling circuit 91 is sometimes referred to in an abbreviated form like "x0." The scale coupling circuit 91 outputs an energy variation amount $\Delta E_{y0}$ to the adder 93a.

The scale coupling circuit 91 outputs a flag $F_{y1}$, a bit $q_{y1}$ and index indicative of the inversion bit=y1 to the LFEs of the LFB 70b. The scale coupling circuit 91 outputs an energy variation amount $\Delta E_1$ to the adder 93b.

The scale coupling circuit 91 outputs a flag $F_{y2}$, a bit $q_{y2}$ and index indicative of the inversion bit=y2 to the LFEs of the LFB 70c. The scale coupling circuit 91 outputs an energy variation amount $\Delta E_{y2}$ to the adder 93c.

The scale coupling circuit 91 outputs a flag $F_{y3}$, a bit $q_{y3}$ and index indicative of the inversion bit=y3 to the LFEs of the LFB 70d. The scale coupling circuit 91 outputs an energy variation amount $\Delta E_{y3}$ to the adder 93d.

The scale coupling circuit 91 outputs a flag $F_{y4}$ a bit $q_{y4}$ and index indicative of the inversion bit=y4 to the LFEs of the LFB 70e. The scale coupling circuit 91 outputs an energy variation amount $\Delta E_{y4}$ to the adder 93e.

The scale coupling circuit 91 outputs a flag $F_{y5}$, a bit $q_{y5}$ and index indicative of the inversion bit=y5 to the LFEs of the LFB 70f. The scale coupling circuit 91 outputs an energy variation amount $\Delta E_{y5}$ to the adder 93f.

The scale coupling circuit 91 outputs a flag $F_{y6}$, a bit $q_{y6}$ and index indicative of the inversion bit=y6 to the LFEs of the LFB 70g. The scale coupling circuit 91 outputs an energy variation amount $\Delta E_{y6}$ to the adder 93g.

The scale coupling circuit 91 outputs a flag $F_{y7}$, a bit $q_{y7}$ and index indicative of the inversion bit=y7 to the LFEs of the LFB 70h. The scale coupling circuit 91 outputs an energy variation amount $\Delta E_{y7}$ to the adder 93h.

The random selector units (including the random selector unit 72) each of the LFBs 70a, ..., 70h includes and the scale coupling circuit 91 are an example of the selection circuit unit 2 depicted in FIG. 2.

The mode setting register 92 performs setting of an operation mode (partition mode and execution mode) to the scale coupling circuit 91. For example, the mode setting register 92 performs setting of an operation mode (partition mode and execution mode) to the scale coupling circuit 91 in response to a scale (spin bit number) and an accuracy (bit number of a weighting factor) inputted from the execution controlling unit 1803 of the optimization problem arithmetic apparatus 101. The mode setting register 92 sets an operation mode same as the operation mode set to the LFEs 71a1, ..., 71am and the random selector unit 72 by the mode setting register 75 to the scale coupling circuit 91. Details of mode setting by the mode setting registers 75 and 92 are hereinafter described. The mode setting registers (including the mode setting register 75) each of the LFBs 70a, ..., 70h includes and the mode setting register 92 are an example of the setting changing unit 5 depicted in FIG. 2.

The adder 93a adds $\Delta E_{y0}$ to the energy value $E_0$ stored in the E storage register 94a to update the energy value $E_0$. The E storage register 94a fetches the energy value $E_0$ calculated by the adder 93a, for example, in synchronism with a clock signal (not depicted) (this similarly applies also to the other E storage registers).

The adder 93b adds $\Delta E_{y1}$ to the energy value $E_1$ stored in the E storage register 94b to update the energy value $E_1$. The E storage register 94b fetches the energy value $E_1$ calculated by the adder 93b.

The adder 93c adds $\Delta E_{y2}$ to the energy value $E_2$ stored in the E storage register 94c to update the energy value $E_2$. The E storage register 94c fetches the energy value $E_2$ calculated by the adder 93c.

The adder 93d adds $\Delta E_{y3}$ to the energy value $E_3$ stored in the E storage register 94d to update the energy value $E_3$. The E storage register 94d fetches the energy value $E_3$ calculated by the adder 93d.

The adder 93e adds $\Delta E_{y4}$ to the energy value $E_4$ stored in the E storage register 94e to update the energy value $E_4$. The E storage register 94e fetches the energy value $E_4$ calculated by the adder 93e.

The adder 93f adds $\Delta E_{y5}$ to the energy value $E_5$ stored in the E storage register 94f to update the energy value $E_5$. The E storage register 94f fetches the energy value $E_5$ calculated by the adder 93f.

The adder 93g adds $\Delta E_{y6}$ to the energy value $E_6$ stored in the E storage register 94g to update the energy value $E_6$. The E storage register 94g fetches the energy value $E_6$ calculated by the adder 93g.

The adder 93h adds $\Delta E_{y7}$ to the energy value $E_7$ stored in the E storage register 94h to update the energy value $E_7$. The E storage register 94h fetches the energy value $E_7$ calculated by the adder 93h.

Each of the E storage registers 94a, ..., 94h is, for example, a flip-flop.

Subsequently, an example of a circuit configuration of the LFB 70a is described. Also the LFBs 70b, ..., 70h include a circuit configuration similar to that of the LFB 70a.

Figure 24:
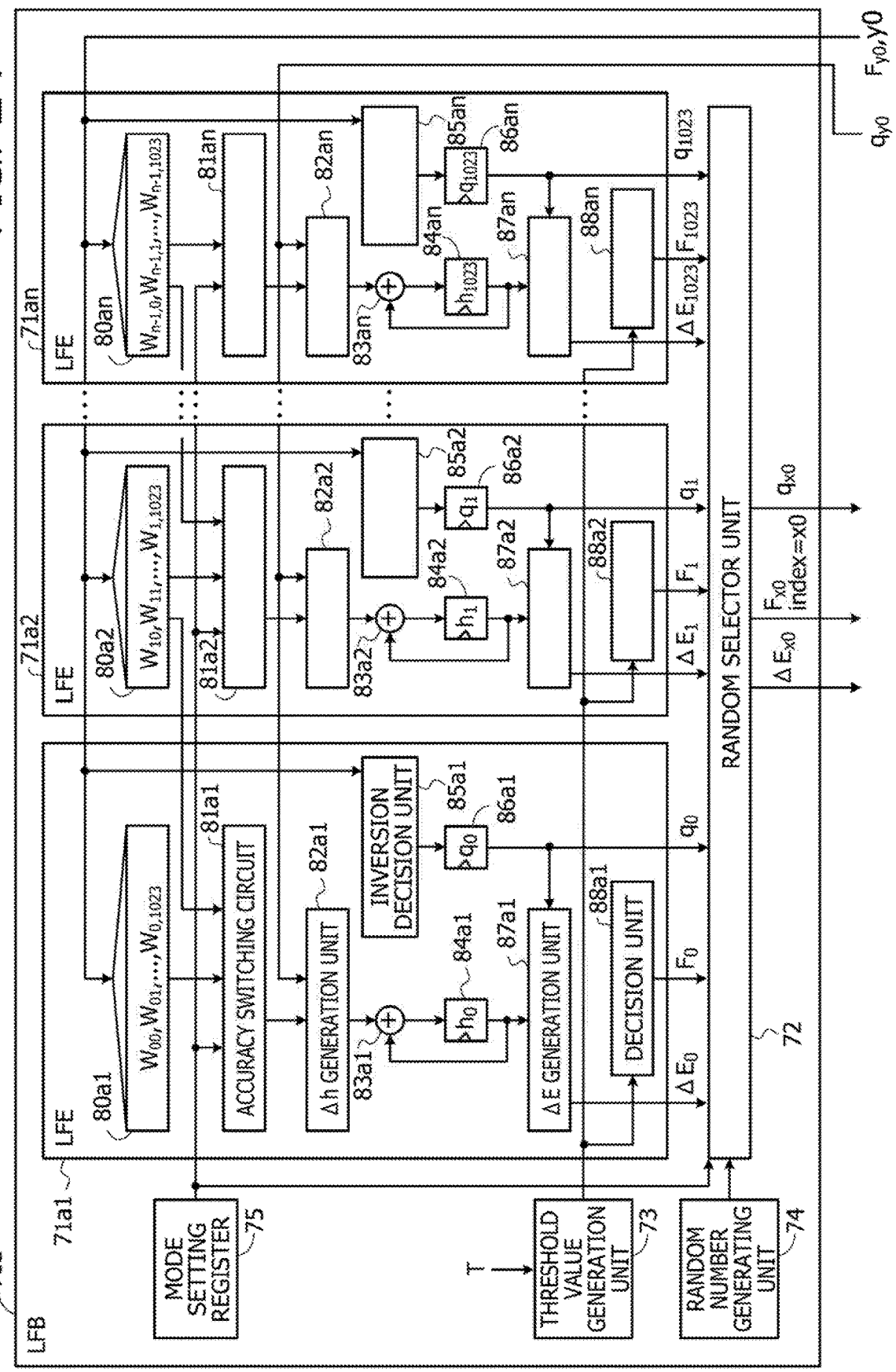
FIG. 24 is an explanatory view depicting an example of a circuit configuration of an LFB.

FIG. 24 is an explanatory view depicting an example of a circuit configuration of an LFB. Each of the LFEs 71a1, 71a2, ..., 71am is used as a 1 bit of a spin bit. m is an integer equal to or greater than 2 and indicates the number of LFEs provided in each LFB 70. In the example of FIG. 24, m=1024 as an example. However, m may be a different value.

With each of the LFEs 71a1, 71a2, . . . , 71am, identification information (Index) is associated. With the LFEs 71a1, 71a2, . . . , 71am, index=0, 1, . . . , 1023 are associated, respectively.

In the following, a circuit configuration of the LFE 71a1 is described. Also the LFEs 71a2, . . . , 71am are implemented by a circuit configuration similar to that of the LFE 71a1. It is sufficient, for description of the circuit configuration of the LFEs 71a2, . . . , 71am, if the representation "a1" at the tail end of a reference character of each factor in the following description is replaced with "a2," . . . , "am" (for example, in such a manner that the reference character of "80a1" is replaced with "80am").

The LFE 71a1 includes an SRAM 80a1, an accuracy switching circuit 81a1, a Δh generation unit 82a1, an adder 83a1, an h storage register 84a1, an inversion decision unit 85a1, a bit storage register 86a1, a ΔE generation unit 87a1 and a decision unit 88a1.

Here, the SRAM 80a1, accuracy switching circuit 81a1, Δh generation unit 82a1, adder 83a, h storage register 84a1, inversion decision unit 85a1, bit storage register 86a1, ΔE generation unit 87a1 and decision unit 88a1 individually have similar functions to those of the hardware components having same names as those described hereinabove with reference to FIG. 8. However, to the SRAM 80a1 (or accuracy switching circuit 81a1) and the inversion decision unit 85a1, index=y0 and the flag $F_{y0}$ indicative of reversibility outputted from the scale coupling circuit 91 are supplied. Further, to the Δh generation unit 82a1, an inversion bit $q_{y0}$ outputted from the scale coupling circuit 91 is supplied.

The mode setting register 75 performs setting of a bit number (accuracy) of a weighting factor to the accuracy switching circuits 81a1, 81a2, . . . , 81am. The mode setting register 75 does not include signal lines for performing setting to the random selector unit 72 therethrough (however, may include such signal lines). Here, as an example, the five different modes described hereinabove are available.

The first mode is a mode of the scale 1 Kbit/accuracy 128 bits and corresponds to the partition mode "8P (8 division)." The mode of the scale 1 Kbit/accuracy 128 bits uses one LFB. Partitions of the first mode may be implemented only by one of the LFBs 70a, . . . , 70h.

The second mode is a mode of the scale 2 Kbits/accuracy 64 bits and corresponds to the partition mode "4P (4 division)." The mode of the scale 2 Kbits/accuracy 64 bits uses two LFBs. For example, partitions of the second mode may be implemented by one of a combination of the LFBs 70a and 70b, a combination of the LFBs 70c and 70d, a combination of the LFBs 70e and 70f, and a combination of the LFBs 70g and 70h.

The third mode is a mode of the scale 4 Kbits/accuracy 32 bits and corresponds to the partition mode "2P (2 division)." The mode of the scale 4 Kbits/accuracy 32 bits uses four LFBs. For example, partitions of the third mode may be implemented by one of a combination of the LFBs 70a, 70b, 70c and 70d and a combination of the LFBs 70e, 70f, 70g and 70h.

The fourth mode is a mode of the scale 8 Kbits/accuracy 16 bits and corresponds to the partition mode "FULL (scale: 8K, accuracy 16 bits)." The mode of the scale 8 Kbits/accuracy 16 bits uses eight LFBs. The partitions of the fourth mode may be implemented using a combination of the LFBs 70a, . . . , 70h.

The fifth mode is a mode of the scale 4 Kbits/accuracy 64 bits and corresponds to the partition mode "FULL (scale: 4K, accuracy: 64 bits)." The mode of the scale 4 Kbits/ accuracy 64 bits uses eight LFBs. Partitions of the fifth mode may be implemented by a combination of the LFBs 70a, . . . , 70h. However, as described hereinabove with reference to FIG. 16, the number of LFEs used in one LFB is one half the number of LFEs provided in one LFB.

The optimization apparatus 408 may execute arithmetic operation of a same problem or different problems in parallel by a combination of the mode of the scale 1 Kbit/accuracy 128 bits, the mode of the scale 2 Kbits/accuracy 64 bits and the mode of the scale 4 Kbits/accuracy 32 bits. This makes it possible, for example, to change the execution mode for only some of a plurality of partitions of a certain partition mode.

To this end, the scale coupling circuit 91 selects the number of LFBs to be combined (the number of groups to be combined) such that a plurality of LFBs (combination of LFBs) include LFEs the number of which corresponds to a spin bit number in response to a setting of a spin bit number by the mode setting register 92. The scale coupling circuit 91 includes, for example, the following circuit configuration.

Figure 25:
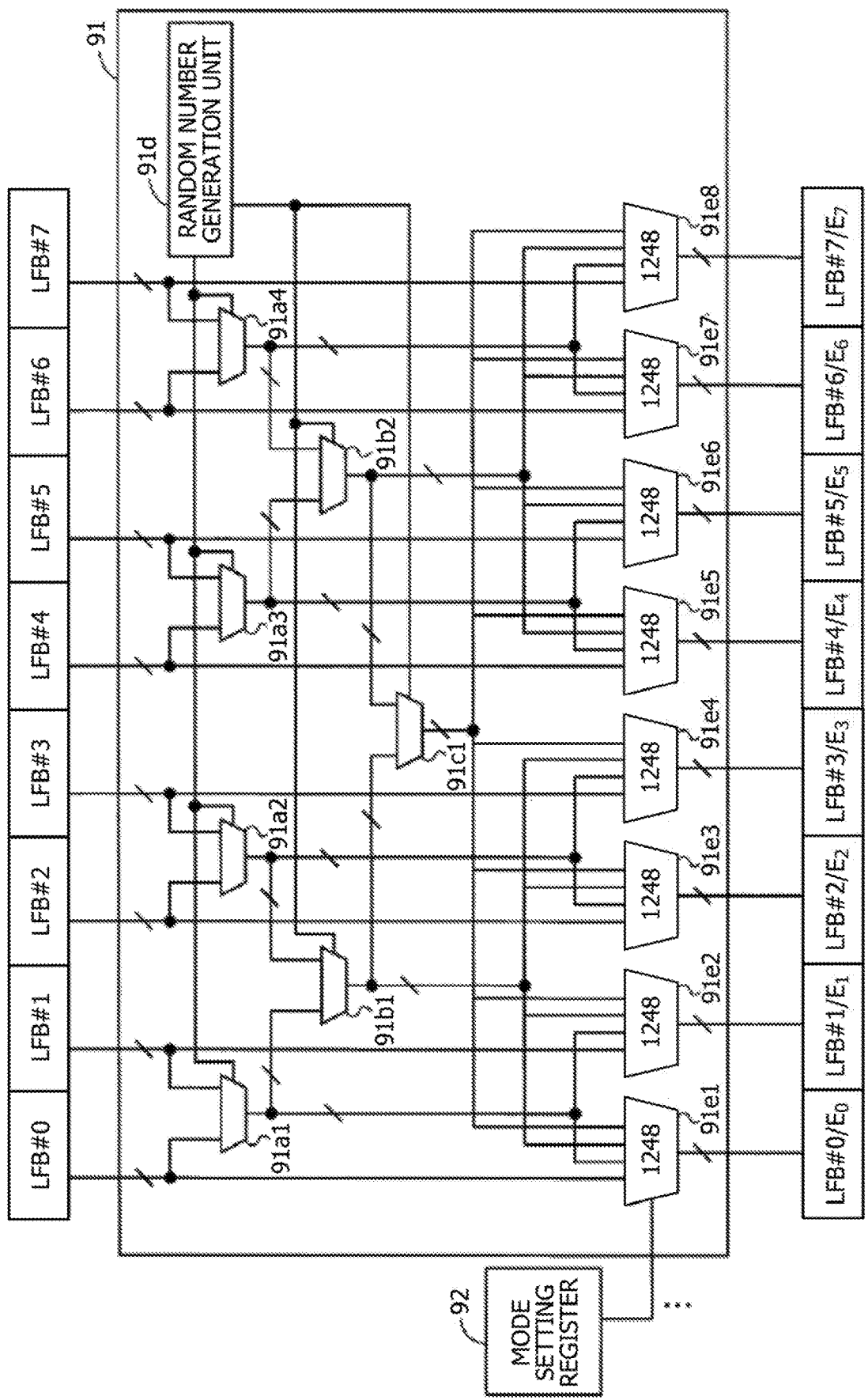
FIG. 25 is an explanatory view depicting an example of a circuit configuration of a scale coupling circuit.

FIG. 25 is an explanatory view depicting an example of a circuit configuration of the scale coupling circuit. The scale coupling circuit 91 includes a plurality of selection circuits 91a1, 91a2, 91a3, 91a4, 91b1, 91b2 and 91c1 coupled like a tree over a plurality of stages, a random number generation unit 91d, and a plurality of mode selection circuits 91e1, 91e2, 91e3, 91e4, 91e5, 91e6, 91e7 and 91e8.

To each of the selection circuits 91a1, . . . , 91a4 at the first stage, two sets (state signal) each including a variable $q_i$, $F_i$, $\Delta E_i$ and index=i outputted from each of the LFBs 70a, . . . , 70h are inputted. For example, to the selection circuit 91a1, a set of ($q_{x0}$, $F_{x0}$, $\Delta E_{x0}$ and index=x0) outputted from the LFB 70a (#0) and another set of ($q_{x1}$, $F_{x1}$, $\Delta E_{x1}$ and index=x1) outputted from the LFB 70b (#1) are inputted. Further, to the selection circuit 91a2, a set of ($q_{x2}$, $F_{x2}$, $\Delta E_{x2}$ and index=x2) outputted from the LFB 70c (#2) and another set of ($q_{x3}$, $F_{x3}$, $\Delta E_{x3}$ and index=x3) outputted from the LFB 70d (#3) are inputted. To the selection circuit 91a3, a set of ($q_{x4}$, $F_{x4}$, $\Delta E_{x4}$ and index=x4) outputted from the LFB 70e (#4) and another set of ($q_{x5}$, $F_5$, $\Delta E_{x5}$ and index=x5) outputted from the LFB 70f (#5) are inputted. To the selection circuit 91a4, a set of ($q_{x6}$, $F_{x6}$, $\Delta E_{x6}$ and index=x6) outputted from the LFB 70g (#6) and another set of ($q_{x7}$, $F_{x7}$, $\Delta E_{x7}$ and index=x7) outputted from the LFB 70h (#7) are inputted.

Then, each of the selection circuits 91a1, . . . , 91a4 selects ($x_i$, $F_i$, $\Delta E_i$ and index=i) of one of the two sets based on a one-bit random number outputted from the random number generation unit 91d. At this time, each of the selection circuits 91a1, . . . , 91a4 preferentially selects a set in which Fi is 1 and selects, in the case where Fi is 1 in both sets, one of the sets based on a one-bit random number (it is to be noted that this similarly applies also to the selection circuits 91b1, 91b2 and 91c1). Here, the random number generation unit 91d generates a one-bit random number individually for each selection circuit and outputs the one-bit random number to the selection circuit. Further, each of the selection circuits 91a1, . . . , 91a4 generates an identification value indicative of which one of the sets is selected based on index included in both sets, and outputs a state signal including the selected variable $q_i$, $F_i$, $\Delta E_i$ and identification value. It is to be noted that the identification value outputted from each of the selection circuits 91a1, . . . , 91a4 has one additional bit to that of inputted index.

To each of the selection circuits 91b1 and 91b2 at the second stage, state signals outputted from the selection circuits 91a1, . . . , 91a4 are inputted two by two. For example, to the selection circuit 91*b*1, state signals outputted from the selection circuits 91*a*1 and 91*a*2 are inputted, and to the selection circuit 91*b*2, state signals outputted from the selection circuits 91*a*3 and 91*a*4 are inputted.

Then, each of the selection circuits 91*b*1 and 91*b*2 selects one of two state signals based on the two state signals and a one-bit random number outputted from the random number generation unit 91*d*. Further, each of the selection circuits 91*b*1 and 91*b*2 adds one bit to the identification value included in the selected state signal so as to indicate which one of the state signals is selected to update the identification value and outputs the selected state signal.

To the selection circuit 91*c*1 at the final stage, two state signals outputted from the selection circuits 91*b*1 and 91*b*2 are inputted. The selection circuit 91*c*1 selects one of the two state signals based on the two state signals and a one-bit random number outputted form the random number generation unit 91*d*. Further, the selection circuit 91*c*1 adds one bit to the identification value included in the selected state signal so as to indicate which one of the state signals is selected to update the identification value and outputs the selected state signal.

As described hereinabove, the identification value corresponds to index. The scale coupling circuit 91 may perform selection of index inputted from the random selector units by the selection circuits similarly to the variable $q_i$, $F_i$ and $\Delta E_i$ such that it outputs index corresponding to the inversion bit. In this case, each random selector unit receives index supplied together with the variable q or the flag F from each LFE. The control unit 504 performs setting of index, for example, according to a combination of LFBs to a given index storage register of each LFE.

Each of the mode selection circuits 91*e*1, . . . , 91*e*8 includes input terminals according to the scales (for example, 1 Kbit, 2 Kbits, 4 Kbits and 8 Kbits). In FIG. 25, the numeral "1" written in each of the mode selection circuits 91*e*1, . . . , 91*e*8 indicates an input terminal corresponding to the scale of 1 Kbit. Similarly, the numeral "2" indicates an input terminal corresponding to the scale of 2 Kbits; the numeral "4" indicates an input terminal corresponding to the scale of 4 Kbits (accuracy 32 bits); and "8" indicates an input terminal corresponding to the scale of 8 Kbits (or the scale of 4 Kbits/accuracy of 64 bits).

To the input terminal for the scale 1 Kbit of the mode selection circuit 91*e*1, a state signal outputted from the LFB 70*a* (#0) is inputted. To the input terminal for the scale 1 Kbit of the mode selection circuit 91*e*2, a state signal outputted from the LFB 70*b* (#1) is inputted. To the input terminal for the scale 1 Kbit of the mode selection circuit 91*e*3, a state signal outputted from the LFB 70*c* (#2) is inputted. To the input terminal for the scale 1 Kbit of the mode selection circuit 91*e*4, a state signal outputted from the LFB 70*d* (#3) is inputted. To the input terminal for the scale 1 Kbit of the mode selection circuit 91*e*5, a state signal outputted from the LFB 70*e* (#4) is inputted. To the input terminal for the scale 1 Kbit of the mode selection circuit 91*e*6, a state signal outputted from the LFB 70*f* (#5) is inputted. To the input terminal for the scale 1 Kbit of the mode selection circuit 91*e*7, a state signal outputted from the LFB 70*g* (#6) is inputted. To the input terminal for the scale 1 Kbit of the mode selection circuit 91*e*8, a state signal outputted from the LFB 70*h* (#7) is inputted.

To the input terminal for the scale 2 Kbits of each of the mode selection circuits 91*e*1 and 91*e*2, a state signal outputted from the selection circuit 91*a*1 is inputted. To the input terminal for the scale 2 Kbits of each of the mode selection circuits 91*e*3 and 91*e*4, a state signal outputted from the selection circuit 91*a*2 is inputted. To the input terminal for the scale 2 Kbits of each of the mode selection circuits 91*e*5 and 91*e*6, a state signal outputted from the selection circuit 91*a*3 is inputted. To the input terminal for the scale 2 Kbits of each of the mode selection circuits 91*e*7 and 91*e*8, a state signal outputted from the selection circuit 91*a*4 is inputted.

To the input terminal for the scale 4 Kbits of each of the mode selection circuits 91*e*1, 91*e*2, 91*e*3 and 91*e*4, a state signal outputted from the selection circuit 91*b*1 is inputted. To the input terminal for the scale 4 Kbits of each of the mode selection circuits 91*e*5, 91*e*6, 91*e*7 and 91*e*8, a state signal outputted from the selection circuit 91*b*2 is inputted.

To the input terminal for the scale 8 Kbits of each of the mode selection circuits 91*e*1, . . . , 91*e*8, a state signal outputted from the selection circuit 91*c*1 is inputted.

Each of the mode selection circuits 91*e*1, . . . , 91*e*8 accepts a setting of a scale (spin bit number) from the mode setting register 92. However, in FIG. 25, each of signal lines from the mode setting register 92 to the mode selection circuits 91*e*2, . . . , 91*e*8 is abbreviated with " . . . " Each of the mode selection circuits 91*e*1, . . . , 91*e*8 selects a state signal inputted to an input terminal thereof according to the set scale, and outputs ($x_j$, $F_j$, index=j) to the LFBs 70*a*, . . . , 70*h* and outputs $\Delta E_j$ to the adders 93*a*, . . . , 93*h*.

For example, the mode selection circuit 91*e*1 outputs ($x_{y0}$, $F_{y0}$, index=y0) to the LFB 70*a* and outputs $\Delta E_{y0}$ to the adder 93*a*. The adder 93*a* updates $E_0$ based on $\Delta E_{y0}$. The mode selection circuit 91*e*2 outputs ($x_{y1}$, $F_{y1}$, index=y1) to the LFB 70*b* and outputs $\Delta E_{y1}$ to the adder 93*b*. The adder 93*b* updates $E_1$ based on $\Delta E_{y1}$. The mode selection circuit 91*e*3 outputs ($x_{y2}$, $F_{y2}$, index=y2) to the LFB 70*c* and outputs $\Delta E_{y2}$ to the adder 93*c*. The adder 93*c* updates $E_2$ based on $\Delta E_{y2}$. The mode selection circuit 91*e*4 outputs ($x_{y3}$, $F_{y3}$, index=y3) to the LFB 70*d* and outputs $\Delta E_{y3}$ to the adder 93*d*. The adder 93*d* updates $E_3$ based on $\Delta E_{y3}$. The mode selection circuit 91*e*5 outputs ($x_{y4}$, $F_{y4}$, index=y4) to the LFB 70*e* and outputs $\Delta E_{y4}$ to the adder 93*e*. The adder 93*e* updates $E_4$ based on $\Delta E_{y4}$. The mode selection circuit 91*e*6 outputs ($x_{y5}$, $F_{y5}$, index=y5) to the LFB 70*f* and outputs $\Delta E_{y5}$ to the adder 93*f*. The adder 93*f* updates $E_5$ based on $\Delta E_{y5}$. The mode selection circuit 91*e*7 outputs ($x_{y6}$, $F_{y6}$, index=y6) to the LFB 70*g* and outputs $\Delta E_{y6}$ to the adder 93*g*. The adder 93*g* updates $E_6$ based on $\Delta E_{y6}$. The mode selection circuit 91*e*8 outputs ($x_{y7}$, $F_{y7}$, index=y7) to the LFB 70*h* and outputs $\Delta E_{y7}$ to the adder 93*h*. The adder 93*h* updates $E_7$ based on $\Delta E_{y7}$.

For example, the optimization apparatus 408 includes, for each LFB, a random selector unit that selects one of bits based on a signal outputted from each LFE belonging to the LFB (group) and Indicative of reversibility and outputs a signal indicative of the selected bit to the scale coupling circuit 91. The scale coupling circuit 91 combines one or more LFBs in response to a setting of a spin bit number and selects a bit to be inverted based on signals indicative of bits elected by random selector units individually corresponding to the one or more LFBs. The scale coupling circuit 91 outputs a signal indicative of the bit to be inverted to each of the LFEs belonging to the one or more LFBs.

Here, the mode setting register 92 performs setting of a scale individually to the mode selection circuits 91*e*1, . . . , 91*e*8. However, in a mode of a certain scale, a common scale is set to mode selection circuits corresponding to the LFBs used in combination.

For example, the mode setting register 92 may set the spin bit number of a first spin bit string corresponding to a first combination of LFBs and the spin bit number of a second spin bit string corresponding to a second combination of LFBs to a same bit number or to different bit numbers. Further, the mode setting registers of the LFBs including the mode setting register 75 may set the bit number of a weighting factor for LFEs belonging to a first combination of LFBs and the bit number of a weighting factor for LFEs belonging to a second combination of LFBs to a same bit number or to different bit numbers.

This makes it possible to implement, in the optimization apparatus 408, various partition modes and execution modes among which a maximum scale or a maximum accuracy of a problem that can be solved is different.

For example, in the case where the LFBs 70a and 70b are used in combination to utilize the mode of the scale 2 Kbits, a selection signal for selecting the mode of the scale 2 Kbits is supplied from the mode setting register 92 to the mode selection circuits 91e1 and 91e2. At this time, for example, the optimization apparatus 408 may execute a same problem as that of arithmetic operation by the LFBs 70a and 70b or different problems from each other in parallel using the remaining six LFBs by the setting of the mode setting register 92.

For example, the scale coupling circuit 91 may implement, from among the remaining six LFBs, three modes of the scale 2 Kbits through combination of each two of the six LFBs. This makes it possible to implement four partitions of the partition mode "4P (4 division)."

Further, the scale coupling circuit 91 may implement, from among the remaining six LFBs, six modes of the scale 1 Kbit each including one of the six LFBs. This makes it possible to establish a state in which the execution mode of one partition from among four partitions of the partition mode "4P (4 division)" is set to the execution mode "4P" and the execution mode of the remaining three partitions is set to the execution mode "8P."

Furthermore, the scale coupling circuit 91 may implement the mode of the scale 2 Kbits from a combination of two LFBs from among six LFBs and implement the mode of the scale 4 Kbits from a combination of the remaining LFBs. This makes it possible to establish a state in which the execution mode of one partition from between two partitions of the partition mode "2P (2 division)" is set to the execution mode "2P" and the execution mode of the remaining one partition is set to the execution mode "4P."

The combination of modes to be implemented in parallel is not limited to the combinations described above, and for example, a combination of eight modes of the scale 1 Kbit, a combination of four modes of the scale 2 Kbits, a combination of four modes of the scale 1 Kbit and two modes of the scale 2 Kbits and so forth are available.

In this manner, the scale coupling circuit 91 accepts a setting of spin bit numbers individually to a plurality of spin bit strings by the mode setting register 92, selects an LFB number (group number) to be combined for each spin bit number of the plurality of spin bit strings and combines such LFBs. This makes it possible to implement a plurality of Ising models on the single optimization apparatus 408.

It is to be noted that, into a set of E storage registers corresponding to a set of LFBs used in combination, common energy is stored. For example, in the case where the LFBs 70a and 70b are utilized in combination, $E_0$ and $E_1$ stored in the E storage registers 94a and 94b have an equal value. In this case, when an energy value for the set of the LFBs 70a and 70b is to be read out, it is sufficient if the control unit 504 reads out an energy value stored in one of the E storage registers 94a and 94b (for example, in the E storage register 94a corresponding to the LFB 70a). The control unit 504 reads out an energy value in a similar manner also in regard to the other combinations of LFBs.

For example, the control unit 504 accepts an input of initial values or operation conditions of problems to be arithmetically operated in parallel from the execution controlling unit 1803 of the optimization problem arithmetic apparatus 101. Then, the control unit 504 sets the scale/accuracy according to each problem inputted from the execution controlling unit 1803 of the optimization problem arithmetic apparatus 101 to the mode setting registers of the LFBs and the mode setting register 92 for each group of the LFBs to be used for one problem (for example, for each partition).

For example, the control unit 504 sets, in regard to a first problem, the scale 2 Kbits/accuracy 64 bits to the mode setting registers of the LFBs 70a and 70b and sets the scale 2 Kbits/accuracy 64 bits to the mode setting register 92 such that outputting for the scale 2 Kbits to the mode selection circuits 91e1 and 91e2 is to be performed. Further, the control unit 504 sets, in regard to a second problem, the scale 2 Kbits/accuracy 64 bits to the mode setting registers of the LFBs 70c and 70d and sets the scale 2 Kbits/accuracy 64 bits to the mode setting register 92 such that outputting for the scale 2 Kbits to the mode selection circuits 91e3 and 91e4 is to be performed.

In this case, the optimization apparatus 408 may arithmetically operate two problems (otherwise the two problems may be a same problem) in parallel. For example, the control unit 504 controls the LFBs so as to perform the procedure of the flow chart depicted in FIG. 15 for a combination of LFBs corresponding to each problem.

The control unit 504 reads out a spin bit string for the first problem from the LFEs of the LFBs 70a and 70b after the arithmetic operation ends and determines the spin bit string as a solution to the first problem. Further, the control unit 504 reads out a spin bit string for the second problem from the LFEs of the LFBs 70c and 70d after the arithmetic operation ends and determines the spin bit string as a solution to the second problem. Also for three or more problems, parallel arithmetic operation may be performed. This makes it possible to efficiently perform arithmetic operation for a plurality of problems.

Further, in the case where a same problem is solved in parallel by a plurality of sets of LFBs, it is conceivable that the control unit 504 performs arithmetic operation at a high speed, for example, by a technique called replica exchange method. In the replica exchange method, update of a spin bit string with temperature parameters that are different among different sets of LFBs (among replicas) is performed and, after a given number of times of update, temperature parameters are exchanged with a given probability between sets of LFBs (for example, between replicas) to perform a search for a solution at a high speed.

Alternatively, as a search method for a solution, also a method is conceivable by which the procedure of FIG. 15 from the start (START) to the end (END) is performed repeatedly and a spin bit string whose energy is lowest is determined as a solution from among a plurality of results of the arithmetic operation. In this case, the control unit 504 may reduce the number of repetitions to perform arithmetic operation at a high speed by solving a same problem in parallel using a plurality of sets of LFBs.

As described above, with the optimization problem arithmetic apparatus 101 according to the embodiment, it is possible to accept a combinatorial optimization problem and determine a partition mode and an execution mode of the optimization apparatus 408 in response to a scale or a requested accuracy of the accepted combinatorial optimization problem. Further, with the optimization problem arithmetic apparatus 101, arithmetic operation of the combinatorial optimization problem may be executed by the optimization apparatus 408 in accordance with the determined partition mode and execution mode.

Consequently, arithmetic operation of a combinatorial optimization problem may be performed by the optimization apparatus 408 in accordance with a partition mode and an execution mode according to a scale or a requested accuracy of the problem. Therefore, it is possible to set a range of hardware resources to be utilized upon arithmetic operation in response to the scale or requested accuracy of the problem and increase the arithmetic operation performance to achieve increase of the speed of the arithmetic operation process.

Further, with the optimization problem arithmetic apparatus 101, in the case where the scale of a combinatorial optimization problem is smaller than a maximum scale of a problem that can be solved by the first partition mode, the partition mode of the optimization apparatus 408 may be determined to the first partition mode. Furthermore, with the optimization problem arithmetic apparatus 101, the execution mode of the optimization apparatus 408 may be determined to the first execution mode that defines a range of hardware resources corresponding to the scale of the combinatorial optimization problem from among the execution modes that defines a range of hardware resources to be utilized upon arithmetic operation in the first partition mode. For example, the first partition mode is a current partition mode. Further, the first execution mode is an execution mode in which the maximum scale of a problem that can be solved in the execution mode is smaller than the maximum scale of a problem that can be solved by the first partition mode and that defines a range of hardware resources that can solve a problem of a scale equal to or greater than the scale of the combinatorial optimization problem.

Consequently, it is possible to suppress the range of hardware resources to be utilized upon arithmetic operation of a combinatorial optimization problem to the minimum and suppress useless DMA transfer and so forth thereby to increase the arithmetic operation performance.

Further, with the optimization problem arithmetic apparatus 101, in the case where arithmetic operation of a combinatorial optimization problem by the optimization apparatus 408 in the determined first partition mode and first execution mode is completed, the execution mode of the optimization apparatus 408 may be changed to the initial mode.

Consequently, it is possible to restore an original state (initial mode) in which a problem of a scale greater than that in the first execution mode can be solved at a timing at which arithmetic operation of a combinatorial optimization problem by the partition is completed.

Further, with the optimization problem arithmetic apparatus 101, in the case where the scale of a combinatorial optimization problem is greater than a maximum scale of a problem that can be solved by the first partition mode, it is possible to divide the combinatorial optimization problem and determine a partition mode and an execution mode of the optimization apparatus 408 in response to the scale or the requested accuracy of each divisional problem after the division. Then, with the optimization problem arithmetic apparatus 101, arithmetic operation of the problem after the division by the optimization apparatus 408 may be executed by the determined partition mode and execution mode.

Consequently, in the case where the scale of a combinatorial optimization problem is greater than a maximum scale of a problem that can be solved by the current partition mode, the combinatorial optimization problem may be solved by the distributed method even if the partition mode is not changed.

Further, with the optimization problem arithmetic apparatus 101, in the case where the scale of a combinatorial optimization problem is greater than a maximum scale of a problem that can be solved by the first partition mode, the partition mode of the optimization apparatus 408 may be determined to the second partition mode by which a problem of a scale equal to or greater than the scale of the combinatorial optimization problem can be solved.

Consequently, in the case where the scale of a combinatorial optimization problem is greater than a maximum scale of a problem that can be solved by the current partition mode, it is possible to change the partition mode to solve the combinatorial optimization problem. However, in the case where the partition mode is to be changed, in order to suppress a result during arithmetic operation in the partition from becoming abnormal, the optimization problem arithmetic apparatus 101 changes the partition mode in a state in which no arithmetic operation is being performed by any partition.

Further, with the optimization problem arithmetic apparatus 101, in the case where the requested accuracy of a combinatorial optimization problem is within a range of a maximum accuracy of a problem that can be solved by the first partition mode, it is possible to determine the partition mode of the optimization apparatus 408 to the first partition mode and determine the execution mode of the optimization apparatus 408 to the second execution mode that defines a range of hardware resources corresponding to the requested accuracy of the combinatorial optimization problem.

Consequently, it is possible to set a range of hardware resources to be utilized upon arithmetic operation in response to a requested accuracy of the combinatorial optimization problem and efficiently solve the combinatorial optimization problem.

Further, with the optimization problem arithmetic apparatus 101, it is possible to determine a partition mode and an execution mode of the optimization apparatus 408 in response to a scale and requested accuracy of a combinatorial optimization problem. Consequently, it is possible to set a range of hardware resources to be utilized upon arithmetic operation in response to a scale and a requested accuracy of the combinatorial optimization problem and efficiently solve the combinatorial optimization problem.

It is to be noted that the optimization problem arithmetic method described in the description of the present embodiment may be implemented by a program prepared in advance and executed by a computer such as a personal computer or a work station. The present optimization problem arithmetic program is recorded in a computer-readable recording medium such as a hard disk, a flexible disk, a CD, a DVD or a USB memory and is executed by reading out from the recording medium by a computer. Further, the preset optimization problem arithmetic program may be delivered through a network such as the Internet.

Further, the functional units of the optimization problem arithmetic apparatus 101 described hereinabove in the description of the present embodiment may be implemented also by an application specific IC such as a standard cell or a structured application specific integrated circuit (ASIC) or a programmable logic device (PLD) such as an FPGA.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented optimization problem arithmetic method comprising:
   receiving a combinatorial optimization problem;
   determining, based on scale or a requested accuracy of the combinatorial optimization problem, a partition mode and an execution mode, the partition mode defining a logically divided state of an arithmetic circuit, the execution mode defining a range of hardware resources to be utilized in arithmetic operation for each of partitions generated by logically dividing the arithmetic circuit; and
   causing the arithmetic circuit to execute arithmetic operation of the combinatorial optimization problem in accordance with the determined partition mode and the determined execution mode.

2. The optimization problem arithmetic method according to claim 1, wherein the determining includes
   determining a first partition mode as the partition mode when the scale of the combinatorial optimization problem is smaller than a maximum scale of a problem that is solvable by the arithmetic circuit in the first partition mode, and
   selecting a first execution mode as the execution mode from one or more execution modes that are utilizable in the first partition mode, the first execution mode corresponding to the scale of the combinatorial optimization problem.

3. The optimization problem arithmetic method according to claim 2, wherein
   a maximum scale of a problem that is solvable in the first execution mode is smaller than the maximum scale of the problem that is solvable in the first partition mode, and
   the maximum scale of the problem that is solvable in the first execution mode is equal to or greater than the scale of the combinatorial optimization problem.

4. The optimization problem arithmetic method according to claim 3, further comprising: changing, when the arithmetic operation of the combinatorial optimization problem is completed, the execution mode to a second execution mode corresponding to the maximum scale of the problem that is solvable in the first partition mode.

5. The optimization problem arithmetic method according to claim 2, further comprising:
   receiving another combinatorial optimization problem;
   dividing the other combinatorial optimization problem when a scale of the other combinatorial optimization problem is greater than a maximum scale of a problem that is solvable by the arithmetic circuit;
   determining a second partition mode and a second execution mode of the arithmetic circuit based on a scale or a requested accuracy of a problem generated by the dividing of the other combinatorial optimization problem; and
   causing the arithmetic circuit to execute arithmetic operation of the problem in accordance with the determined second partition mode and second execution mode.

6. The optimization problem arithmetic method according to claim 2, further comprising:
   receiving another combinatorial optimization problem;
   changing, when a scale of the other combinatorial optimization problem is greater than the maximum scale of the problem that is solvable in the first partition mode, the partition mode to a second partition mode in which a problem whose a scale is greater than the maximum scale of the first partition mode is solvable; and
   causing the arithmetic circuit to execute arithmetic operation of the other combinatorial optimization problem in accordance with the second partition mode.

7. The optimization problem arithmetic method according to claim 1, wherein
   the scale of the combinatorial optimization problem is represented by a number of spin bits of an Ising model of the combinatorial optimization problem, and
   the requested accuracy of the combinatorial optimization problem is represented by a number of bits of a weighting factors that indicates a magnitude of interaction between bits.

8. A optimization problem arithmetic apparatus comprising:
   a memory; and
   a processor coupled to the memory and the processor configured to:
   receive a combinatorial optimization problem,
   perform, based on scale or a requested accuracy of the combinatorial optimization problem, determination of a partition mode and an execution mode, the partition mode defining a logically divided state of an arithmetic circuit, the execution mode defining a range of hardware resources to be utilized in arithmetic operation for each of partitions generated by logically dividing the arithmetic circuit, and
   cause the arithmetic circuit to execute arithmetic operation of the combinatorial optimization problem in accordance with the determined partition mode and the determined execution mode.

9. The optimization problem arithmetic apparatus according to claim 8, wherein the determination includes
   determining a first partition mode as the partition mode when the scale of the combinatorial optimization problem is smaller than a maximum scale of a problem that is solvable by the arithmetic circuit in the first partition mode, and
   selecting a first execution mode as the execution mode from one or more execution modes that are utilizable in the first partition mode, the first execution mode corresponding to the scale of the combinatorial optimization problem.

10. The optimization problem arithmetic apparatus according to claim 9, wherein
    a maximum scale of a problem that is solvable in the first execution mode is smaller than the maximum scale of the problem that is solvable in the first partition mode, and
    the maximum scale of the problem that is solvable in the first execution mode is equal to or greater than the scale of the combinatorial optimization problem.

11. The optimization problem arithmetic apparatus according to claim 10, wherein the processor is further configured to change, when the arithmetic operation of the combinatorial optimization problem is completed, the execution mode to a second execution mode corresponding to the maximum scale of the problem that is solvable in the first partition mode.

12. The optimization problem arithmetic apparatus according to claim 9, wherein the processor is further configured to:

receive another combinatorial optimization problem, perform division of the other combinatorial optimization problem when a scale of the other combinatorial optimization problem is greater than a maximum scale of a problem that is solvable by the arithmetic circuit, determine a second partition mode and a second execution mode of the arithmetic circuit based on a scale or a requested accuracy of a problem generated by the division of the other combinatorial optimization problem, and cause the arithmetic circuit to execute arithmetic operation of the problem in accordance with the determined second partition mode and second execution mode.

13. The optimization problem arithmetic apparatus according to claim 9, wherein the processor is further configured to:

receive another combinatorial optimization problem, change, when a scale of the other combinatorial optimization problem is greater than the maximum scale of the problem that is solvable in the first partition mode, the partition mode to a second partition mode in which a problem whose a scale is greater than the maximum scale of the first partition mode is solvable, and cause the arithmetic circuit to execute arithmetic operation of the other combinatorial optimization problem in accordance with the second partition mode.

14. The optimization problem arithmetic apparatus according to claim 8, wherein the scale of the combinatorial optimization problem is represented by a number of spin bits of an Ising model of the combinatorial optimization problem, and the requested accuracy of the combinatorial optimization problem is represented by a number of bits of a weighting factors that indicates a magnitude of interaction between bits.

15. A non-transitory computer-readable medium storing instructions executable by one or more computers, the instructions comprising:

one or more instructions for receiving a combinatorial optimization problem;

one or more instructions for determining, based on scale or a requested accuracy of the combinatorial optimization problem, a partition mode and an execution mode, the partition mode defining a logically divided state of an arithmetic circuit, the execution mode defining a range of hardware resources to be utilized in arithmetic operation for each of partitions generated by logically dividing the arithmetic circuit; and one or more instructions for causing the arithmetic circuit to execute arithmetic operation of the combinatorial optimization problem in accordance with the determined partition mode and the determined execution mode.

* * * * *